United States Patent
Takahashi

(10) Patent No.: US 6,665,439 B1
(45) Date of Patent: Dec. 16, 2003

(54) IMAGE RECOGNITION METHOD AND APPARATUS UTILIZING EDGE DETECTION BASED ON MAGNITUDES OF COLOR VECTORS EXPRESSING COLOR ATTRIBUTES OF RESPECTIVE PIXELS OF COLOR IMAGE

(75) Inventor: Eiji Takahashi, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/545,580

(22) Filed: Apr. 7, 2000

(30) Foreign Application Priority Data

Apr. 7, 1999 (JP) .............................. 11-099662

(51) Int. Cl.[7] ................................ G06K 9/48
(52) U.S. Cl. .................. 382/199; 382/165; 382/197; 382/203; 382/218
(58) Field of Search .................. 382/151, 162, 382/164, 165, 181, 190, 197, 199, 203, 209, 216–221, 243, 254, 266, 269, 282, 291

(56) References Cited

U.S. PATENT DOCUMENTS

| | | | |
|---|---|---|---|
| 5,081,689 A | * 1/1992 | Meyer et al. | 382/199 |
| 5,168,530 A | 12/1992 | Peregrim et al. | 382/199 |
| 5,420,971 A | * 5/1995 | Westerink et al. | 382/199 |
| 6,094,501 A | * 7/2000 | Beatty | 382/154 |
| 6,356,300 B1 | * 3/2002 | Shiba | 348/130 |

FOREIGN PATENT DOCUMENTS

| | | | |
|---|---|---|---|
| EP | 0472782 | 3/1992 | G06F/15/68 |
| JP | 6-83962 | 3/1994 | G06F/15/70 |
| JP | 8-180191 | 7/1996 | G06T/7/00 |
| JP | 8-315136 | 11/1996 | G06T/7/00 |
| JP | 10-149449 | 6/1998 | G06T/7/20 |

OTHER PUBLICATIONS

"A method to obtain the integrated contour image in colour scenes" Image Processing, 1997. Proceedings., International Conference on Santa Barbara, CA, USA Oct. 26–29, 1997, Los Alamitos, CA, USA, IEEE Comput. Soc, US, Oct. 26, 1997, pp. 764–767, XP010253928.

* cited by examiner

Primary Examiner—Daniel G. Mariam
(74) Attorney, Agent, or Firm—Lowe Hauptman Gilman & Berner, LLP

(57) ABSTRACT

An image recognition apparatus operates on data of a color image to obtain an edge image expressing the shapes of objects appearing in the color image, the apparatus including a section for expressing the color attributes of each pixel of the image as a color vector, in the form of a set of coordinates of an orthogonal color space, a section for applying predetermined arrays of numeric values as edge templates to derive for each pixel a number of edge vectors each corresponding to a specific edge direction, with each edge vector obtained as the difference between weighted vector sums of respective sets of color vectors of two sets of pixels which are disposed symmetrically opposing with respect to the corresponding edge direction, and a section for obtaining the maximum modulus of these edge vectors as a value of edge strength for the pixel which is being processed. By comparing the edge strength of a pixel with those of immediately adjacent pixels and with a predetermined threshold value, a decision can be reliably made for each pixel as to whether it is actually located on an edge and, if so, the direction of that edge.

29 Claims, 41 Drawing Sheets

FIG. 4
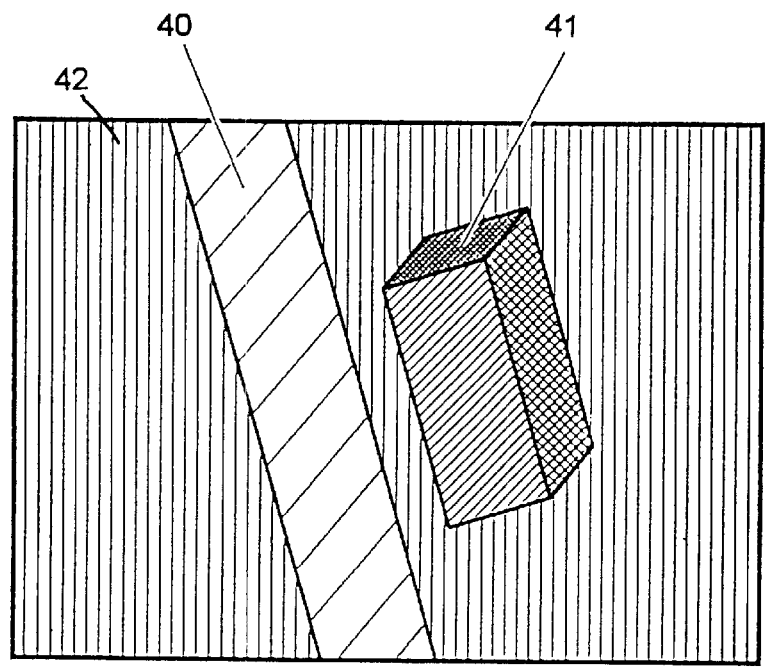
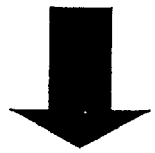
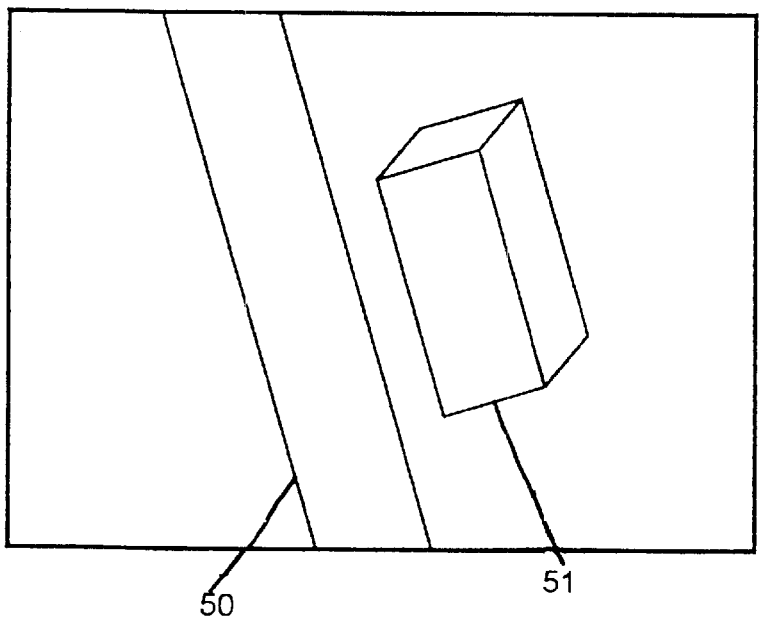

| 1 | 2 | 1 |
|---|---|---|
| 0 | 0 | 0 |
| -1 | -2 | -1 |

(EDGE TEMPLATE FOR LEFT - RIGHT DIRECTION)

| 2 | 1 | 0 |
|---|---|---|
| 1 | 0 | -1 |
| 0 | -1 | -2 |

(EDGE TEMPLATE FOR LOWER LEFT - UPPER RIGHT DIRECTION)

| 1 | 0 | -1 |
|---|---|---|
| 2 | 0 | -2 |
| 1 | 0 | -1 |

(EDGE TEMPLATE FOR TOP - BOTTOM DIRECTION)

| 0 | -1 | -2 |
|---|---|---|
| 1 | 0 | -1 |
| 2 | 1 | 0 |

(EDGE TEMPLATE FOR LOWER RIGHT - UPPER LEFT DIRECTION)

FIG. 9A
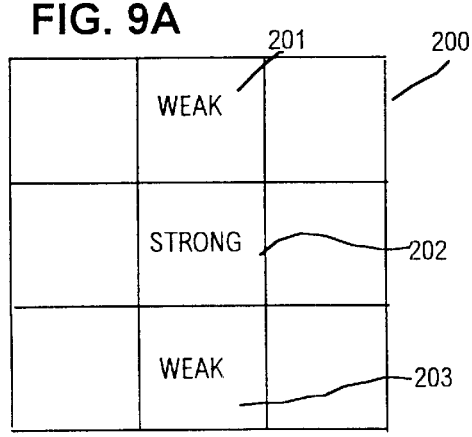
(DIR(x,y) IS LEFT – RIGHT DIRECTION)
FIG. 9B
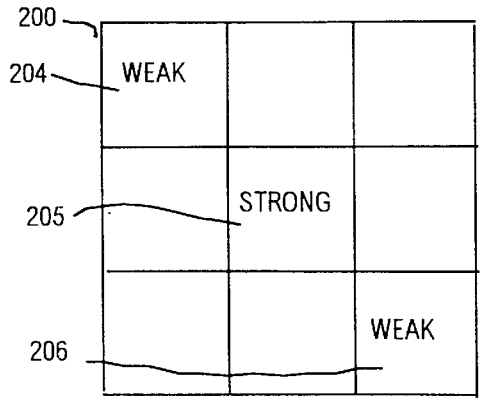
(DIR(x,y) IS LOWER LEFT – UPPER RIGHT DIRECTION)
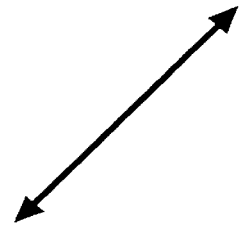
FIG. 9C
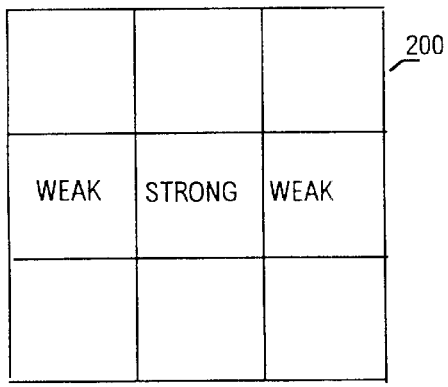
(DIR(x,y) IS TOP – BOTTOM DIRECTION)
FIG. 9D
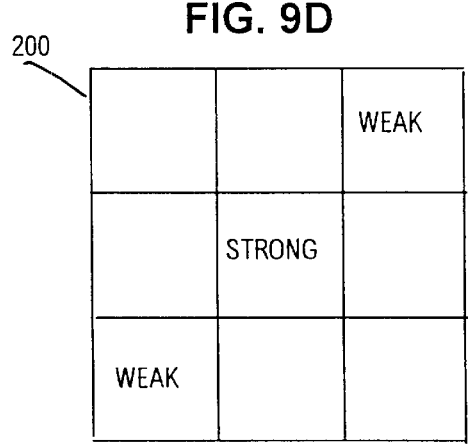
(DIR(x,y) IS LOWER RIGHT – UPPER LEFT DIRECTION)
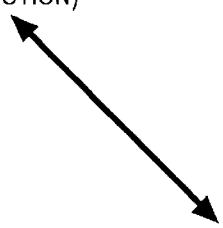

FIG. 26

| | HSI | INVERSE-CONICAL H'S'I' | DOUBLE-CONICAL H'S'I' | MODIFIED CYLINDRICAL H'S'I' |
|---|---|---|---|---|
| BUILDING ROOF | h:144~148<br>s:230~255<br>i:98~108 | h:144~148<br>s:88~108<br>i:98~108 | h:144~148<br>s:177~216<br>i:98~108 | h:144~148<br>s:229~254<br>i:98~108 |
| BUILDING SIDE FACE 1 | h:143~149<br>s:219~255<br>i:68~78 | h:143~149<br>s:58~78<br>i:68~78 | h:143~149<br>s:117~156<br>i:68~78 | h:143~149<br>s:218~254<br>i:68~78 |
| BUILDING SIDE FACE 2 | h:152~165<br>s:187~255<br>i:33~43 | h:152~165<br>s:24~43<br>i:33~43 | h:152~165<br>s:48~86<br>i:33~43 | h:152~165<br>s:185~253<br>i:33~43 |
| ROAD | h:0~250<br>s:0~10<br>i:117~127 | h:0~250<br>s:0~5<br>i:117~127 | h:0~250<br>s:0~10<br>i:117~127 | h:0~250<br>s:0~10<br>i:117~127 |
| GROUND SURFACE | h:18~22<br>s:230~255<br>i:98~108 | h:18~22<br>s:88~108<br>i:98~108 | h:18~22<br>s:177~216<br>i:98~108 | h:18~22<br>s:229~254<br>i:98~108 |

FIG. 38
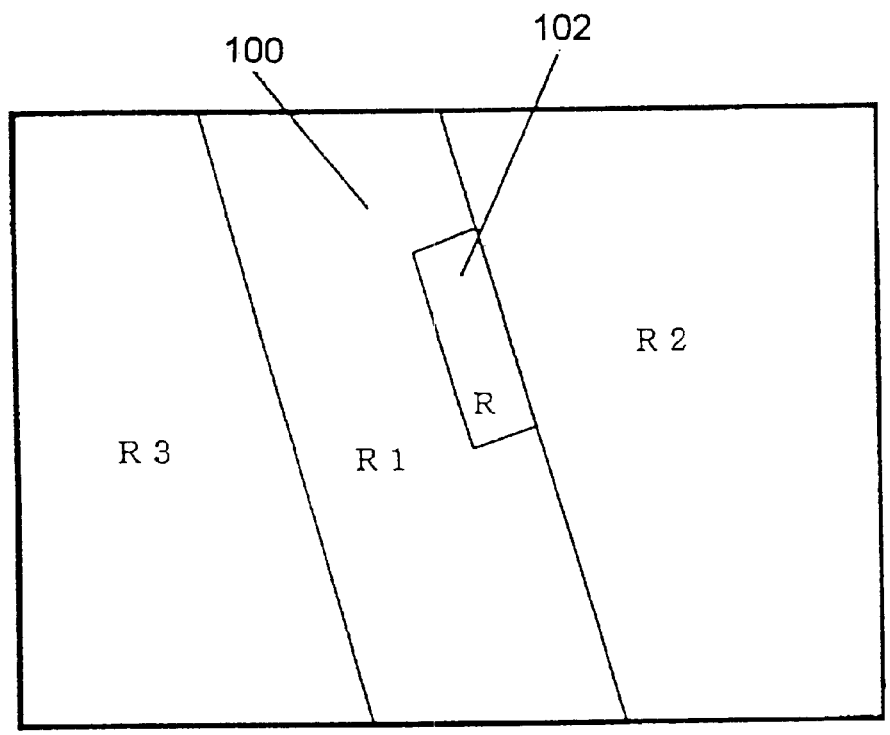
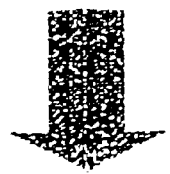
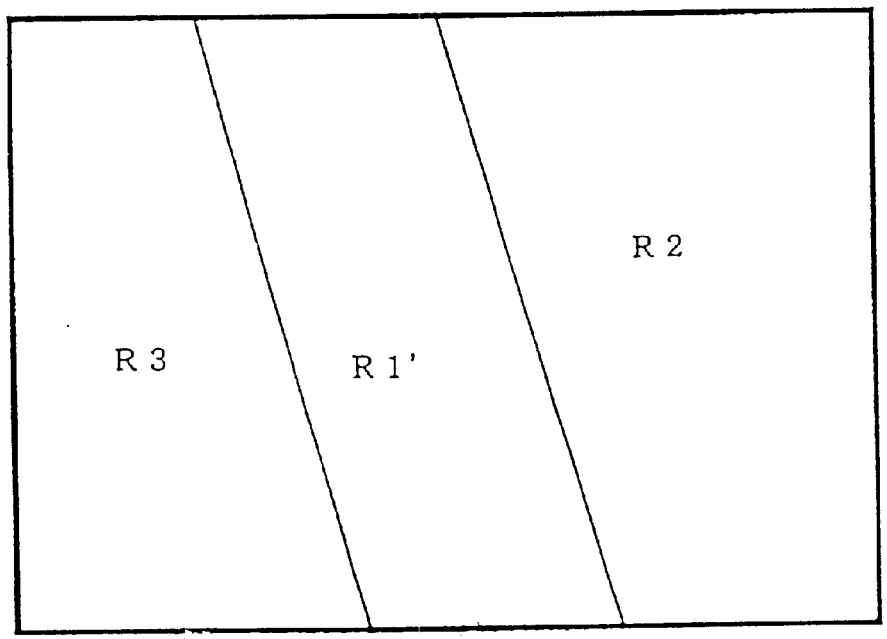

FIG. 44
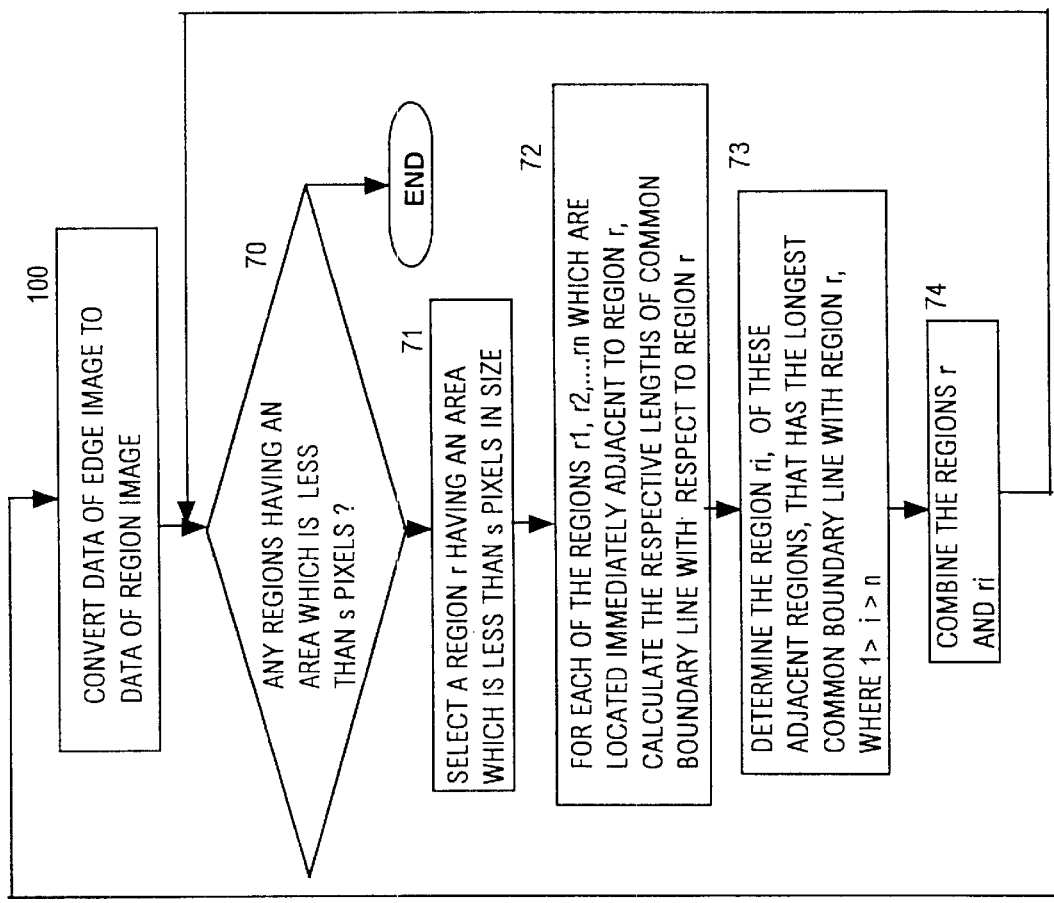
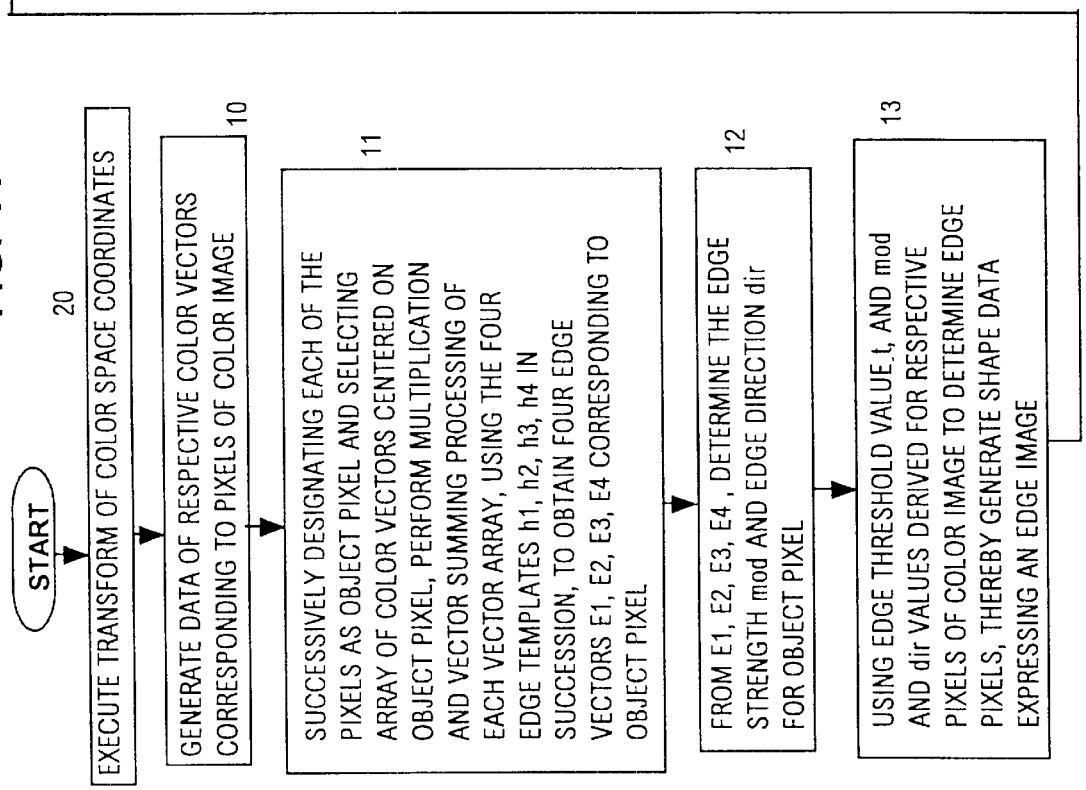

IMAGE RECOGNITION METHOD AND APPARATUS UTILIZING EDGE DETECTION BASED ON MAGNITUDES OF COLOR VECTORS EXPRESSING COLOR ATTRIBUTES OF RESPECTIVE PIXELS OF COLOR IMAGE

BACKGROUND OF THE INVENTION

1. Field of Application

The present invention relates to an image recognition method and an image recognition apparatus for use in an image recognition system, for extracting from a color image the shapes of objects which are to be recognized. In particular, the invention relates to an image recognition apparatus which provides a substantial improvement in edge detection performance when applied to images such as aerial photographs or satellite images which exhibit a relatively low degree of variation in intensity values.

2. Description of Prior Art

In the prior art, various types of image recognition apparatus are known, which are intended for various different fields of application. Typically, the image recognition apparatus may be required to extract from an image, such as a photograph, all objects having a shape which falls within some predetermined category.

One approach to the problem of increasing the accuracy of image recognition of the contents of photographs is to set the camera which takes the photographs in a fixed position and to fix the lighting conditions etc., so that the photographic conditions are always identical. Another approach is to attach markers, etc., to the objects which are to be recognized.

However in the case of recognizing shapes within satellite images or aerial photographs, such prior art methods of improving accuracy cannot be applied. That is to say, the photographic conditions such as the camera position, camera orientation, weather conditions, etc., will vary each time that a photograph is taken. Furthermore, a single image may contain many categories of image data, such as image data corresponding to building, rivers, streets, etc., so that the image contents are complex. As a result, the application of image recognition to satellite images or aerial photographs is extremely difficult.

To extract the shapes of objects which are to be recognized, from the contents of an image, image processing to detect edges etc., can be implemented by using the differences between color values (typically, the intensity, i.e., gray-scale values) of the pixels which constitute a region representing an object which is to be recognized and the color values of the pixels which constitute adjacent regions to these objects. Edge detection processing consists of detecting positions at which there are abrupt changes in the pixel values, and recognizing such positions as corresponding to the outlines of physical objects. Various types of edge detection processing are known. With a typical method, smoothing processing is applied overall to the pixel values, then each of the pixels for which the first derivative of the intensity variation gradient within the image reaches a local maximum and exceeds a predetermined threshold value are determined, with each such pixel being assumed to be located on an edge of an object in the image. Alternatively, a "zero-crossing" method can be applied, e.g., whereby the zero crossings of the second derivative of the gradient are be detected to obtain the locations of the edge pixels. With a template technique, predetermined shape templates are compared with the image contents to find the approximate positions of objects that are to be recognized, then edge detection processing may be applied to the results obtained.

Although prior art image recognition techniques are generally based upon intensity values of the pixels of an image, various methods are possible for expressing the pixel values of color image data. If the HSI (hue, saturation, intensity) color space is used, then any pixel can be specified in terms of the magnitude of its hue, saturation or intensity component. The RGB (red, green, blue) method is widely used for expressing image data, however transform processing can be applied to convert such data to HSI form, and edge detection processing can then be applied by operating on the intensity values which are thereby obtained. HSI information has the advantage of being readily comprehended by a human operator. In particular, an image can easily be judged by a human operator as having a relatively high or relatively low degree of variation in intensity (i.e., high contrast or low contrast).

Due to the difficulties which are experienced in the practical application of image recognition processing to satellite images or aerial photographs, it would be desirable to effectively utilize all of the color information that is available within such a photograph, that is to say, to use not only the intensity values of the image but also the hue and saturation information contained in the image. However in general with prior art types of edge detection processing, only parts of the color information, such as the intensity values alone, are utilized.

A method of edge detection processing is described in Japanese patent HEI 6-83962, which uses a zero-crossing method and, employing a HSI color space (referred to therein using the designations L,*C*ab,H*ab for the intensity, saturation and hue values respectively) attempts to utilize not only the intensity values but also hue and saturation information. In FIG. 47, diagrams 200, 201, 202, and 203 show respective examples of the results of image recognition, applied to a color picture of an individual, which are obtained by using that method. Diagram 200 shows the result of edge detection processing that is applied using only the intensity values of each of the pixels of the original picture, diagram 201 shows the result of edge detection processing that is applied using only the hue values, and diagram 202 shows the result obtained by using only the saturation values. Diagram 203 shows the result that is obtained by combining the results shown in diagrams 200, 201 and 203. As can be seen, a substantial amount of noise arises in the image expressed by the saturation values, and this noise is inserted into the combined image shown in diagram 203.

In some cases, image smoothing processing is applied in order to reduce the amount of noise within an image, before performing edge detection processing, i.e., the image is pre-processed by using a smoothing filter to blur the image, and edge detection processing applied to the resultant image.

In order to obtain satisfactory results from edge detection processing which is to be applied to an image such as a satellite images or aerial photograph, for example to accurately and reliably extract the shapes of specific objects such as roads, buildings etc., from the image contents, it is necessary not only to determine the degree of "strength" of each edge, but also the direction along which an edge is oriented. In the following, and in the description of embodiments of the invention and in the appended claims, the term "edge" is used in the sense of a line segment which is used as a straight-line approximation to a part of a boundary between two adjacent regions of a color image. The term "strength" of an edge is used herein to signify a degree of of color difference between pixels located adjacent to one side of that edge and pixels located adjacent to the opposite side, while the term "edge direction" is used in referring to the angle of orientation of an edge within the image, which is one of a predetermined limited number of angles. If the direction of an edge could be accurately determined (i.e., based upon only a part of the pixels which constitute that edge), then this would greatly simplify the process of determining all of the pixels which are located along that edge. That is to say, if the edge direction could be reliably determined estimated by using only a part of the pixels located on that edge, then it would be possible to compensate for any discontinuities within the edge which is obtained as a result of the edge detection processing, so that an output image could be generated in which all edges are accurately shown as continuous lines.

However with the method described in Japanese patent HEI 6-83962, only the zero-crossing method is used, so that it is not possible to determine edge directions, since only each local maximum of variation of a gradient of a color attribute is detected, irrespective of the direction along which that variation is oriented. With other types of edge detection processing such as the object template method, processing of intensity values, hue values and saturation values can be performed respectively separately, to obtain respective edge directions. However even if the results thus obtained are combined, accurate edge directions cannot be detected. Specifically, the edge directions which result from using intensity values, hue values and saturation values may be entirely different from one another, so that accurate edge detection cannot be achieved by taking the average of these results.

Moreover, in the case of a color image such as a satellite image or aerial photograph which presents special difficulties with respect to image recognition, it would be desirable to be able to flexibly adjust the image recognition processing in accordance with the overall color characteristics of the image that is to be processed. That is to say, it should be possible for example for a human operator to examine such an image prior to executing image recognition processing, to estimate whether different objects in the image mainly differ mainly with respect to differences in hue, or whether the objects are mainly distinguished by differences in gray-scale level, i.e., intensity values. The operator should then be able to adjust the image recognition apparatus to operate in a manner that is best suited to these image characteristics, i.e., to extract the edges of objects based on the entire color information of the image, but for example placing emphasis upon the intensity values of pixels, or upon the chrominance values of the pixels, whichever is appropriate. However such a type of image recognition apparatus has not been available in the prior art.

Furthermore, in order to apply image recognition processing to an image whose color data are expressed with respect to an RGB color space, it is common practice to first convert the color image data to a an HSI (hue, saturation, intensity) color space, i.e., expressing the data of each pixel as a position within such a color space. This enables a human operator to more readily judge the color attributes of the overall image prior to executing the image recognition processing, and enables such processing to be applied to only the a specific color attribute of each of the pixels, such as the intensity or the saturation attribute. However if processing is applied to RGB data which contain some degree of scattering of the color values, and a transform from RGB to HSI color space is executed, then the resultant values of saturation will be unstable (i.e., will tend to vary randomly with respect to the correct values) within those regions of the image in which the intensity values are high, and also within those regions of the image in which the intensity values are low. For example, assuming that each of the red, green and blue values of each pixel is expressed by 8bits, so that the range of values is from 0 to 255, then in the case of a region of the image in which the intensity values are low, if any of the red, green or blue values of a pixel within that region should increase by 1, this will result in a large change in the corresponding value of saturation that is obtained by the transform processing operation. Instability of the saturation values will be expressed as noise, i.e., spurious edge portions, in the results of edge detection processing which utilizes these values. For that reason it has been difficult in the prior art to utilize the color saturation information contained in a color image, in image recognition processing.

Furthermore if a substantial degree of smoothing processing is applied to an image which is to be subjected to image recognition, in order to suppress the occurrence of such noise, then this has the effect of blurring the image, causing rounding of the shapes of edges and also merging together any edges which are located closely mutually adjacent. As a result, the accuracy of extracting edge information will be reduced. Conversely, if only a moderate degree of smoothing processing is applied to the image that is to be subjected to image recognition, or if smoothing processing is not applied to the image, then the accuracy of extraction of shapes from the image will be high, but there will be a high level of noise in the results so that reliable extraction of the shapes of the required objects will be difficult to achieve.

Moreover in the prior art, there has been no simple and effective method of performing image recognition processing to extract the shapes of objects which are to be recognized, which will eliminate various small objects in the image that are not intended to be recognized (and therefore can be considered to constitute noise) without distorting the shapes of the objects which are to be recognized.

SUMMARY OF THE INVENTION

It is an objective of the present invention to overcome the disadvantages of the prior art set out above, by providing an image recognition method and image recognition apparatus whereby edge detection for extracting the outlines of objects appearing in a color image can be performed by utilizing all of the color information of the pixels of the color image, to thereby achieve a substantially higher degree of reliability of detecting those pixels which constitute edges of objects that are to be recognized than has been possible in the prior art, and furthermore to provide an image recognition method and apparatus whereby, when such an edge pixel is detected, the direction of the corresponding edge can also be detected.

It is a further objective of the invention to provide an image recognition method and image recognition apparatus whereby processing to extract the shapes of objects which are to be recognized can be performed such as to eliminate the respective shapes of small objects that are not intended to be recognized, without distorting the shapes of the objects which are to be recognized.

To achieve the above objectives, the invention provides an image recognition method and apparatus whereby, as opposed to prior art methods which are based only upon intensity values, i.e., the gray-scale values of the pixels of a color image that is to be subjected to image recognition processing, substantially all of the color information (intensity, hue and saturation information) contained in the color image can be utilized for detecting the edges of objects which are to be recognized. This is basically achieved by successively selecting each pixel to be processed, i.e., as the object pixel, and determining, for each of a plurality of possible edge directions, a vector referred to as an edge vector whose modulus indicates an amount of color difference between two sets of pixels which are located on opposing sides of the object pixel with respect to that edge direction. The moduli of the resultant set of edge vectors are then compared, and the edge vector having the largest modulus is then assumed to correspond to the most likely edge on which the object pixel may be located. That largest value of edge vector modulus is referred to as the "edge strength" of the object pixel, and the direction corresponding to that edge vector is assumed to be the most likely direction of an edge on which the object pixel may be located, i.e., a presumptive edge for that pixel. Subsequently, it is judged that the object pixel is actually located on its presumptive edge if it satisifes the conditions that:

(a) its edge strength exceeds a predetermined minimum threshold value, and (b) its edge strength is greater than the respective edge strength values of the two pixels which are located immediately adjacent to it, on opposing sides with respect to the direction of that presumptive edge.

The above processing can be achieved in a simple manner by predetermining only a limited number of possible edge directions which can be recognized, e.g., 0degrees (horizontal), 90degrees (vertical), 45 degrees diagonal and −45 degrees diagonal. With the preferred embodiments of the invention, a set of arrays of numeric values referred to as edge templates are utilized, with each edge template corresponding to a specific one of the predetermined edge directions, and with the values thereof predetermined such that when the color vectors of an array of pixels centered on the object pixel are subjected to array multiplication by an edge template, the edge vector corresponding to the direction of that edge template will be obtained as the vector sum of the result. The respective moduli of the edge vectors thereby derived for each of the possible edge directions are then compared, to find the largest of these moduli, as the edge strength of the object pixel.

In that way, since all of the color information contained in the image can be utilized to perform edge detection, the detection can be more accurately and reliably performed than has been possible in the prior art.

According to another aspect of the invention, data expressing the color attributes of pixels of a color image which is to be subjected to edge detection processing are first subjected to transform processing to express the color attributes of the pixels of the image as respective sets of coordinates of an appropriate color space, in particular, a color space in which intensity and chrominance information are expressed by separate coordinates. This enables the color attribute information to be modified prior to performing edge detection, such as to optimize the results that will be obtained in accordance with the characteristics of the particular color image that is being processed. That is to say, the relative amount of contribution of the intensity values to the magnitudes of the aforementioned color vectors can be increased, for example. If the color attributes are first transformed into a HSI (hue, saturation, intensity) color space, then since such HSI values are generally expressed in polar coordinates, a simple conversion operation is applied to each set of h, s, i values of each pixel to express the color attributes as a color vector of an orthogonal color space in which saturation information and chrominance information are expressed along respectively different coordinate axes, i.e. to express the pixel color attributes as a plurality of linear coordinates of that color space, and the edge detection processing is then executed.

It is known that when image data are transformed from a form such as RGB color values into an HSI color space, instability (i.e., random large-scale variations) may occur in the saturation values which are obtained as a result of the transform. This instability of saturation values is most prevalent in those regions of a color image where the intensity values are exceptionally low, and also in those regions where the intensity values are exceptionally high. This is a characteristic feature of such a transform operation, and causes noise to appear in the results of edge detection that is applied to such HSI-transformed image data and utilizes the saturation information, due to the detection of spurious edge portions as a result of abrupt changes in saturation values between adjacent pixels. However with the present invention, such instability of the saturation values can be reduced, by modifying the saturation values obtained for respective pixels in accordance with the magnitudes of the intensity values which are derived for these pixels. The noise which would otherwise be generated by such instability of saturation values can thereby be suppressed, enabling more reliable recognition of objects in the color image to be achieved.

According to one aspect of the invention, when a transform into coordinates of the HSI space has been executed, such reduction of instability of the saturation values is then achieved by decreasing the saturation values in direct proportion to amounts of decrease in the intensity values. Alternatively, that effect is achieved by decreasing the saturation values in direct proportion to decreases in the intensity values from a median value of intensity towards a minimum value (i.e., black) and also decreasing the saturation values in direct proportion to increases in the intensity values from that median value towards a maximum value (i.e., white).

According to another aspect of the invention, when a transform into coordinates of the HSI space has been executed, such reduction of instability of the saturation values is then achieved by utilizing a predetermined saturation value modification function (which varies in a predetermined manner in accordance with values of intensity) to modify the saturation values. In the case of a transform from the RGB color space to the HSI color space, that saturation value modification function is preferably derived based on calculating, for each of the sets of r, g, b values expressing respective points in the RGB color space, the amount of actual change which occurs in the saturation value s of the corresponding HSI set of transformed h, s, i values in response to a small-scale change in one of that set of r, g, b values. In that way, a saturation value modification function can be derived which is based on the actual relationship between transformed intensity values and instability of the corresponding saturation values, and can thus be used such as to maintain the saturation values throughout a color image at a substantially constant level, i.e., by varying the saturation values in accordance with the intensity values such as to appropriately compensate in those regions of the color space in which instability of the saturation values can occur.

Noise in the edge detection results, caused by detection of spurious edge portions, can be thereby very effectively suppressed, enabling accurate edge detection to be achieved.

According to another aspect, the invention provides an image recognition method and apparatus for operating on a region image (i.e., an image formed of a plurality of regions expressing the shapes of various objects, each region formed of a continuously extending set of pixels in which each pixel is identified by a label as being contained in that region) to process the region image such as to reduce the amount of noise caused by the presence of various small regions, which are not required to be recognized. This is achieved by detecting each small region having an area that is less than a predetermined threshold value, and combining each such small region with an immediately adjacent region, with the combining process being executed in accordance with specific rules which serve to prevent distortion of the shapes of objects that are to be recognized. These rules preferably stipulate that each of the small regions is to be combined with an immediately adjacent other region which (out of all of the regions immediately adjacent to that small region) has a maximum length of common boundary line with respect to that small region. In that way, regions are combined without consideration of the pixel values (of an original color image) within the regions and considering only the sizes and shapes of the regions, whereby it becomes possible to eliminate small regions which would constitute "image noise", without reducing the accuracy of extracting the shapes of objects which are to be recognized.

The aforementioned rules for combining regions may further stipulate that the combining processing is to be executed repetitively, to operate successively on each of the regions which are below the aforementioned area size threshold value, starting from the smallest of these regions, then the next-smallest, and so on. It has been found that this provided even greater effectiveness in elimination of image noise, without reducing the accuracy of extracting the shapes of objects which are to be recognized.

Alternatively, the region combining processing may be executed on the basis that the aforementioned rules for combining regions further stipulate that, for each of the small regions which are below the aforementioned area size threshold value, the total area of the regions immediately adjacent to that small region is to be calculated, and the aforementioned combining processing is then to be executed starting with the small region for which that adjacent area total is the largest, then the small region for which the adjacent area total is the next-largest, and so on in succession for all of these small regions.

A region image, for applying such region combining processing, can for example be generated by first applying edge detection by an edge detection apparatus according to the present invention to an original color image, to obtain data expressing an edge image in which only the edges of objects appear, then defining each part of that edge image which is enclosed within a continuously extending edge as a separate region, and attaching a common identifier label to each of the pixels constituting that region.

More specifically, the present invention provides an image recognition method for processing image data of a color image which is represented as respective sets of color attribute values of an array of pixels, to successively operate on each of the pixels as an object pixel such as to determine whether that pixel is located on an edge within the color image, and thereby derive shape data expressing an edge image which shows only the outlines of objects appearing in the color image, with the method comprising steps of:

if necessary, i.e., if the color attribute values of the pixels are not originally expressed as sets of coordinates of an orthogonal color space such as an RGB (red, green, blue) color space, expressing these sets of color attribute values as respective color vectors, with each color vector defined by a plurality of scalar values which are coordinates of an orthogonal color space;

for each of a plurality of predetermined edge directions, generating a corresponding edge template as an array of respectively predetermined numeric values;

extracting an array of color vectors as respective color vectors of an array of pixels having the object pixel as the center pixel of that array;

successively applying each of the edge templates to the array of color vectors in a predetermined array processing operation, to derive edge vectors respectively corresponding to the edge directions;

comparing the respective moduli of the derived edge vectors to find the maximum modulus value, designating that maximum value as the edge strength of the object pixel and designating the edge direction corresponding to an edge vector having that maximum modulus as being a possible edge direction for the object pixel; and, judging whether the object pixel is located on an actual edge which is oriented in the possible edge direction, based upon comparing the edge strength of the object pixel with respective values of edge strength derived for pixels which are positioned immediately adjacent to the object pixel and are on mutually opposite sides of the object pixel with respect to the aforementioned possible edge direction.

The invention further provides an image recognition method for operating on shape data expressing an original region image, (i.e., an image in which pixels are assigned respective labels indicative of various image regions in which the pixels are located) to obtain shape data expressing a region image in which specific small regions appearing in the original region image have been eliminated, with the method comprising repetitive execution of a series of steps of:

selectively determining respective regions of the original region image as constituting a set of small regions which are each to be subjected to a region combining operation;

selecting one of the set of small regions as a next small region which is to be subjected to the region combining operation;

for each of respective regions which are disposed immediately adjacent to the next small region, calculating a length of common boundary line with respect to the next small region, and determining one of the immediately adjacent regions which has a maximum value of the length of boundary line; and combining the next small region with the adjacent region having the maximum length of common boundary line.

Data expressing a region image, to be processed by the method set out above, can be reliably derived by converting an edge image which has been generated by the preceding method of the invention into a region image.

The above features of the invention will be more clearly understood by referring to the following description of preferred embodiments of the invention

BRIEF DESCRIPTION OF THE DRAWINGS

FIG. 4 is a diagram illustrating and edge image obtained as a result of applying edge detection to a simplified color image;

FIGS. 9A to 9D are conceptual diagrams for illustrating how the edge strength of an object pixel is compared with the respective edge strengths of pixels which are located adjacent thereto, on opposing sides with respect to an edge direction, for each of the possible edge directions;

FIG. 26 is a table of examples of sets of hue, saturation and intensity values which are derived by transforming the color values of respective regions of the color image represented in FIG. 21 into corresponding values of a cylindrical (i.e., conventional) HSI color space, into an inverse-conical form of modified HSI color space, into a double-conical modified HSI color space, and into a modified cylindrical HSI space respectively;

FIG. 38 is a diagram for use in describing a process of eliminating specific small regions from a region image, performed by the seventh embodiment;

FIG. 44 is a basic flow diagram of the operation of the tenth embodiment;

DESCRIPTION OF PREFERRED EMBODIMENTS

Figure 1:
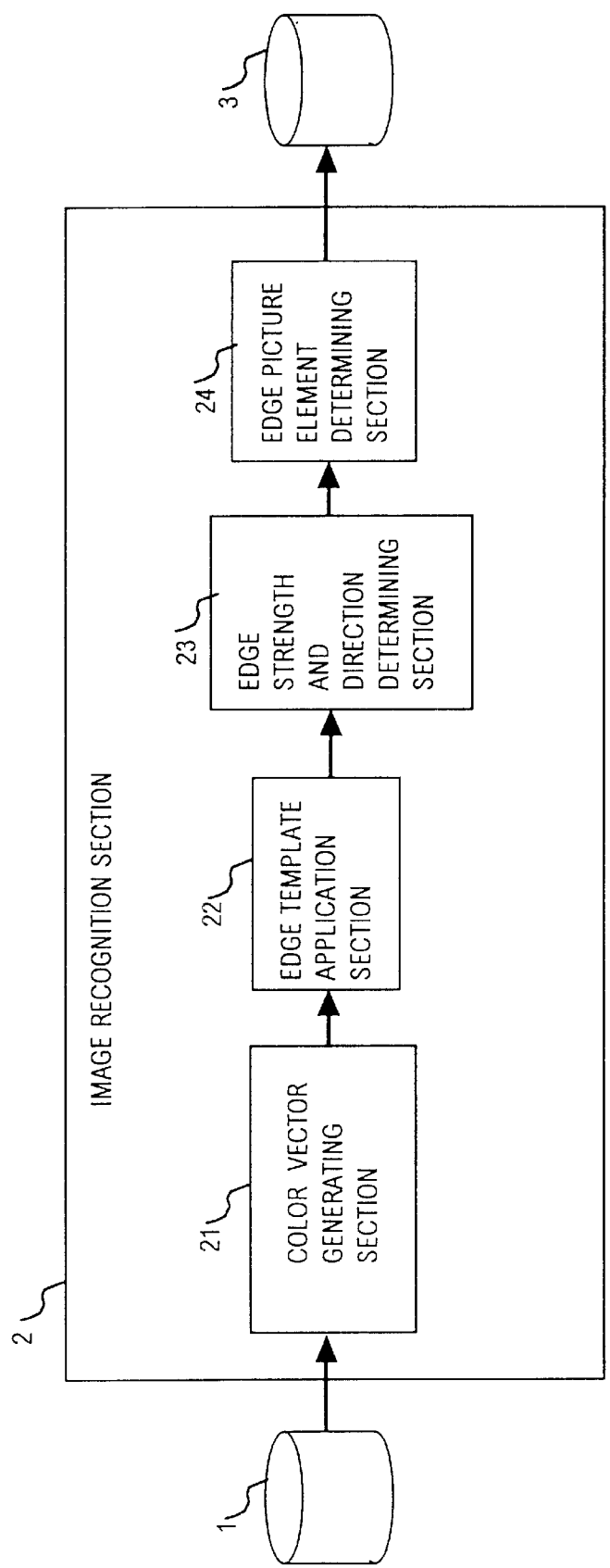
FIG. 1 is a general system block diagram of a first embodiment of an image recognition apparatus according to the present invention.

Embodiments of the present invention will be described in the following, referring to the drawings. It should be noted that the invention is not limited in its scope to these embodiments, and that various other forms of these could be envisaged.

A first embodiment of an image recognition apparatus according to the present invention will be described referring to FIG. 1. As used herein in referring to embodiments of the invention, the term "image recognition" is used in the limited sense of signifying "processing the data of an original color image to derive shape data, i.e., data of an edge image which expresses only the outlines of objects appearing in the original color image". The apparatus is formed of a color image data storage section 1 which stores the data of a color image that is to be subjected to image recognition processing, an image recognition processing section 2 which performs the image recognition processing of the color image data, and a shape data storage section 3 which stores shape data expressing an edge image, which have been derived by the image recognition processing section 2.

The image recognition processing section 2 is made up of a color vector data generating section 21, an edge template application section 22, an edge strength and direction determining section 23 and an edge pixel determining section 24. The color vector data generating section 21 generates respective color vectors for each of the pixels of the color image, with each color vector expressed as a plurality of scalar values which express the color attributes of the corresponding pixel and which are coordinates of an orthogonal color space having more than two dimensions. The edge template application section 22 processes the pixel vector data by utilizing edge templates as described hereinafter, to generate edge vector data. Specifically, using four different edge templates with this embodiment which respectively correspond to four different orientation directions within the color image, a corresponding set of four edge vectors are derived for each of the pixels of the color image. The edge strength and direction determining section 23 operates on each of the pixels of the color image in succession, to determine whether the pixel may be situated on an image, and if so, determines the direction of orientation of that possible edge and its edge strength. The edge pixel determining section 24 operates on the information thus derived by the edge strength and direction determining section 23, to determine those pixels which are actually judged to be edge pixels, and to thereby generate the shape data, i.e., data which express an edge image in which only the outlines of objects in the original color image are represented.

Figure 2:
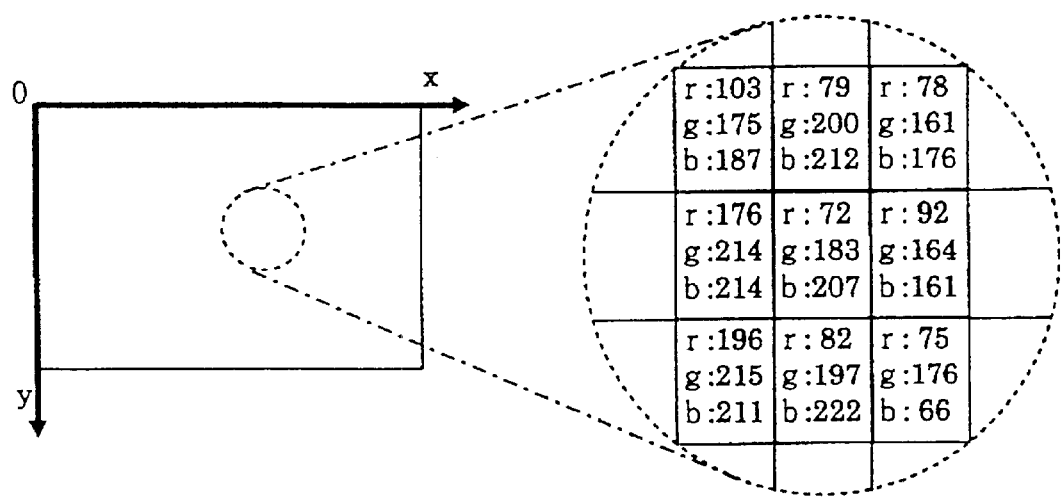
FIG. 2 is a conceptual diagram showing an example of actual color attribute values of pixels in a color image, expressed in terms of an RGB color space.

As shown in the left side of FIG. 2, the image data stored in the color image data storage section 1 are assumed to be represented by respective (x,y) coordinates of points in a 2-dimensional plane, i.e., each pair of values (x,y) corresponds to one specific pixel. It is also assumed that the color attributes of each pixel are expressed as a position in an RGB color space by three scalar values which are coordinates of that space, i.e., as a set of r (red), g (green) and b (blue) values, as illustrated on the left side of FIG. 2. The function of the color vector data generating section 21 is to express the color attributes of each pixel of the color image as a plurality of scalar values which are coordinates of a vector in an orthogonal color space. If such a set of scalar values for each pixel is directly provided from the stored data of the color image data storage section 1 it will be unnecessary for the color vector data generating section 21 to perform any actual processing. However if for example the data of the color image were stored in the color image data storage section 1 in some other form, e.g., with the color attributes of each pixel expressed as a set of polar coordinate, or with respective index values being stored for the pixels, corresponding to respective sets of r, g, b values within a RGB table memory, then the color vector data generating section 21 would perform all processing necessary to convert the data for each pixel to a plurality of scalar values that are coordinates of an RGB orthogonal color space.

Moreover if desired, it would be possible for the color vector data generating section 21 to be controlled to modify the relationships between the magnitudes of the r, g, b values of each pixel, to thereby modify the relative contributions of these to the magnitude of the modulus of a corresponding color vector.

Figure 3:
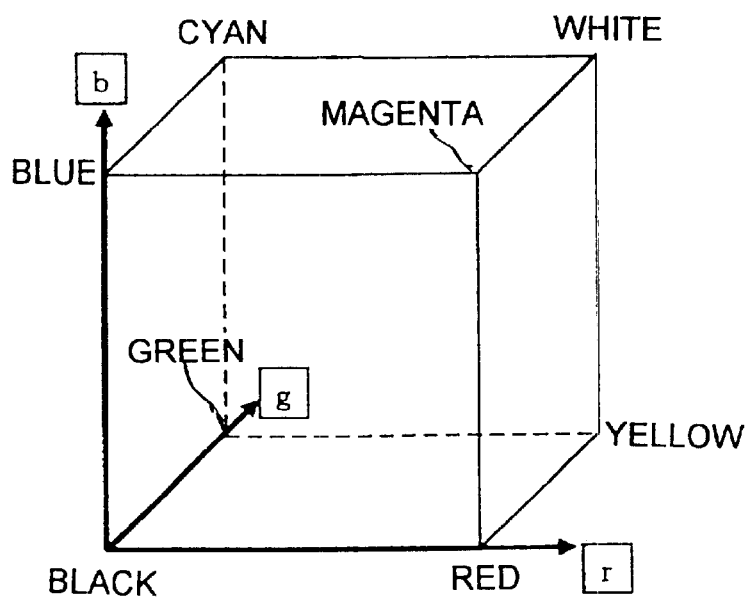
FIG. 3 illustrates an RGB color space.

It will be assumed that each of the r, g and b scalar values is formed of 8bits, so that each value can be in the range 0 to 255. FIG. 3 illustrates the RGB color space of these coordinates.

The data of a color image such as that shown in the upper part of FIG. 4 will be assumed to be stored in the color image data storage section 1, i.e., an image in which the objects are a street 40 and a building 41, in a ground area 42. The image recognition processing section 2 applies edge detection to this image, to thereby obtain an edge image as shown in the lower part of FIG. 4, which is stored in the shape data storage section 3. The edge image is a bi-level image, i.e., the black lines in the lower part of FIG. 4 correspond to pixels which are situated along the edges of objects which appear in the original color image, while the white portions correspond to pixels which do not correspond to edges. Basically, the edge detection that is executed by the image recognition processing section 2 serves to detect the change between the color of the road 40 and the color of adjacent areas, and between the color of the building 41 and the color of adjacent areas, and to judge that each position where the amount of such change is large corresponds to the position of an edge. The shapes of the street and building are thereby detected as the shapes 50, 51 respectively, shown in the lower part of FIG. 4.

Figure 5:
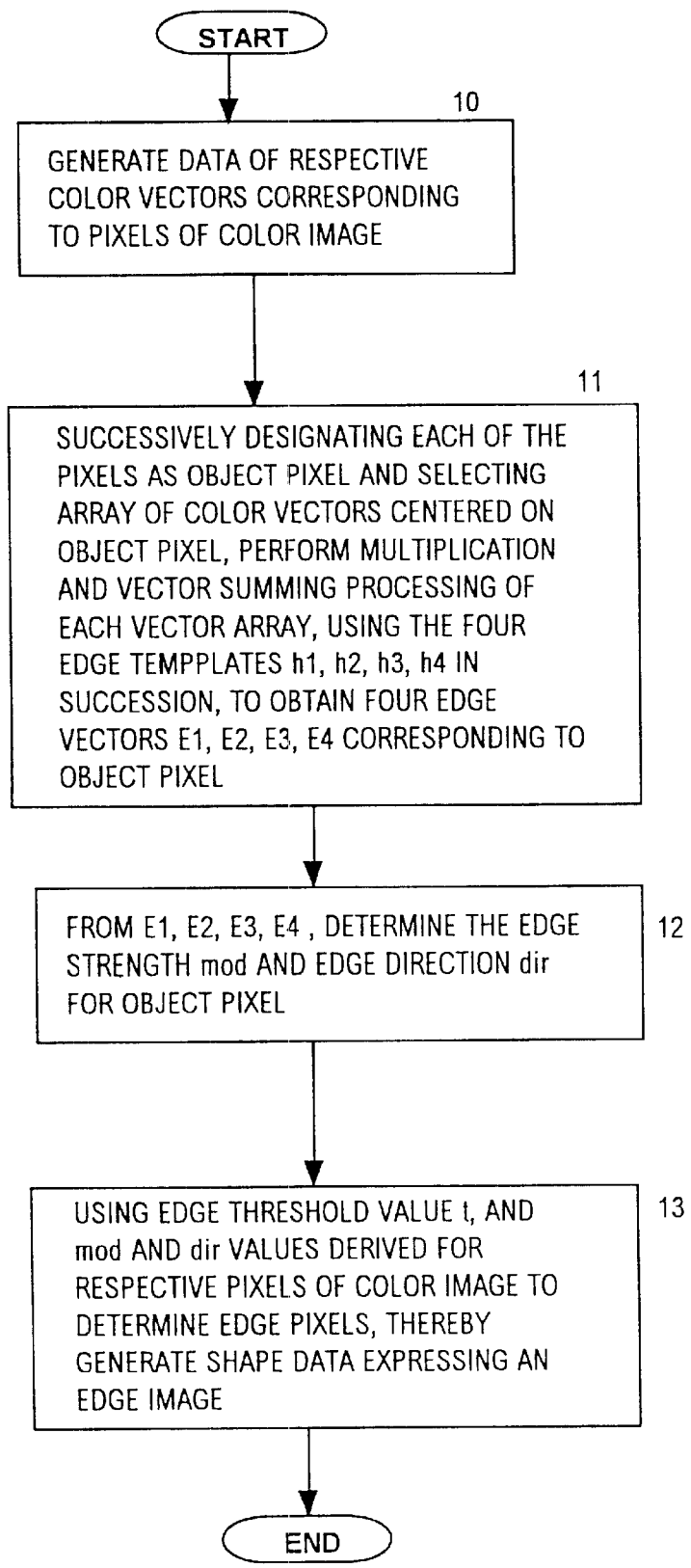
FIG. 5 is a basic flow diagram of the operation of the first embodiment.

FIG. 5 is a flow diagram showing the basic features of the operation of the first embodiment, which is executed as follows. Step 10: Respective color vectors are derived for each of the pixels of the color image, with each color vector expressed as a combination of scalar values, which in this instance are constituted by the aforementioned r, g and b values of the pixel. The color vector of a pixel at position (x, y) of the color image, having the RGB scalar values r(x, y), g(x, y), b(x, y), is expressed by equation (1) below $$PV(x, y) = \begin{pmatrix} r(x, y) \\ g(x, y) \\ b(x, y) \end{pmatrix} \quad (1)$$

Figure 6A:
FIGS. 6A to 6D are conceptual diagrams showing respective edge templates used with the first embodiment, and corresponding edge directions.
Figure 6B:
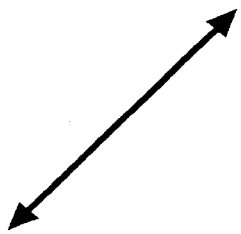
Figure 6C:
Figure 6D:
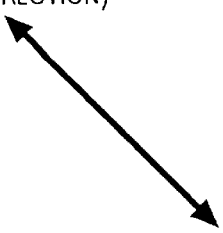

Step 11: local multiplication and summing operations are performed using the four edge templates h1, h2, h3, h4, to thereby generate edge template data EV1, EV2, EV3, EV4 for each of the pixels of the color image. FIGS. 6A, 6B, 6C, 6D respectively show the four edge templates designated as h1, h2, h3, h4 which are utilized with this embodiment. In FIG. 6A, h1 is an edge template corresponding to an edge that is oriented in the left-right direction of the color image, and returns a large value when this template is applied to an image position where there is an edge that extends along the right-left direction. Similarly in FIG. 6B, h2 is an edge template for the lower left-upper right diagonal direction, in FIG. 6C h3 is an edge template for the top-bottom direction, and in FIG. 6D h4 is an edge template for the lower right-upper left diagonal direction. As shown, each edge template basically consists of an array of numeric values which are divided into two non-zero sets of values, of mutually opposite sign, which are located symmetrically with respect to a line of zero values that is oriented in the edge direction corresponding to that edge template.

The values 0, 1, 2, −2 and −1 of the edge template h1 can be expressed as shown in equations (2) below.

$h1 (1,−1)=1, h1 (0,−1)=2, h1 (1,−1)=1$ $h1 (−1, 0)=0, h1 (−0, 0)=0, h1 (1, 0)=0$ $h1 (−1,−1)=−1, h1 (0, 1)=−2, h1 (1, 1)=−1 \quad (2)$ The multiplication and summing processing that is applied between the four both-direction edge templates and PV(x, y) is expressed by equations (3) below.

$$EV1(x, y) = \sum_{k=-1}^{1} \sum_{l=1}^{1} h1(k, 1)PV(x+k, y+1)$$

$$EV2(x, y) = \sum_{k=-1}^{1} \sum_{l=1}^{1} h2(k, 1)PV(x+k, y+1)$$

$$EV3(x, y) = \sum_{k=-1}^{1} \sum_{l=1}^{1} h3(k, 1)PV(x+k, y+1)$$

$$EV4(x, y) = \sum_{k=-1}^{1} \sum_{l=1}^{1} h4(k, 1)PV(x+k, y+1)$$

(3)

The above signifies that, designating the image position of the pixel that is currently being processed (i.e., the object pixel) as (x, y), a first edge vector EV1(x, y) is obtained by multiplying the color vector P(x−1, y−1) of the pixel which is located at the image position (x−1, y−1) by the scalar value that is specified for the (−1, −1) position in the edge template h1, i.e. by the value 1, multiplying the color vector P(x, y−1) of the pixel which is located at the image position (x, y−1) by the scalar value that is specified for the (0, −1) position in the edge template h1, i.e. by the value 2, and so on. In that way, the edge template hi is applied to the color vector of the object pixel and to the respective color vectors of eight pixels which are located immediately adjacent to the object pixel in the color image. A set of nine vectors is thereby obtained, and the vector sum of these is then calculated, to obtain a first edge vector EV1(x,y).

The above array multiplication and vector summing process is applied using the other three edge templates h2, h3, h4 in the same manner, to the object pixel and its adjacent pixels, to obtain the edge vectors EV2(x,y), EV3(x,y) and EV4(x,y) respectively corresponding to these other three edge templates. The above process is executed for each of the pixels of the color image in succession, as the object pixel.

Figure 7:
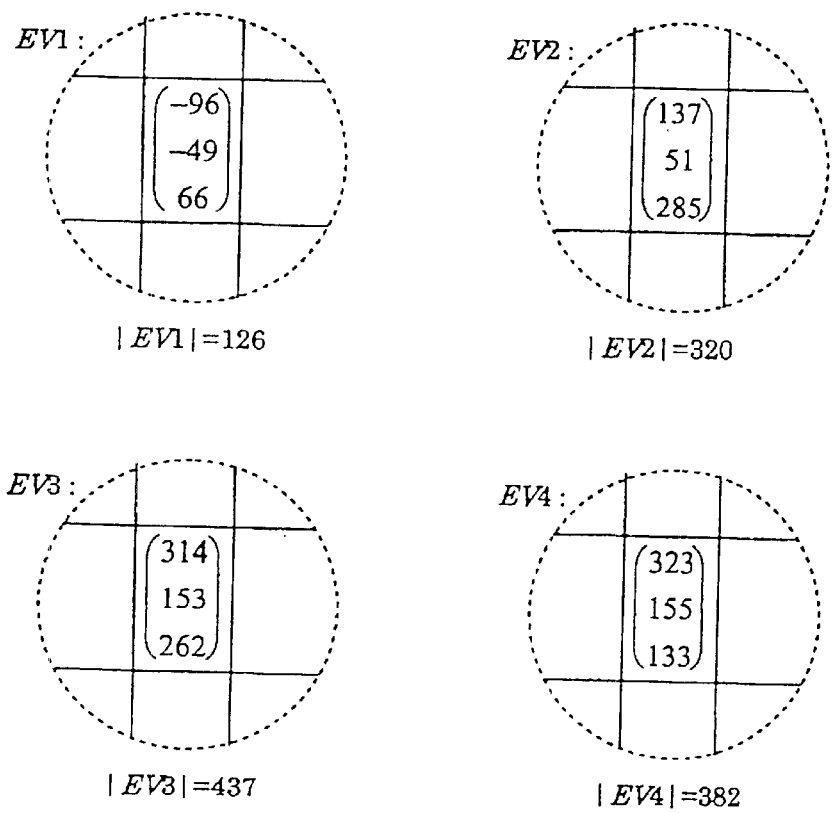
FIG. 7 shows examples of a set of edge vectors.

FIG. 7 shows the four edge vectors that are obtained as a result of applying the four edge templates of FIG. 6 to the color vector (r, g, b values 72, 183, 207 respectively) of the center pixel in the diagram at the right side of FIG. 2. EV1 is the edge vector corresponding to the left-right direction, EV2 corresponds to the lower left-upper right diagonal direction, EV3 corresponds to the bottom-top direction, and EV4 corresponds to the lower right-upper left diagonal direction.

Step 12: Using these edge vectors EV1, EV2, EV3, EV4, the strength and orientation of an edge on which the object pixel may be located are determined. That edge will be referred to in the following as the "presumptive edge" obtained for the object pixel, which may or may not be subsequently confirmed to be an actual edge as described hereinafter. The strength of the presumptive edge obtained for the object pixel having the image position (x, y), which is obtained as the value of the largest of the four moduli of the edge vectors EV1, EV2, EV3, EV4, will be designated as "MOD(x,y)", and the direction of that presumptive edge will be designated as "DIR(x,y)". That is to say, applying processing in accordance with equation (4) below, respective values of strength of the presumptive edge, MOD(x,y) is obtained for each of the pixels of the color image in succession, and the strength values are stored temporarily.

$mod(x, y)=max(|EV1(x, y)|, |EV2(x, Y)|, |EV3(x, y)|, |EV4(x, y)|)(4)$

If it is found when attempting to apply equation (4) that none of the moduli of the edge vectors obtained for a pixel exceeds all of the other edge vector moduli obtained for that pixel, then this may result from all of the moduli of the edge vectors EV1(x,y), EV2(x,y), EV2(x,y), EV3(x,y) corresponding to the respective edge templates h1 to h4 being of equal magnitude. In that case no possible edge direction is obtained for the object pixel, however the modulus value of the edge vectors is stored, as the edge strength value MOD obtained for that pixel, for use in subsequent processing.

Next, successively selecting each of the pixels (i.e., those pixels for which a presumptive edge has been obtained) as the object pixel and applying processing in accordance with equation (5) below, the orientation of the presumptive edge, designated in the following as DIR(x,y), is obtained for each of the pixels. That orientation is the direction corresponding to the edge template whose application resulted in generation of the edge strength value MOD(x,y) for that pixel. Information specifying the obtained edge directions for the respective pixels is temporarily stored.

"Left-right" if mod(x, . . . y)=|EV1(x,y)|"Lower left-top right" if mod (x,y,)=|EV2(x,y)|dir(x, y)="Bottom-top" if mod (x,y)= |EV3(x, y)|"Lower right-top left" if mod (x,y)=|EV4(x,y)|  (5)

Figure 8:
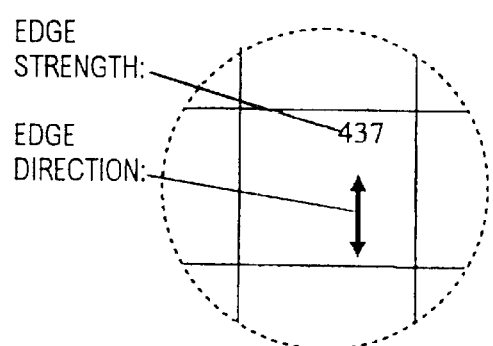
FIG. 8 is a diagram illustrating how one of the edge vectors of FIG. 7 defines the edge strength and possible edge direction for a pixel.

For example, comparing the magnitudes of the respective moduli of the edge vectors shown in FIG. 7, the magnitude for EV3 is 437, which is larger than the magnitudes of each of the other edge vector moduli, so that as shown in FIG. 8, the strength MOD of the presumptive edge of that pixel is obtained as 437. Also, since that edge strength value corresponds to the edge template h3 shown in FIG. 6, the edge direction of that presumptive edge is determined as being the bottom—top direction of the color image.

Step 13: the edge image data "EDGE" are generated, using a predetermined edge strength threshold value t, the respective presumptive edge strength values "MOD" obtained for the pixels of the color image and the respective edge directions "DIR" obtained for the pixels, in the manner indicated by equation (6) below edge(x,y)="ledge" if:

(mod(x,y)≧t&((dir(x,y)="left-right" direction &mod(x,y)>mod(x,y−1)&mod(x,y)>mod(x,y+1)), or if (mod(x,y)≧t&((dir(x,y)="lower left-top right" direction &mod(x,y)>mod(x−1,y−1)&mod(x,y)>mod(x+1,y+1)), or if (mod(x,y)≧t&((dir(x,y)="bottom-top" direction &mod (x,y)>mod(x−1,y)&mod(x,y)>mod(x+1,y)), or if (mod(x,y)≧t&((dir(x,y)="left-right" direction &mod(x, y)>mod(x,y−1)&mod(x,y)>mod(x,y+1)).

Otherwise, edge(x,y)≠"edge"  (6)

That is to say, the pixels for which respective presumptive edges (i.e., possible edge directions) have been derived are successively selected as the object pixel, with the threshold value t, edge strength MOD(x,y) and edge direction DIR(x, y) of the object pixel being used to make a decision as to whether or not the object pixel actually is an edge pixel. With equation (6), if a pixel has an edge strength that is higher than t, and the relationship between that pixel and the adjacent pixels satisfies one of the four patterns which are shown in FIGS. 9A to 9C, then it is judged that this is an edge pixel.

More specifically, numeral 200 in FIG. 9A designates an array of six pixels of the color image, centered on a pixel 202 which is currently being processed as the object pixel. The designations "weak", "strong" indicate the relationships between the respective values of strength that have been previously obtained for the pixels as described above. In FIG. 9A, it is assumed that the edge strength MOD obtained for pixel 202 is the edge vector modulus that is obtained by using the edge template h1 shown in FIG. 6, i.e., EV1(x,y) in equation (3) described above, and hence the orientation DIR of the presumptive edge corresponding to pixel 202 is the left-right direction of the color image, i.e. a presumptive edge has been derived for pixel 202 as a straight line of undefined length which passes through that pixel and is oriented in the horizontal direction of FIG. 9A. It is further assumed in FIG. 9A that the respective values of edge strength derived for the two pixels 201, 203 which are immediately adjacent to the object pixel 202 and disposed on opposing sides of the presumptive edge derived for the object pixel 202 are both less than the value of strength that has been derived for the presumptive edge of the object pixel 202. In that condition, if that edge strength value obtained for the object pixel 202 exceeds the edge threshold value t, then it is judged that pixel 202 is located on an actual edge within the color image.

Similarly in FIG. 9B, the presumptive edge that has been derived for the object pixel 205 is a line extending through the pixel 205, oriented in the lower left-upper right diagonal direction of the color image, and the respective values of strength derived for the two pixels 204, 206 which are immediately adjacent to the object pixel 205 and disposed on opposing sides of the presumptive edge derived for the object pixel 205 are both less than the value of strength that has been derived for the presumptive edge of the object pixel 205. Thus in the same way as for the example of FIG. 9A, assuming that the edge strength value obtained for the object pixel 205 exceeds the edge threshold value t, it will be judged that pixel 205 is located on an actual edge, oriented diagonally as shown in FIG. 9B within the color image. In a similar way, it will be judged that the object pixel is located on an actual vertically oriented edge if the pattern condition of FIG. 9C is satisfied, or on an actual edge which is oriented along the lower right-upper left diagonal direction, if the pattern condition of FIG. 9D is satisfied.

As can be understood from the above description, the effect of applying one of the edge templates shown in FIGS. 6A to 6D to an array of color vectors centered on an object pixel is to obtain (as an edge vector) the vector difference between the weighted vector sum of the color vectors of a first set of pixels which are located on one side of the object pixel with respect to the edge direction of that template (i.e., whose vectors are multiplied by 1, 2, and 1 respectively) and the weighted vector sum of the color vectors of a second set of pixels which are located on the opposite side of the object pixel (i.e., whose vectors are multiplied by −1, −2 and −1, respectively). It will be further understood that the invention is not limited to the configurations of edge templates utilized with this embodiment.

Figure 11:
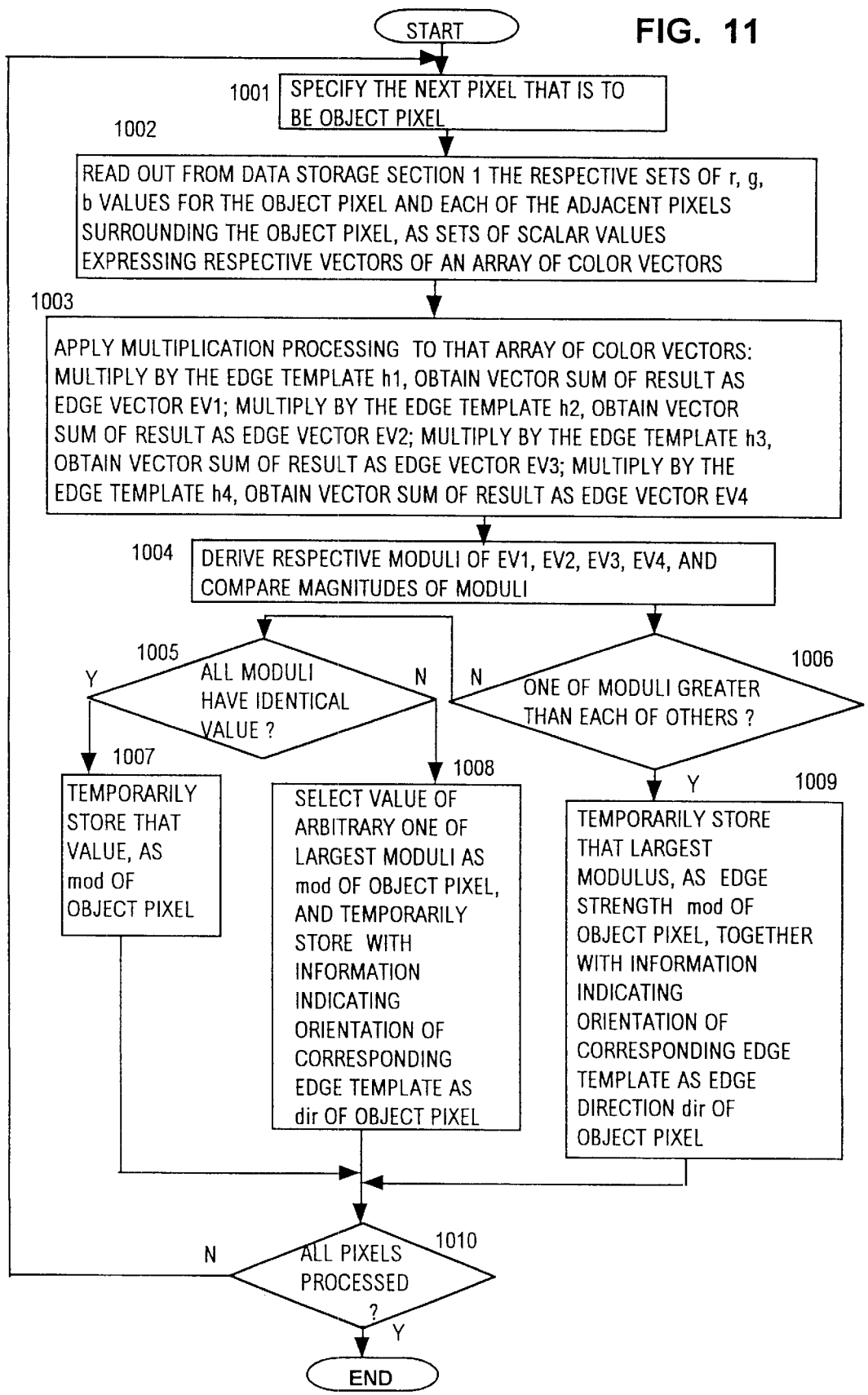
FIG. 11 is a flow diagram showing details of processing to derive edge strength and possible edge direction information for each of the pixels of a color image in succession, with the first embodiment of the invention.

FIG. 11 is a flow diagram showing details of the processing performed in steps 10 to 12 of FIG. 5, to derive the edge vectors and the edge strength "mod" and edge direction "dir" information for the pixels of the color image that is to be processed. The sequence of steps 1001 to 1010 of FIG. 11 are repetitively executed for each of the pixels of the color image in succession, i.e., with the pixels being successively selected as the object pixel for which mod and dir information are to be derived. In step 1002, a plurality of scalar values expressing a color vector in that orthogonal RGB color space for the object pixel are read out from the color image data storage section 1 (i.e., the r, g and b values for the object pixel) as are also the respective sets of RGB values expressing the color vectors of the group of eight pixels which are immediately adjacent to the object pixel and surround the object pixel. In step 1003 that array of nine color vectors is successively multiplied by each of the arrays of values which constitute the edge templates h1, h2, h3 and h4, in the manner described hereinabove, with the respective vector sums of the results being obtained as the edge vectors EV1, EV2, EV3 and EV4. In step 1004, the moduli of these edge vectors are obtained and are compared, to find if one of these is greater than each of the other three. If this condition is met, as determined in step 1006, then that largest value of modulus is temporarily stored in an internal memory (not shown in the drawings) as the edge strength MOD(x,y) of the object pixel, together with information indicating the direction corresponding to that largest edge vector as the orientation DIR(x,y) of the object pixel.

However if the condition whereby one of moduli of EV1, EV2, EV3 and EV4 is greater than each of the other three is not satisfied then step 1005 is executed to judge whether all of the vector moduli have the same value. If that condition is found, then no direction can be obtained as DIR(x,y) for the object pixel, and only that modulus value is stored as the edge strength MOD(x,y) for the object pixel, in step 1007. If that condition is not found (i.e., two or three of the vector moduli have the same value, which is greater than that of the remaining one(s)) then the modulus of an arbitrarily selected one of the edge vectors which have the largest value is selected as the edge strength MOD(x,y) of the object pixel, while the orientation of the edge template corresponding to that selected edge vector is stored as the edge direction DIR(x,y) of the object pixel, in step 1008.

Figure 12:
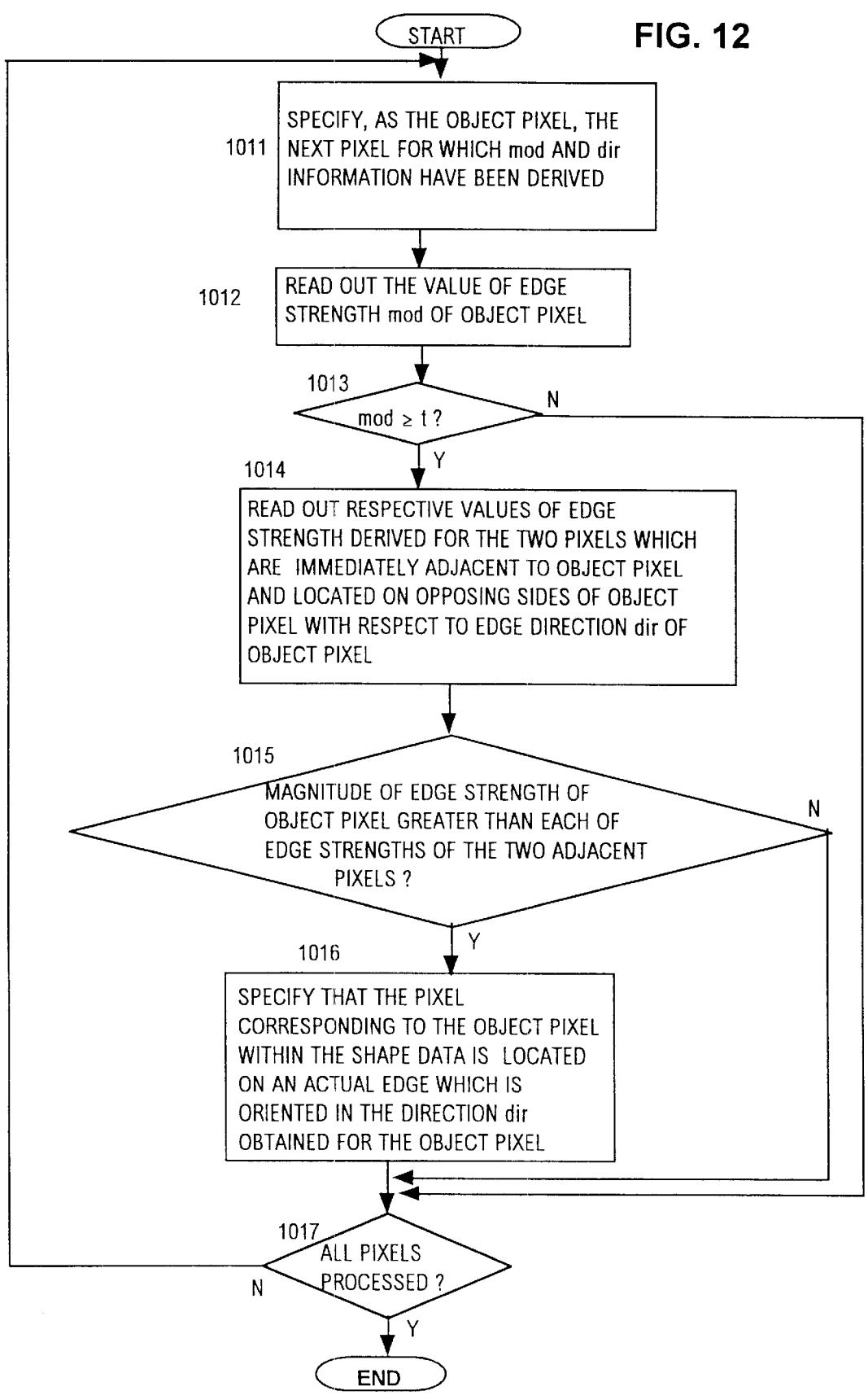
FIG. 12 is a flow diagram showing details of processing, executed using the edge strength and edge direction information derived in the flow diagram of FIG. 11, to determine those pixels of the color image which are located on actual edges.

FIG. 12 is a flow diagram showing details of the processing performed in step 13 of FIG. 5, to derive the shape data which are to be output and stored in the image recognition processing section 2, i.e., to find each of the pixels which is actually located on an edge within the color image, and the corresponding edge direction. The sequence of steps 1011 to 1017 of FIG. 12 is successively applied to each of the pixels of the color image for which edge direction information DIR has been derived and temporarily stored, together with corresponding edge strength information MOD, as described above. In steps 1011, 1012 the next pixel to which this processing is to be applied as the object pixel is selected, and the edge strength MOD(x,y) and edge direction DIR(x,y) information for that object pixel are read out. If it is judged in step 1013 that the value of MOD(x,y) is greater than or equal to the edge threshold value t, then step 1004 is executed, to read out the respective values of edge strength of the two pixels which are located immediately adjacent to the object pixel and on mutually opposite sides of the presumptive edge that has been detected for the object pixel.

Next, in step 1015, the three values of edge strength are compared, to determine if the edge strength MOD(x,y) of the object pixel is greater than the edge strengths of both these adjacent pixels. If so, then the pixel which corresponds in position to the object pixel within the image expressed by the shape data (i.e., the edge image) is specified as being located on an actual edge, which is oriented in the direction DIR(x,y). In that way, the shape data expressing the edge image are successively derived as binary values which indicate, for each pixel of the color image, whether or not that pixel is located on an edge.

It can thus be understood that with the above processing, a pixel of the color image, when processed as the object pixel, will be judged to be located on an actual edge within the color image if it satisfies the conditions:

(a) an edge direction DIR, and also a value of edge strength MOD that exceeds the edge threshold value t, have been obtained for that object pixel, and (b) the edge strength MOD of that object pixel is greater than each of the respective edge strengths of the two pixels which are located immediately adjacent to the object pixel and are on mutually opposite sides of a presumptive edge (i.e., a line which is oriented in direction DIR, passing through that pixel) that has been obtained for the object pixel.

Figure 13:
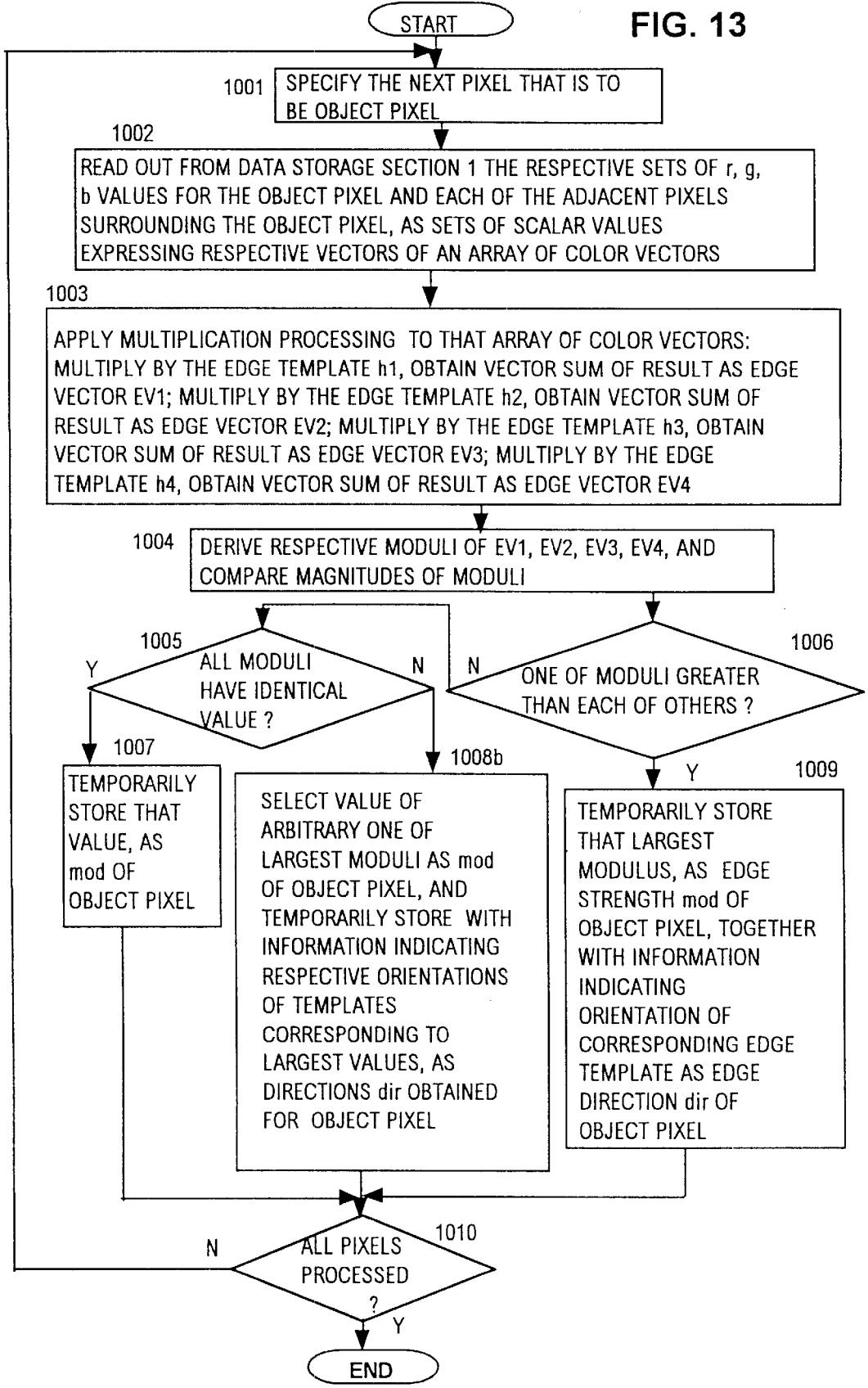
FIGS. 13, 14 are flow diagrams showing alternative forms of the processing executed in the flow diagrams of FIGS. 12 and 13 respectively.
Figure 14:
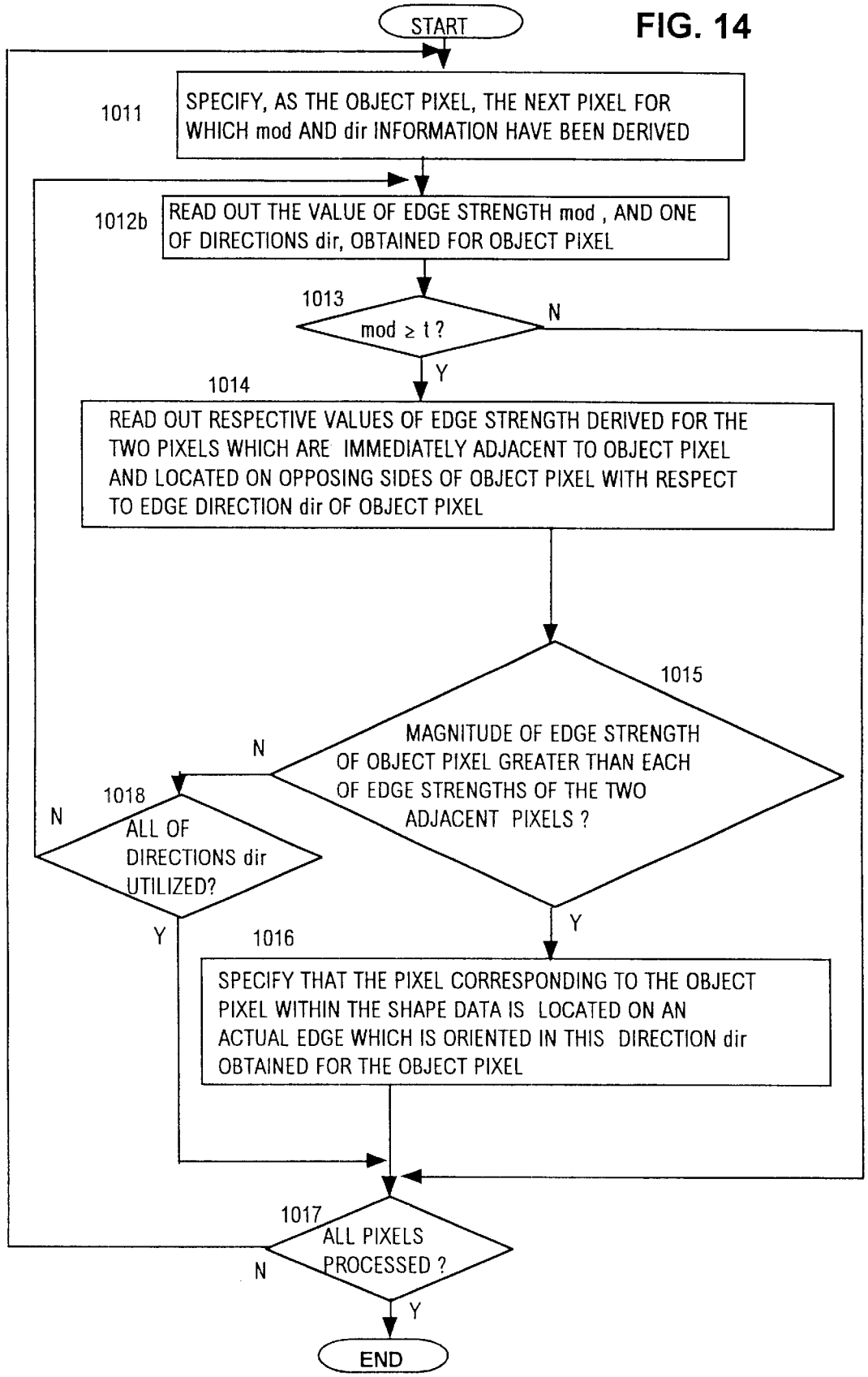

With the operation of FIG. 11, FIG. 12 described above, in the event that it is found in step 1005 that there are a plurality of edge vectors having the same magnitude of modulus, which is greater than that of the remaining vector (s), for example if the moduli of EV1, EV2 are identical and each are larger than the respective moduli of EV3, EV4, then the edge direction corresponding to an arbitrarily selected one of the largest edge vectors is selected to be used as the edge direction DIR of the object pixel, in step 1008. However various other procedures could be used when such a condition occurs. An alternative procedure is illustrated in the flow diagrams of FIGS. 13, 14. In step 1008b of FIG. 13, the respective edge template directions corresponding to each of the edge vectors having the largest moduli are all stored as candidates for the edge direction DIR of the object pixel, together with the maximum edge vector modulus value as the edge strength MOD. In that case, as shown in FIG. 14, if the pixel which has been selected as the object pixel in step 1011 is found to have a plurality of corresponding candidate edge directions DIR stored, then the information specifying these different directions are successively read out in repetitions of a step 1012b. That is to say, the processing of steps 1012b to 1015 is repetitively executed for each of these directions until either it is found that the condition of step 1015 is satisfied (the pixel is judged to be on an actual edge) or all of the candidate edge directions for that pixel have been tried, as judged in step 1018. In other respects, the processing shown is identical to that of FIGS. 11, 12 described above.

Figure 10:
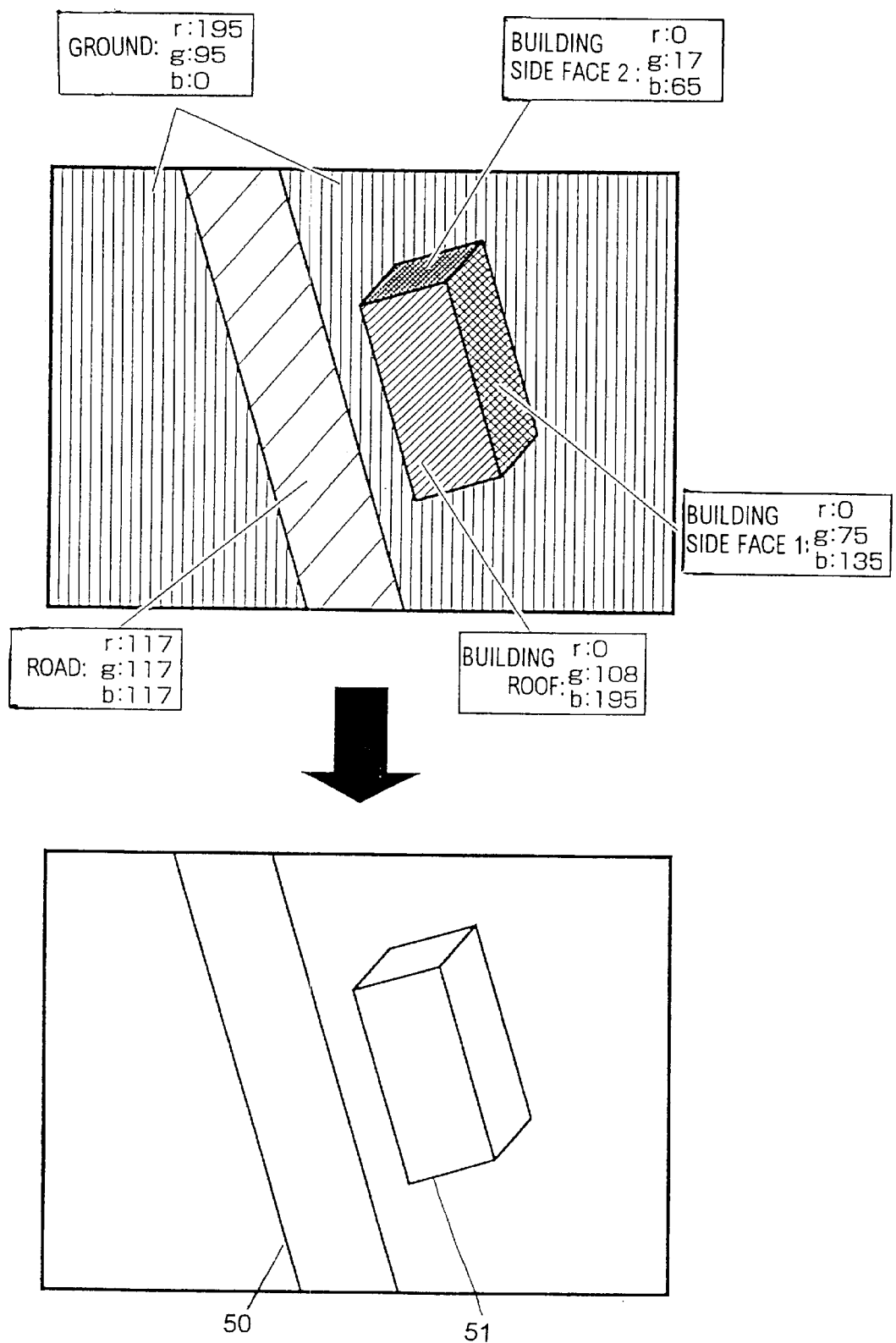
FIG. 10 is a diagram for use in describing how an edge image is obtained as a result of applying edge detection by the apparatus of the first embodiment to a simplified color image.

A specific example will be described in the following. The upper part of FIG. 10 shows data of a color image, expressed as coordinates of an RGB color space, representing a simplified aerial photograph which is to be subjected to image recognition. The image is identical to that of FIG. 4, containing a street, ground, and a building, with the building roof and first and second side faces of the building appearing in the image. Respective RGB values for each of these are assumed to be as indicated in the drawing.

For example it is assumed that each of the pixels representing the ground surface have the r, g and b values 195, 95 and 0 respectively. By applying the first embodiment of the invention to this image to process the data of the color image in the manner described above, bi-level shape data are obtained from the image recognition processing section 2 and stored in the shape data storage section 3, with the shape data expressing the outlines of the street and the building roof and side faces in the form of edges, as shown in the lower part of FIG. 10, i.e., with the shape of the street formed as two edges 50, and the shape of the building roof and side faces being formed as the set of edges 51.

As described above, with the present invention, pixel vector data are generated as combinations of pluralities of scalar values constituting pixel values, and edge detection is performed by operating on these pluralities of scalar values. With prior art types of edge detection which operate only upon values of intensity, even if the outlines of a body exist within an image but the outlines are not in the form of variations in intensity, then edge detection cannot be achieved for that body. However with the present invention, in such a condition, edge detection becomes possible.

Furthermore, by applying edge templates to pixel vector data, edge directions can be obtained easily and reliably. If the direction of an edge is known, then it becomes possible to form that edge as a continuous line (as expressed in the shape image that is generated) even if all of the pixels corresponding to that edge are not detected. That is to say, if the direction of an edge can be reliably obtained on the basis of a part of the pixels of that edge, then interpolation of the remaining pixels can readily be performed, to thereby eliminate any breaks in the continuity of the edge. For that reason, the basic feature of the present invention whereby it is possible not only to detect the strengths of edges, but also to reliably estimate their directions, is highly important.

Figure 15:
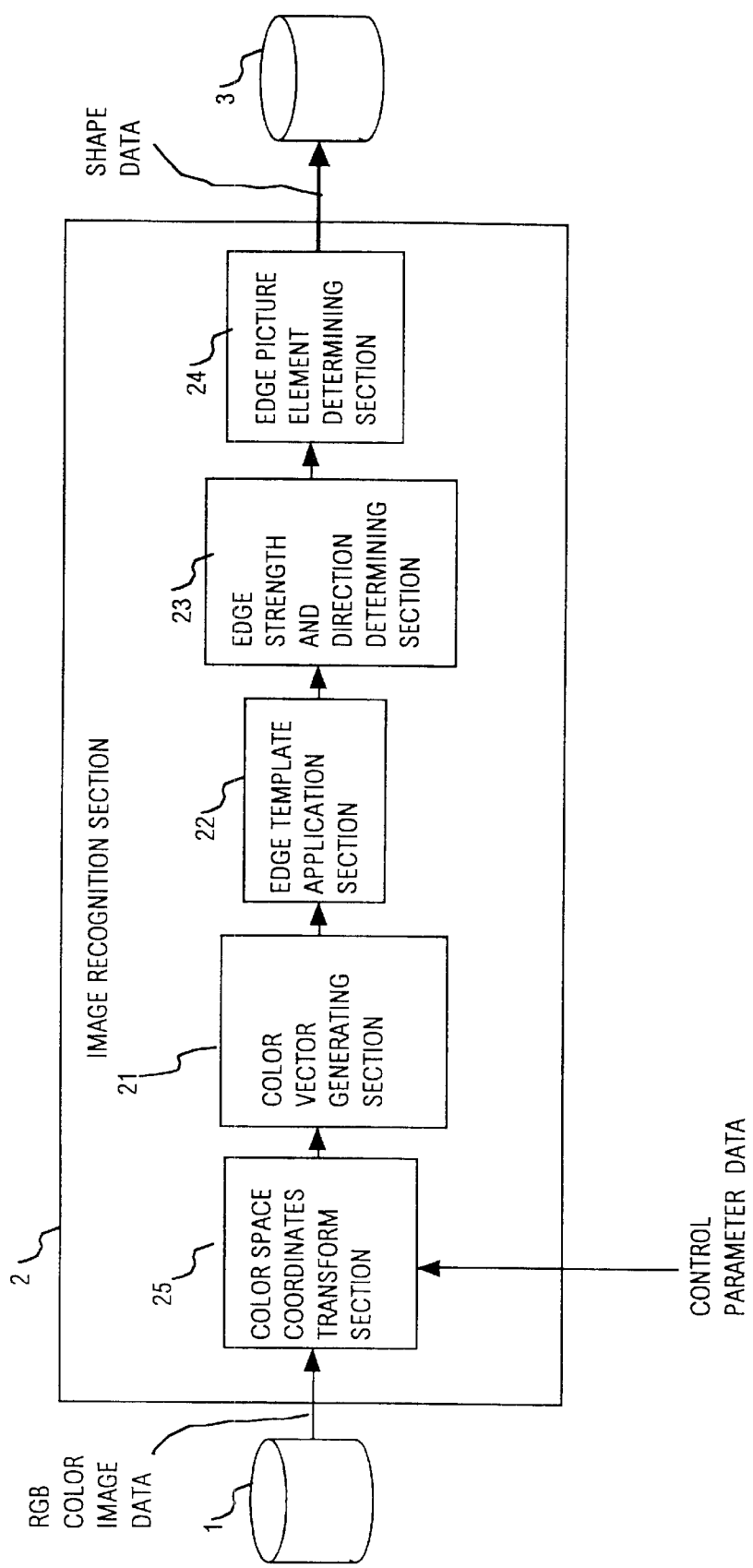
FIG. 15 is a general system block diagram of a second embodiment of an image recognition apparatus according to the present invention.

A second embodiment of an image recognition apparatus according to the present invention is shown in the general system block diagram of FIG. 15. Here, sections having similar functions to those of the apparatus of the first embodiment shown in FIG. 1 are designated by identical reference numerals to those of FIG. 1. In the apparatus of FIG. 15, the color vector data generating section 121 performs a similar function to that of the color vector data generating section 21 of the first embodiment, but in addition receives control parameter adjustment data, supplied from an external source as described hereinafter. In addition, the apparatus of FIG. 15 further includes a color space coordinates conversion section 25 is for performing color space coordinate transform processing. The data stored in the image data storage section 1, which in the same way as described for the first embodiment will be assumed to directly represent a color image as sets of r, g, b values that are coordinates of an RGB color space, are transformed to cords of a different orthogonal color space, specifically, a color space in which chrominance and intensity values are mutually separated. Color vectors are then generated for each of the pixels data by the color vector data generating section 121 using the results of the transform operation.

Figure 16:
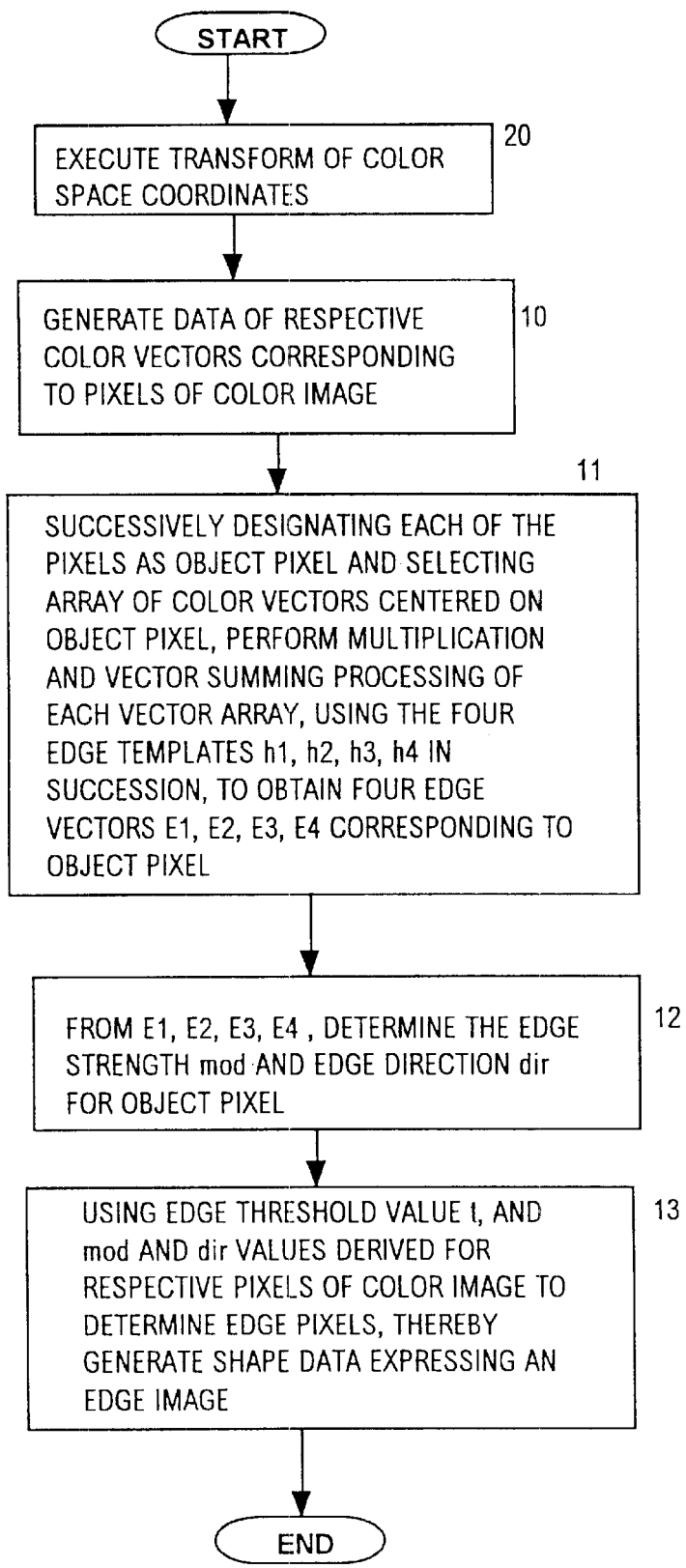
FIG. 16 is a basic flow diagram of the operation of the second embodiment.

FIG. 16 is a flow diagram showing the basic features of the operation of the second embodiment.

Steps 11, 12 and 13 of this flow diagram are identical to those of the basic flow diagram of the first embodiment shown in FIG. 5. Step 10 of this flow diagram differs from that of the first embodiment in that color vector modulus adjustment can be performed, as described hereinafter. A new step 20 is executed as follows.

Figure 17:
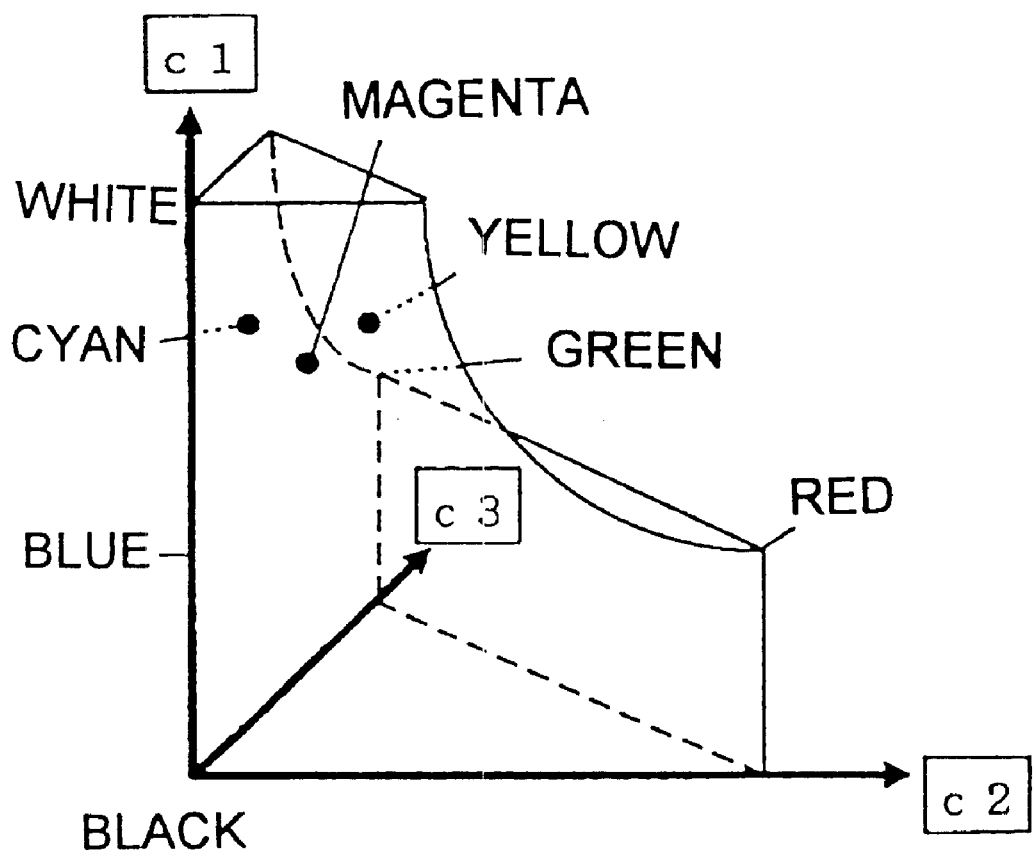
FIG. 17 is a diagram illustrating an orthogonal color space utilized with the second embodiment, in which the respective proportions of color values of a pixel are expressed as coordinate values, rather than the color values themselves.

Step 20: the color attribute data of each pixel are transformed from the RGB color space to coordinates of the color space shown in FIG. 17. Specifically, each set of pixel values r(x, y), g(x, y), b(x, y) is operated on, using equation (7), to obtain a corresponding set of coordinates c1(x, y), c2(x, y), c3(x, y). Here, c1 expresses a form of intensity value for the pixel, i.e., as the average of the r, g and b values of the pixel, c2 expresses the proportion of the red component of that pixel in relation to the total of the red, green and blue values for that pel, and C3 similarly expresses the proportion of green component of that pixel in relation to the total of the red, green and blue values of that pixel.

$$c1(x, y) = \frac{r(x, y) + g(x, y) + b(x, y)}{3} \quad (7)$$

$$c2(x, y) = \frac{r(x, y)}{r(x, y) + g(x, y) + b(x, y)} \cdot \text{max\_value}$$

$$c3(x, y) = \frac{g(x, y)}{r(x, y) + g(x, y) + b(x, y)} \cdot \text{max\_value}$$

As can be understood from the above equation and FIG. 17, the color attributes of a pixel having the maximum r value (i.e., 255) and zero g and b values, in the RGB color space, are expressed as a position within the color space of FIG. 17 which has the c1, c2 c3 coordinates (255/3, 255, 0). This is the point designated as "red" in FIG. 17. Similarly, points which correspond to the "maximum blue component, zero red and green components" and "maximum green component, zero red and blue components" conditions within the RGB color space are respectively indicated as the "blue" and "green" points in FIG. 17.

Step 10: the pixel vector data PV are generated from the pixel values. Pixel vector data are generated for each pixel based on a combination of the attribute values of the pixel. A vector data set PV(x, y) is generated for each of the pixels, by applying equation (8) below to the pixel values c1(x, y), c2(x, y), c3(x, y). By adjusting the parameters a1, a2 and a3 of equation (8), through input of control parameter adjustment data to the color vector data generating section 121, it is possible to determine whether the edge detection will be based mainly on the c1 values, the c2 values, or on the c3 values, i.e., the relative contributions made by the c1, c2 and c3 coordinates of a color vector to the magnitude of the modulus of the color vector can be adjusted by altering the values of the control parameters a1, a2 and a3. The resultant color vector is expressed as follows.

$$PV(x, y) = \begin{pmatrix} a1 \cdot c1(x, y) \\ a2 \cdot c2(x, y) \\ a3 \cdot c3(x, y) \end{pmatrix} \quad (8)$$

Figure 19:
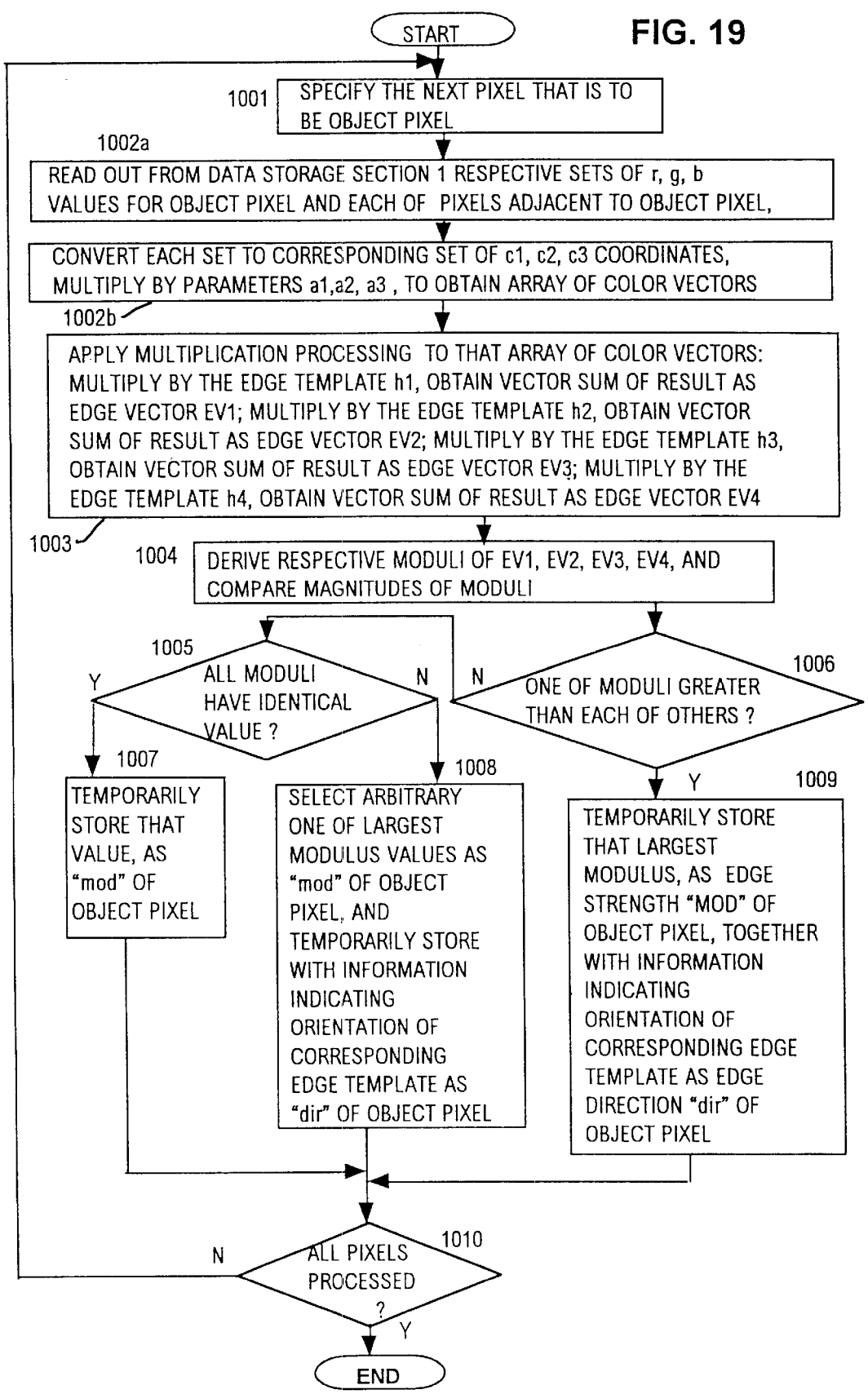
FIG. 19 is a flow diagram showing details of processing to derive edge strength and possible edge direction information for each of the pixels of a color image in succession, with the second embodiment of the invention.

FIG. 19 is a flow diagram showing the processing executed with this embodiment to derive the candidate edge strength values (MOD) and edge directions (DIR) for the pixels of the color image. As shown, this differs from the corresponding diagram of FIG. 11 of the first embodiment only with respect to the steps 1002a, 1002b which replace step 1002 of FIG. 11, for deriving the color vectors as sets of coordinates expressing respective positions within the color space of FIG. 17.

Figure 18:
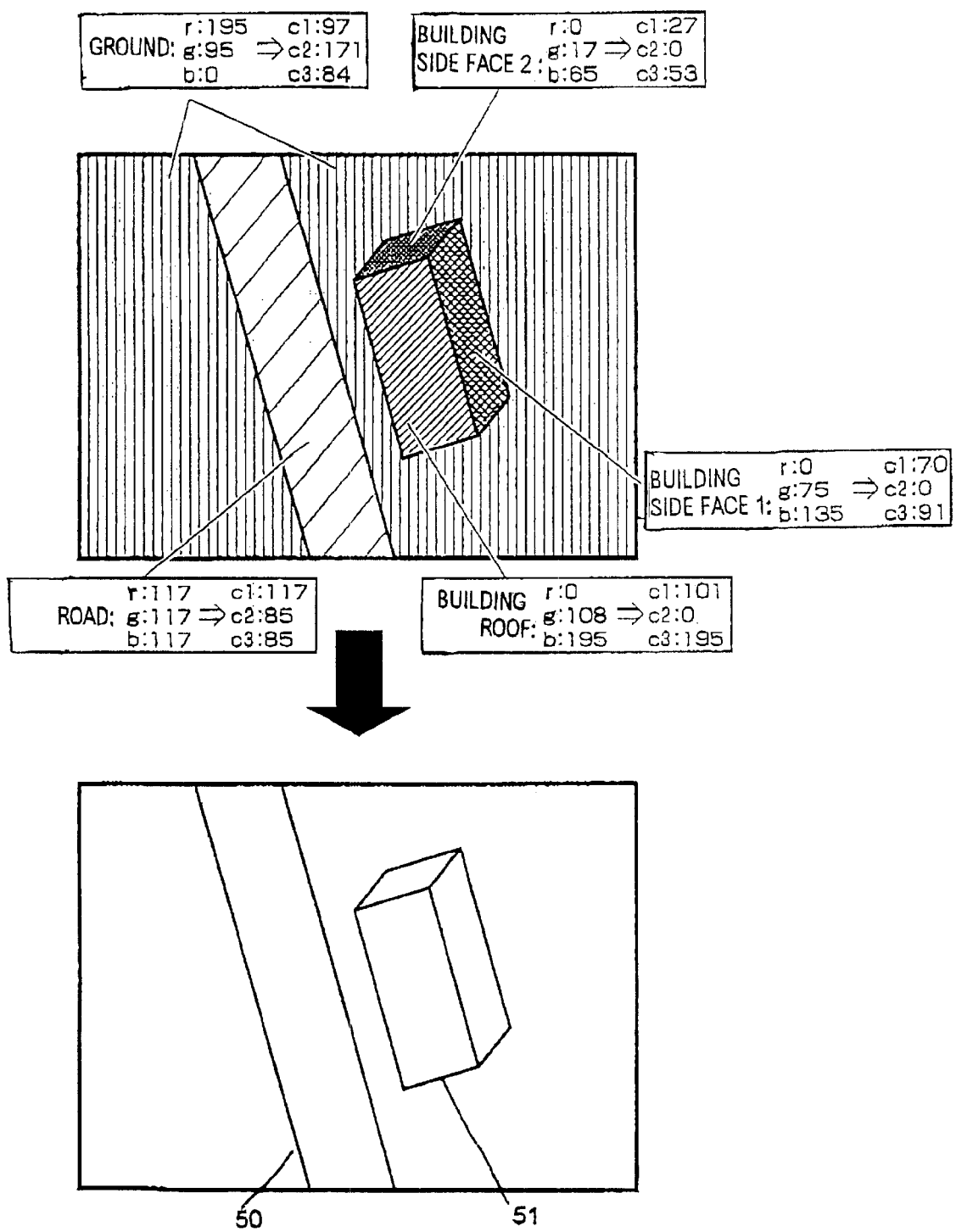
FIG. 18 is a diagram for use in describing how an edge image is obtained as a result of applying edge detection by the apparatus of the second embodiment to a simplified color image.

A specific example will be described in the following. The upper part of FIG. 18 shows data of a color image representing a simplified aerial photograph which is to be subjected to image recognition. Examples of the r, g and b values for various regions of the color image, and the corresponding sets of c1, c2, c3 values which express the color attributes of these regions as positions in the color space of FIG. 17 are also indicated in the drawing. As described above the respective sets of r, g and b values of the pixels, for the RGB color space, are converted to corresponding sets of c1, c2 c3 coordinates, the values of the control parameters a1, a2, a3 are set in accordance with the characteristics of the color image (for example if required, such that differences in respective intensity values between adjacent regions will have a relatively large effect upon the differences between magnitudes of corresponding color vectors as described hereinabove), and respective color vectors for the pixels of the color image, expressed in the color space of FIG. 17, are thereby obtained. Edge detection is then performed, to obtain the shape of the street and the building as designated by numerals 50 and 51 respectively in the lower part of FIG. 18.

As described above, with this embodiment, respective color vectors for the pixels of the color image are derived by transform processing of the stored image data into coordinates of a color space which is more appropriate for edge detection processing than the original RGB color space. That is to say, the image data are subject to conversion to color space coordinates whereby the edge detection processing can be adjusted (i.e., by altering the relative values of the control parameters) such as to match the edge detection processing to the particular characteristics of the image that is to be subjected to image recognition processing. For example, if differences between various regions of the image are primarily gray-scale variations, i.e., variations in intensity rather than in chrominance, then this fact can readily be judged beforehand by a human operator, and the control parameter values adjusted such as to emphasize the effects of variations in intensity values upon the edge detection process.

A third embodiment of an image recognition apparatus according to the present invention will be described. The apparatus configuration is identical to that of the second embodiment (shown in FIG. 15).

The basic operation sequence of this embodiment is similar to that of the second embodiment, shown in FIG. 16. However with the third embodiment, the transform is performed from an RGB color space to an HSI color space, instead of the color space of FIG. 17. That is to say, steps 11, 12 and 13 are identical to those of the first embodiment, however step 20 is performed as follows. Step 20: each pixel value is transformed from the RGB color space to the coordinates of the cylindrical color space shown in FIG. 20. Each set of pixel values r(x, y), g(x, y), b(x, y) is operated on, using equation (9), to obtain a corresponding set of hue, saturation and intensity values as h(x, y), s(x, y) and i(x, y) respectively of the HSI color space of FIG. 20. In this case, the gray-scale values, i.e. values of intensity extending from black (as value 0) to white (as maximum value), are plotted along the vertical axis of the cylindrical coordinate system shown in the left side of FIG. 20.

imax=max (r, g, b)
imin=min(r,g,b)

$$i = \frac{imax + imin}{2} \quad (9)$$

$$s = \begin{cases} 0 & \text{if } imax = imin \\ \frac{imax - imin}{imax + imin} \cdot max\_value & \text{if } i \leq \frac{max\_value}{2} \\ \frac{imax - imin}{max\_value - imax - imin} \cdot max\_value & \text{if } i > \frac{max\_value}{2} \end{cases}$$

$$r1 = \frac{imax - r}{imax - imin}$$
$$g1 = \frac{imax - g}{imax - imin}$$
$$b1 = \frac{imax - b}{imax - imin}$$
$$r1 = \frac{imax - r}{imax - imin}$$
$$g1 = \frac{imax - g}{imax - imin}$$
$$b1 = \frac{imax - b}{imax - imin}$$

$$h = \begin{cases} \text{undefined} & \text{if } imax = imin \\ \frac{(b1 - g1)\pi}{3} & \text{if } r = imax \\ \frac{(2 + r1 - b1)\pi}{3} & \text{if } g = imax \\ \frac{(4 + g1 - r1)\pi}{3} & \text{if } b = imax \end{cases}$$

Figure 20:
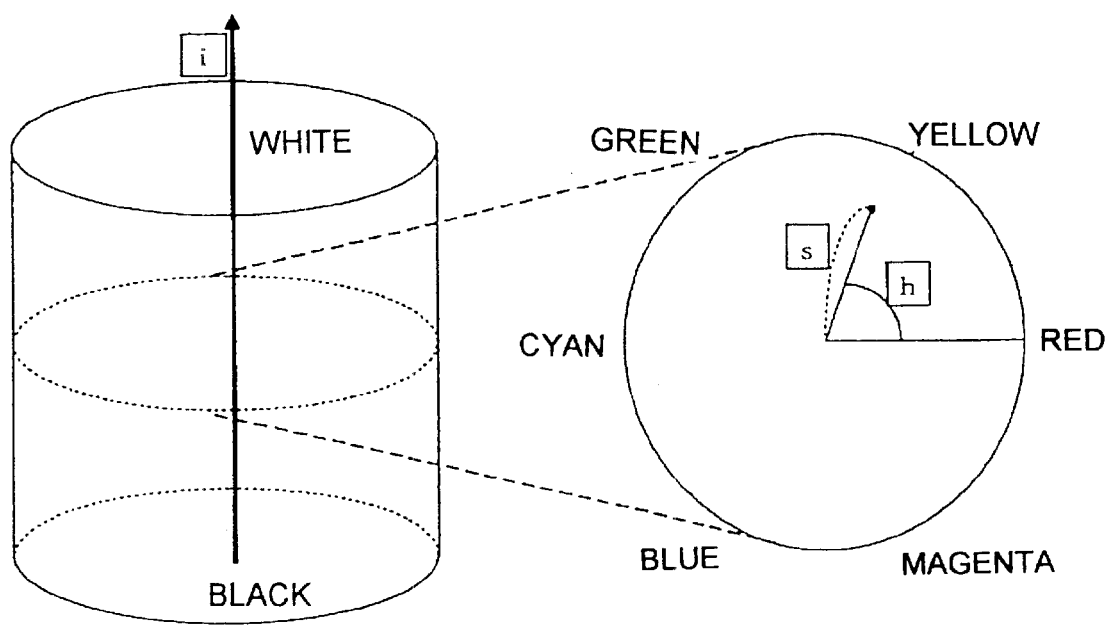
FIG. 20 is a diagram illustrating an HSI color space utilized with a third embodiment of the invention.

The saturation value expresses the depth of a color, and corresponds to a distance extending radially from the center of the coordinate system shown in the right side of FIG. 20. The hue value corresponds to an angle in the coordinate system shown on the right side of FIG. 20. For example when this angle is zero degrees, this corresponds to the color red, while an angle of $2/3\pi$ radians corresponds to blue.

It should be noted that there are various models for performing the transform from an RGB to an HSI color space, and that the present invention is not limited to use of equation (9) for that purpose. With equation (9) the range of values of each of r, g, b, i, and s is from 0 to the maximum value (i.e., 255 in the case of 8-bit data values), designated as "max_value". The range of values of h is from 0 to $2\pi$ radians. For simplicity, the image position coordinates (x, y) have been omitted from the equation.

With this embodiment, step 10 of the flow diagram of FIG. 16 is executed as follows. Using equation (10) below, color vectors PV(x, y) are generated for each of the pixels, from the hue, saturation and intensity values h(x, y), s(x, y), i(x, y) of each pixel.

$$PV(x, y) = \begin{pmatrix} a \cdot s(x, y) \cdot \cos(h(x, y)) \\ a \cdot s(x, y) \cdot \sin(h(x, y)) \\ i(x, y) \end{pmatrix} \quad (10)$$

Here each color vector PV is generated by converting the portions h(x, y), s(x, y) that are expressed in polar coordinates to a linear coordinate system. By adjusting the value of the control parameter "a", it becomes possible for example to place emphasis on the intensity values, in the edge detection processing. For example if the value of the parameter "a" is made equal to 1, then edge detection processing will be performed placing equal emphasis on all of the values in the HSI space, while if the value of the parameter a is made less than 1, then edge detection processing will be performed placing greater emphasis on intensity values.

That is to say, the relative contribution of the intensity component of the color attributes of a pixel to the magnitude of the modulus of the color vector of that pixel will increase in accordance with decreases in the value of the control parameter "a".

Figure 23:
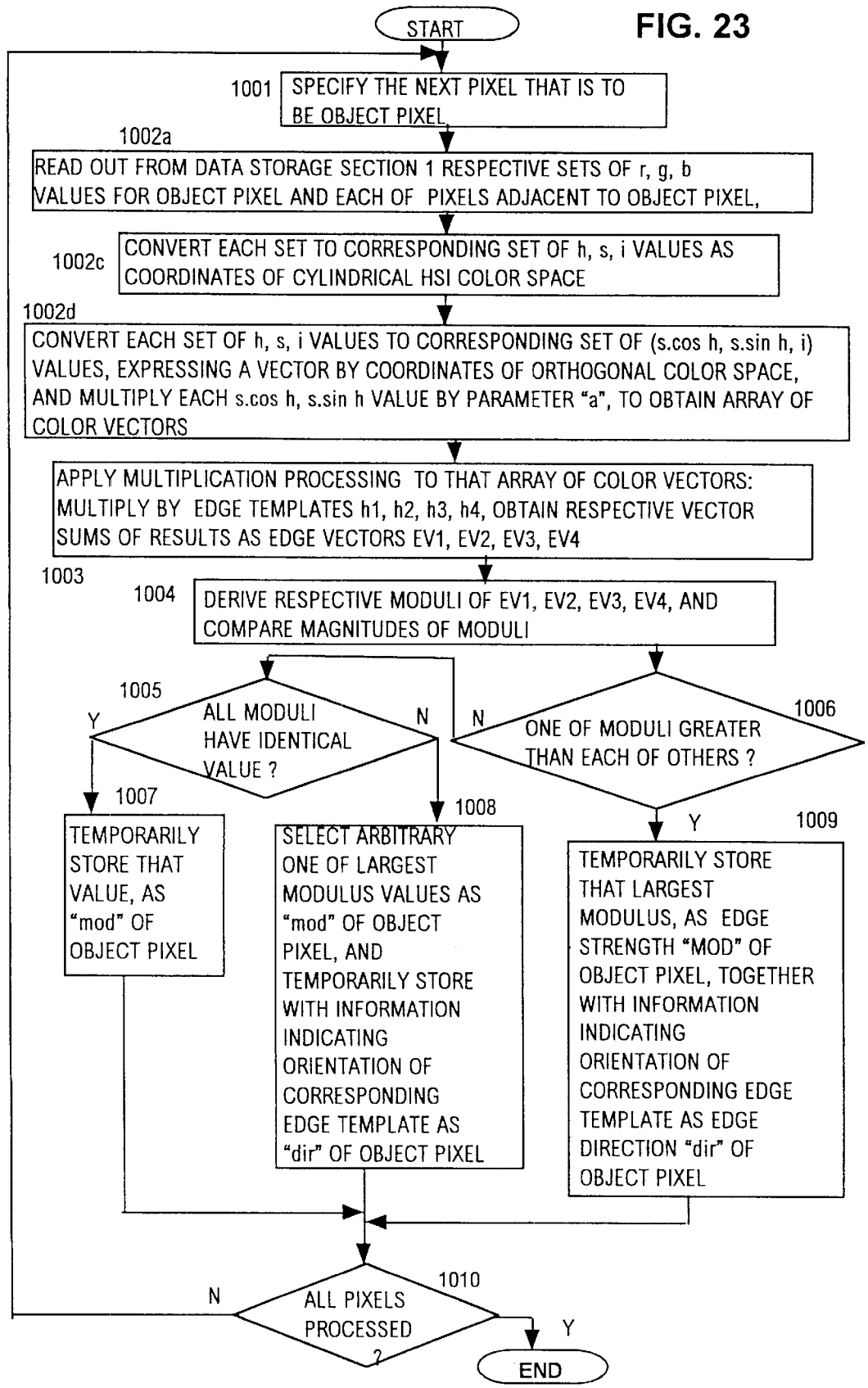
FIG. 23 is a flow diagram showing details of processing to derive edge strength and possible edge direction information for each of the pixels of a color image in succession, with the third embodiment of the invention.

The operation of this embodiment for generating respective color vectors corresponding to the pixels of the color image is shown in more detail in the flow diagram of FIG. 23. This differs from the corresponding flow diagram of FIG. 11 for the first embodiment in that the step 1002 of the first embodiment, for deriving the array of color vectors PV which are to be operated on using the edge templates in equation (2) as described above to obtain the edge vectors EV1(x,y) to EV2(x,), is replaced by a series of three steps, 1002a, 1002c and 1002d.

In the first of these, step 1002a, the respective sets of r, g, b values for the object pixel and its eight adjacent surrounding pixels are obtained from the image data storage section 1, and in step 1002c each of these sets of r, g, b values of the RGB color space is converted to a corresponding set of h, s, i values of the cylindrical HSI color space shown in FIG. 20. In step 1002d, each of these sets is converted to a corresponding set of three linear coordinates, i.e., of an orthogonal color space, using the trigonometric operation described above, to thereby express the hue and saturation information of each pixel in terms of linear coordinates instead of polar coordinates, while each of the resultant s.cos h and s.sin h values is multiplied by the control parameter "a", as indicated by equation (10).

Figure 21:
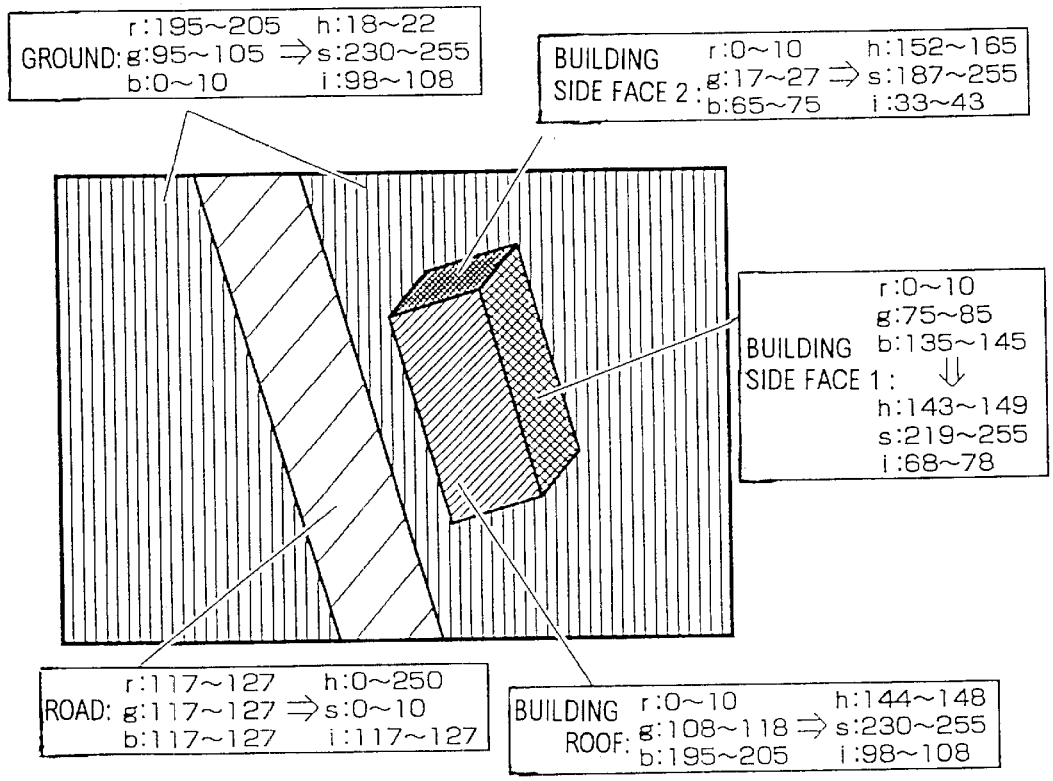
FIG. 21 represents a simplified color image in which specific amounts of variation in color values occur within various regions of the image.

A specific example will be described in the following. FIG. 21 shows data of a color image representing a simplified aerial photograph which is to be subjected to image recognition. As opposed to the image of the upper part of FIG. 10, it is assumed with the image of FIG. 21 that there are ranges of variation of pixel values, as would occur in the case of an actual aerial photograph. Thus in each of the regions of the color image, rather than all of the RGB values of that region being identical, there is a certain degree of scattering of these pixel values.

Figure 22:
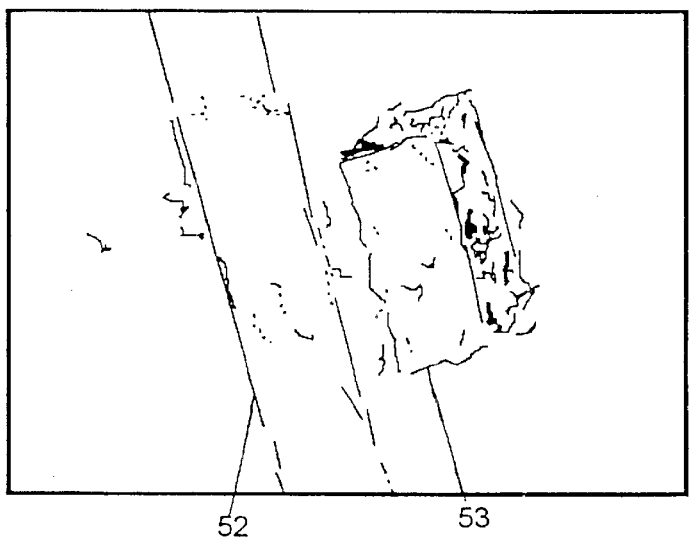
FIG. 22 is a diagram showing an edge image which is obtained as a result of applying edge detection by the apparatus of the third embodiment to the simplified color image of FIG. 21.

As described above, the color attributes of the pixels of the color image are converted from RGB to HSI color space coordinates, which are then converted to respective coordinates of an orthogonal system by applying equation (10) above, to thereby obtain respective color vectors corresponding to the pixels, and edge detection processing then applied to the color vectors in the same manner as described for the first embodiment. The result of applying this processing to the image shown in FIG. 21 is illustrated in FIG. 22.

As shown, the shapes of the street and the building have been extracted from the original image, as indicated by numerals 52 and 53 respectively. Due to the scattering of pixel values in the original color image, some level of noise will arise in the edge detection process, so that as shown in FIG. 21, some discontinuities occur in the outlines of the street and the building.

Thus with this embodiment of the present invention, pixel vector data are generated after having converted pixel values which have been stored as coordinates of a certain color space into the coordinates of an HSI color space, which are then converted to linear coordinates of a color space in which the luminance and chrominance information correspond to respectively different coordinates. This simplifies edge detection, since the overall hue, saturation and intensity characteristics of a color image can be readily judged by a human operator, and the value of the control parameter "a" can thereby be set appropriately by the operator, to enable effective edge detection to be achieved.

A fourth embodiment of an image recognition apparatus will be described. The configuration is basically similar to that of the second embodiment (shown in FIG. 15).

The operation sequence of this embodiment is similar to that of the second embodiment, shown in the flow diagram of FIG. 16, with steps 11, 12 and 13 being identical to those of the first embodiment. The contents of step 20 of FIG. 16, with the fourth embodiment, differ from those of the second embodiment and are as follows.

Step 20: the pixel values are transformed from the RGB color space to the coordinates of the cylindrical HSI color space shown in FIG. 20, using equation (9) as described hereinabove for the third embodiment. Equation (11) is then applied to transform the respective sets of h, s, i values obtained for each of the pixels of the color image pixel to the coordinates of a color space of the inverted conical form shown in FIG. 24, i.e., to coordinates h', s', i' of a modified form of HSI color space.

$$h'(x, y) = h(x, y) \qquad (11)$$
$$s'(x, y) = \frac{i(x, y)}{\text{max\_value}} \cdot s(x, y)$$
$$i'(x, y) = i(x, y)$$

Thus, the color space transform operation is performed by applying equation (11) above to convert each h(x, y), s(x, y), i(x, y) set of values, for the pixel located at position (x, y) of the color image, to a set of h'(x, y), s'(x, y), i'(x, y) values respectively. This transform does not produce any change between h(x, y) and h'(x, y), or between i(x, y) and i'(x, y), however as the value of i(x, y) becomes smaller, the value of s'(x, y) is accordingly reduced.

With this embodiment, the contents of step 1010 of the flow diagram of FIG. 16 are as follows. Respective color vectors are generated for each of the pixels, with the vectors expressed as respective sets of linear coordinates of an orthogonal color space, by applying equation (12) below to the set of polar coordinates h'(x, y), s'(x, y), i'(x, y) that have been derived for the pixel by applying equation (11)

$$PV(x, y) = \begin{pmatrix} a \cdot s(x, y) \cdot \cos(h(x, y)) \\ a \cdot s(x, y) \cdot \sin(h(x, y)) \\ i(x, y) \end{pmatrix} \qquad (12)$$

Thus, each color vector is generated by converting the portions h'(x, y), s'(x, y) of the h', s', i' information for each pixel, i.e., the values that are expressed in polar coordinates, to a linear coordinate system. By adjusting the value of the parameter "a," the form of emphasis of the edge detection processing can be altered, i.e., the relative contribution of the intensity component of the color attributes of each pixel to the magnitude of the modulus of the color vector that is derived for the pixel can be modified, by adjusting the value of the control parameter "a", so that it becomes possible to place emphasis on variations in intensity between adjacent regions, in the edge detection processing. For example if the value of the parameter "a" is made equal to 1, then edge detection processing will be performed placing equal emphasis on all of the hue, saturation and intensity values, while if the value of the parameter "a" is made less than 1, then edge detection processing will be performed placing greater emphasis on intensity values.

Figure 27:
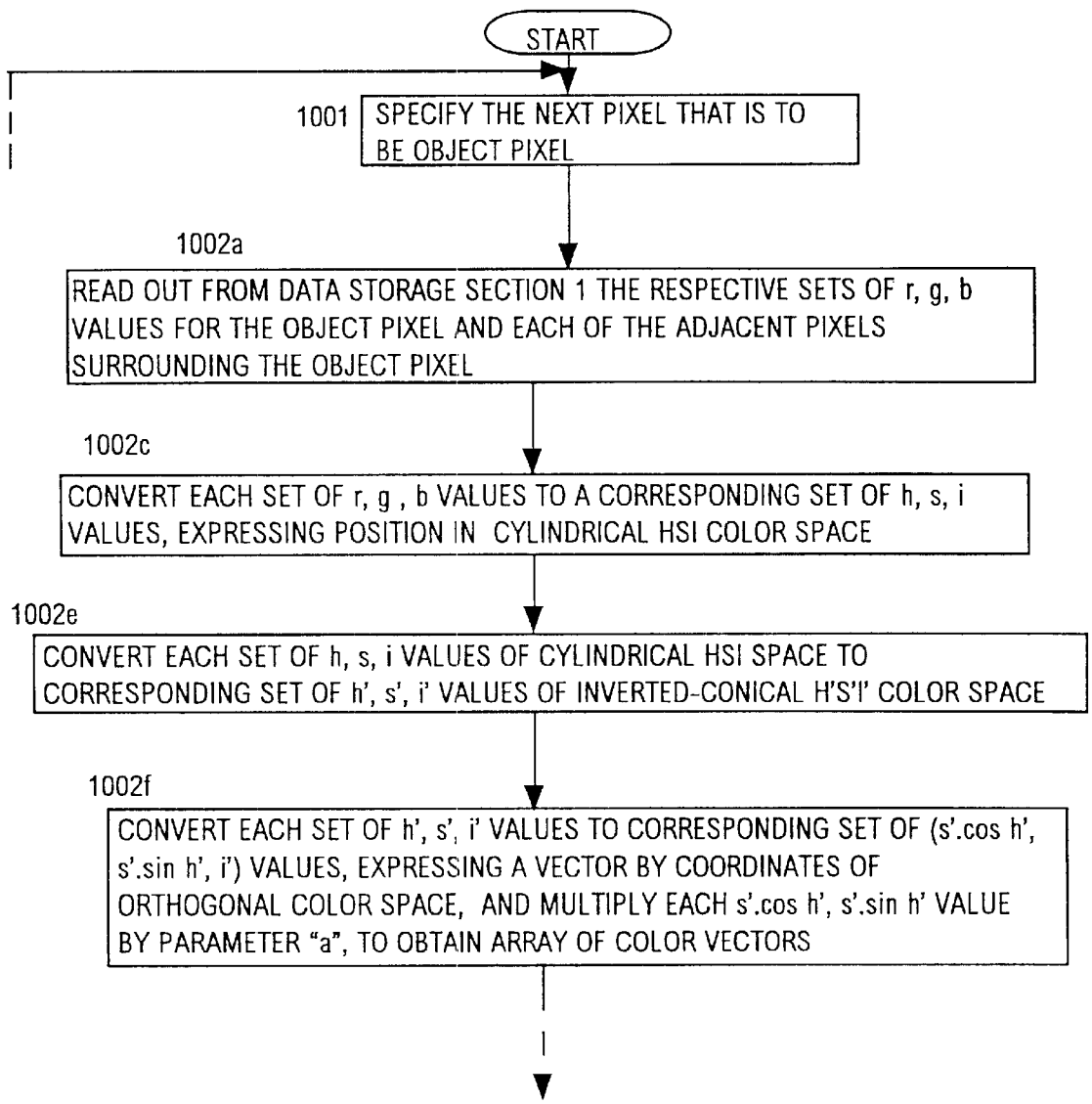
FIG. 27 is a partial flow diagram showing details of a first part of processing which is executed to derive edge strength and possible edge direction information for each of the pixels of a color image in succession, with the fourth embodiment of the invention.

The operation of this embodiment for generating respective color vectors corresponding to the pixels of the color image is shown in the partial flow diagram of FIG. 27. This differs from the corresponding flow diagram of FIG. 11 for the first embodiment in that the step 1002 of the first embodiment, for deriving the array of color vectors PV which are to be operated on by applying the edge templates in equation (2) as described above to obtain the edge vectors EV1(x,y) to EV2(x,), is replaced by a series of four steps, 1002a, 1002c, 1002e and 1002f. In step 1002a, the respective sets of r, g, b values for the object pixel and its eight adjacent surrounding pixels are obtained from the color image data storage section 1, and in step 1002c each of these sets of r, g, b values of the RGB color space is converted to a corresponding set of h, s, i values of the cylindrical-shape HSI color space shown in FIG. 20. In step 1002e, each of these sets of h, s, i values is converted to a corresponding set of h', s', i' values of the inverted-conical H'S'I' color space. In step 1002f, each of these sets is converted to a corresponding set of three linear coordinates, i.e., of an orthogonal color space, while each of the resultant s'.cos h' and s'.sin h' values is multiplied by the control parameter "a", as indicated by equation (12).

The remaining steps of this flow diagram, which are omitted from FIG. 27, are identical to steps 1003 to 1010 of FIG. 11.

A specific example will be described in the following. In the same way as for the third embodiment, it will be assumed that the simplified aerial photograph of FIG. 21 is the image that is to be subjected to recognition processing.

Figure 24:
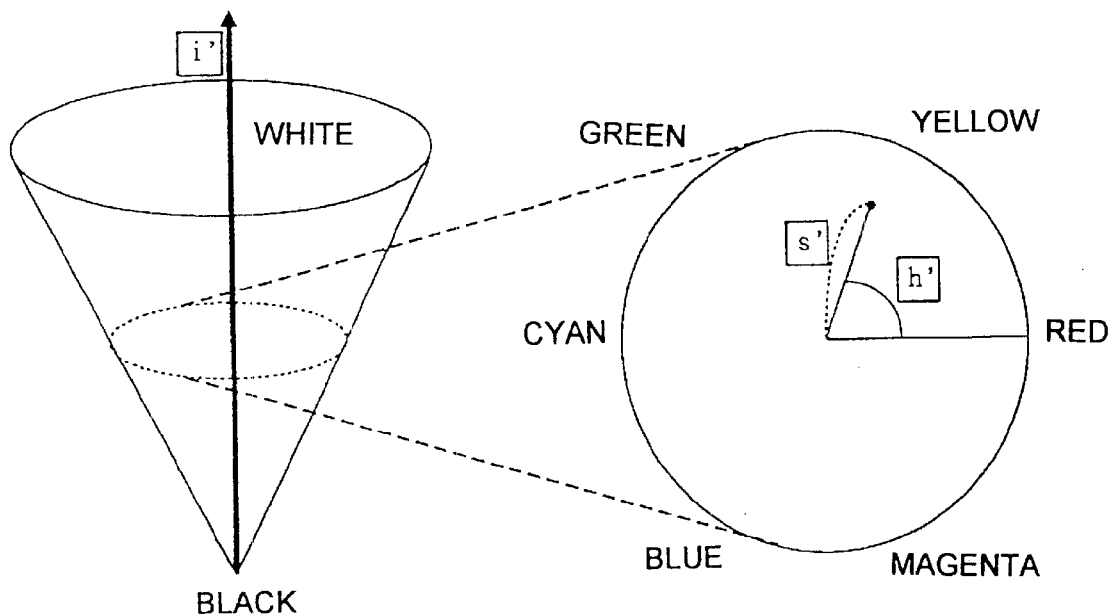
FIG. 24 is a diagram illustrating a modified HSI color space, of inverted conical form, utilized with a fourth embodiment of the invention.

As described above, the RGB values of the pixels are first converted to HSI values of the cylindrical color space of FIG. 20, and these are then transformed to H'S'I' form, as coordinates of the inverted-conical color space shown in FIG. 24. The first and second columns of values in the table of FIG. 26 show the relationship between respective HSI values for each of the regions, and the corresponding H'S'I' values resulting from the transform. In the case of the transform into the HSI space, the lower the values of intensity become, the greater will become the degree of scattering of the values of saturation. This is a characteristic feature of the transform from RGB to the HSI space. For example, if all of the RGB values of a pixel are small, signifying that the intensity is low, then a change of 1 in any of the RGB values will result in an abrupt change in the corresponding saturation value. Thus, since sudden changes in color will occur at positions where such abrupt variations in the saturation values occur, edges may be erroneously detected even at positions where there is no actual border of any of the objects which are to be recognized. However in the case of a transform into H'S'I' values of the inverse-conical HSI space, the lower the value of intensity of the pixels, the smaller will become the value of s', so that the scattering of the values of s' is suppressed. As a result, random abrupt changes in the magnitudes of the moduli of the color vectors which are derived by applying equation (12) can be eliminated, enabling greater accuracy of edge detection.

Figure 25:
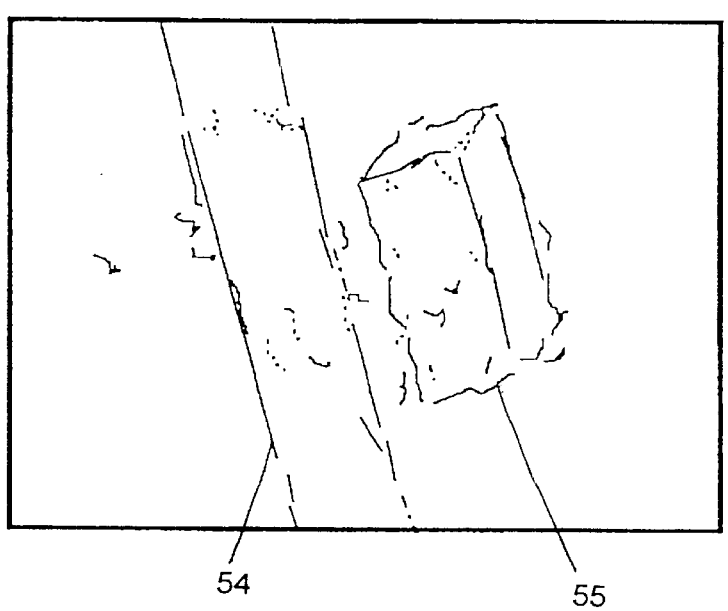
FIG. 25 is a diagram showing an edge image which is obtained as a result of applying edge detection by the apparatus of the fourth embodiment to the simplified color image of FIG. 21.

FIG. 25 shows the image recognition processing results which are obtained when this embodiment is applied to edge detection of the color image represented in FIG. 21. The building face 1 and building face 2 in the image of FIG. 21 are each regions of low values of intensity, so that the noise level for these regions, due to erroneous detection of spurious edges, could be expected to be high. However as shown in FIG. 25, such noise is substantially suppressed, with the shapes of the street and building of the image of FIG. 21 being extracted as indicated by numerals 54, 55 respectively.

Thus as described above, with this embodiment, when color values are transformed into the HSI space, the saturation values are varied in accordance with the intensity values by converting the h, s and i values for each pixel to a corresponding set of values that are coordinates of an inverted-conical shape of color space, so that the instability of values of saturation that is a characteristic feature of the transform from RGB to HSI values can be reduced, whereby the occurrence of noise in the obtained results can be substantially suppressed, and reliable edge detection can be achieved.

A fifth embodiment of an image recognition apparatus will be described. The configuration is identical to that of the second embodiment (shown in FIG. 15).

The basic operation sequence of this embodiment is identical to that of the second embodiment, shown in FIG. 16. Steps 11, 12 and 13 are identical to those of the first embodiment. With this embodiment, the operation of step 20 of the flow diagram of FIG. 16 differs from that of the second embodiment, as follows. In step 20, the pixel values are transformed from the RGB color space to coordinates of the cylindrical HSI color space shown in FIG. 20, using equation (9). Equation (13) below is then applied to transform the pixel values to the coordinates of a color space of the double-conical form shown in FIG. 28.

$$h'(x, y) = h(x, y) \quad (13)$$
$$s'(x, y) = \left(1 - \frac{|i(x, y) - \max\_value/2|}{\max\_value/2}\right) s(x, y)$$
$$i'(x, y) = i(x, y)$$

Figure 28:
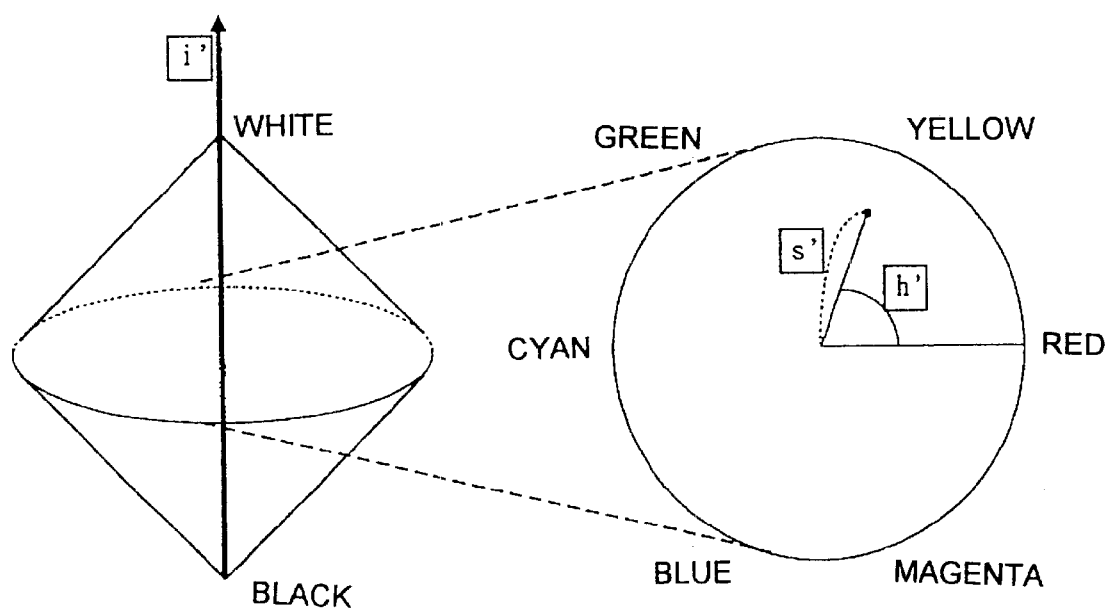
FIG. 28 is a diagram illustrating a modified HSI color space, of double-conical form, utilized with a fifth embodiment of the invention.

The equation (13) effects a transform of each set of coordinates of a pixel with respect to the cylindrical HSI space, i.e., h(x, y), s(x, y), i(x, y) to a corresponding set of hue, saturation and intensity coordinates of the double-conical color space of FIG. 28, which will be designated as h'(x, y), s'(x, y), i'(x, y) respectively. This transform does not produce any change between h(x, y) and h'(x, y), or between i(x, y) and i'(x, y). Furthermore, if the value of i(x, y) is near the intensity value which is located midway between the maximum and minimum values of intensity (i.e., ½ of the white level value) there is no difference between each value of s1(x, y) and s(x, y). However as the value of i(x, y) becomes greater or smaller than the intermediate value, the value of s'(x, y) is accordingly reduced in relation to s(x, y).

Figure 30:
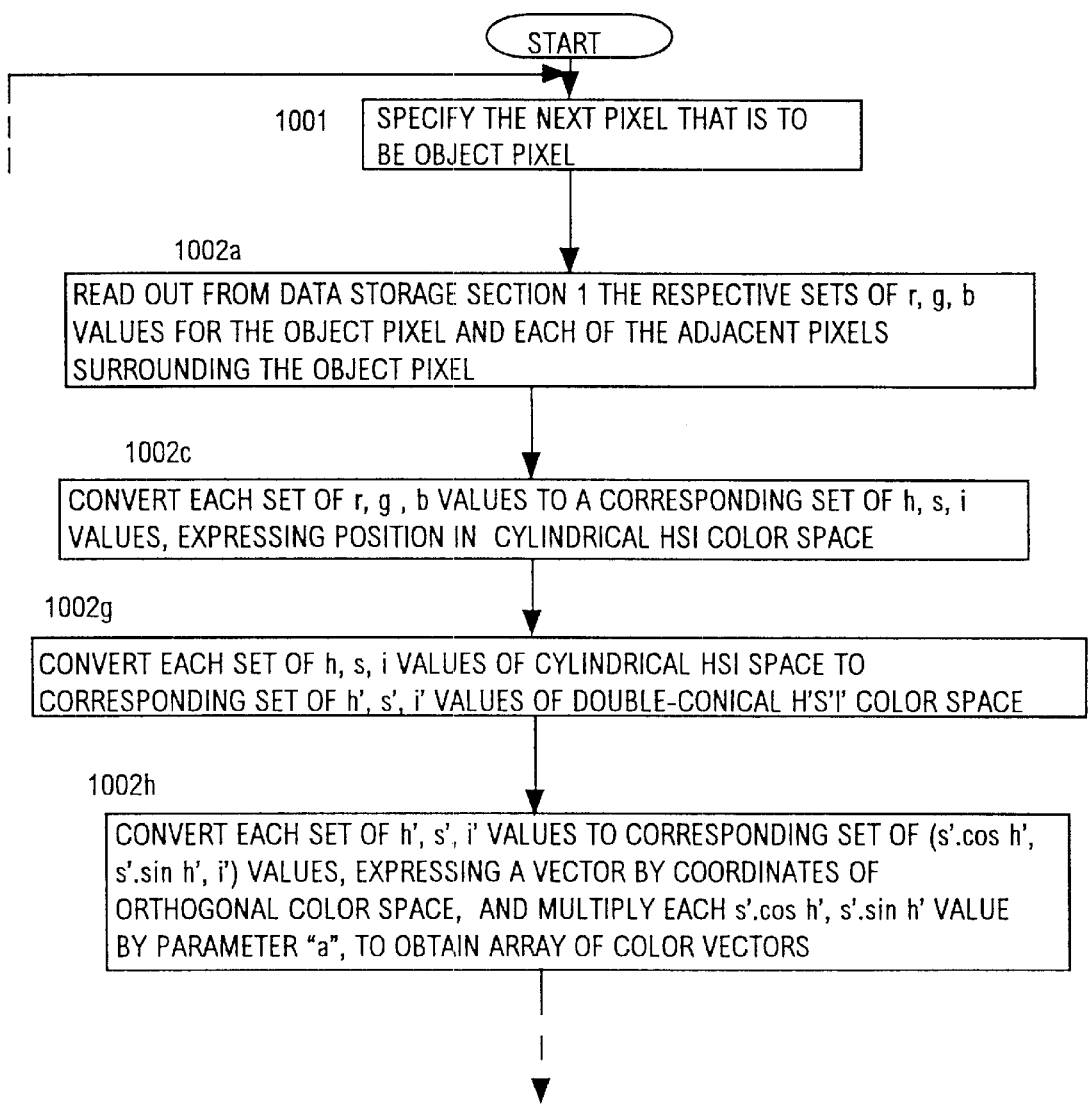
FIG. 30 is a partial flow diagram showing details of a first part of processing which is executed to derive edge strength and possible edge direction information for each of the pixels of a color image in succession, with the fifth embodiment of the invention.

The operation of this embodiment for generating respective color vectors corresponding to the pixels of the color image is shown in more detail in the flow diagram of FIG. 30. This differs from the corresponding flow diagram of FIG. 11 for the first embodiment in that the step 1002 of the first embodiment, for deriving the array of color vectors PV which are to be operated on by applying the edge templates in equation (2) as described above to obtain the edge vectors EV1(x,y) to EV2(x,), is divided into four steps, 1002a, 1002c, 1002g and 1002h. In step 1002a, the respective sets of r, g, b values for the object pixel and its eight adjacent surrounding pixels are obtained from the color image data storage section 1, and in step 1002c each of these sets of r, g, b values of the RGB color space is converted to a corresponding set of h, s, i values of the cylindrical-shape HSI color space shown in FIG. 20. In step 1002g, each of these sets of h, s, i values is converted to a corresponding set of h', s', i' values of the double-conical H'S'I' color space shown in FIG. 28. In step 1002h, each of these sets is converted to a corresponding set of three linear coordinates, i.e., of an orthogonal color space, by applying the processing of equation (13).

The remaining steps of this flow diagram, which are omitted from FIG. 30, are identical to steps 1003 to 1010 of FIG. 11.

A specific example will be described in the following. In the same way as for the third embodiment, it will be assumed that the simplified aerial photograph of FIG. 21 is the color image data that are to be subjected to recognition processing.

Firstly, the RGB values of the pixels are converted to HSI values of the cylindrical HSI color space, and these are then transformed to H'S'I' values of the double-conical color space. The first and third columns of values in FIG. 26 show the relationship between respective HSI values for each of the regions, and the corresponding H'S'I' values resulting from a transform into the coordinates of the double-conical form of H'S'I' color space.

Figure 29:
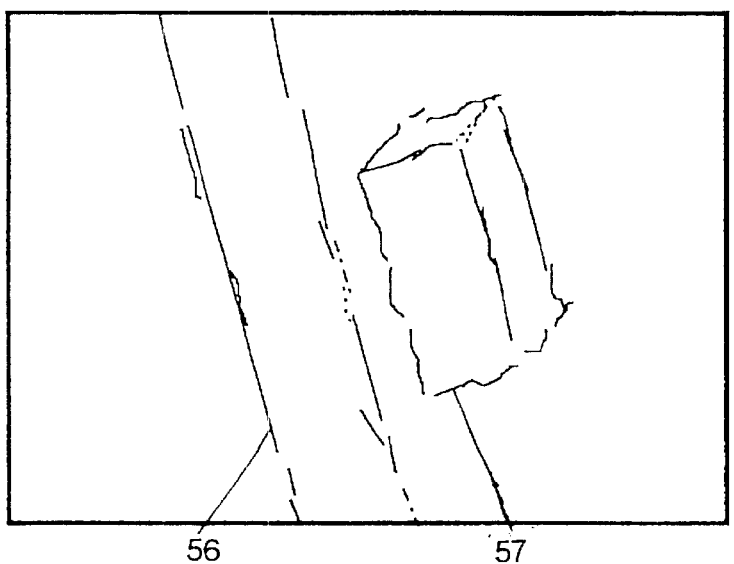
FIG. 29 is a diagram showing an edge image which is obtained as a result of applying edge detection by the apparatus of the fifth embodiment to the simplified color image of FIG. 21.

The image recognition processing results obtained when this embodiment is applied to edge detection of the color image represented in FIG. 21 are as shown in FIG. 29. As can be seen, not only is the noise in the low-intensity regions such as the building face 1 and building face 2 of the image of FIG. 21 reduced, but noise is also greatly reduced in high-intensity regions such as the building roof and the street, with the shapes of the street and building being extracted as indicated by numerals 56, 57 respectively.

Thus with this embodiment, saturation values are reduce in regions of high or low intensity values, i.e., regions in which instability of saturation values can be expected to occur as a result of the transform from the RGB to the HSI color space. Hence, the instability of saturation values can be substantially reduced, so that noise caused by these saturation values can be suppressed, and accurate edge detection can be achieved.

A sixth embodiment of an image recognition apparatus will be described. The configuration is identical to that of the second embodiment shown in FIG. 15, while the basic operation sequence is similar to that of the second embodiment, shown in the flow diagram of FIG. 16. Steps 11, 12 and 13 are identical to those of the first embodiment, shown in the flow diagram of FIG. 5. Step 10 is basically similar to that of the fourth embodiment. 12. The step of performing the transform from the RGB color space to a different color space (step 20 of FIG. 16) is executed as follows with this embodiment. Firstly, the transform of the pixel values from sets of r, g, b values of the RGB color space to h, s, i values of the cylindrical HSI color space of FIG. 20 is performed, using equation (9) as described hereinabove for the preceding embodiment. With the sixth embodiment of the invention, the respective sets of h, s, i values derived for the pixels of the color image are then converted to coordinates of a modified H'S I' color space by applying a saturation value modification function, which varies in accordance with the actual changes in the degree of sensitivity of the saturation values to small changes in intensity values. This function is generated and utilized as follows:

(1) The first step is to derive, for each of the possible values of intensity i, all of the sets of (r, g, b) values which will generate that value of i when the transform from the RGB to HSI color space is performed. That is, for each intensity value i(n), where n is in the range from the minimum to maximum (e.g., 255) values, a corresponding group of sets of (r, g, b) values are derived.

(2) For each intensity value, a corresponding set of values of a function which will be designated as f1(r,g,b) are derived. These express, for each of the sets of (r, g, b) values, the amount of change which would occur in the corresponding value of saturation s, if the value of the red component r were to be altered in the range ±1. Each value of f1(r,g,b) is calculated as follows:

$$f1(r, g, b) = |s(r+1, g, b) - s(r, g, b)| \text{ if } r = 0 \quad (14a)$$

$$f1(r, g, b) = \frac{|s(r+1, g, b) - s(r, g, b)| + |s(r, g, b) - s(r-1, g, b)|}{2} \text{ if } 0 < r < \text{max\_value}$$

$$f1(r, g, b) = |s(r, g, b) - s(r-1, g, b)| \text{ if } r = 0$$

(3) Next, for each of the possible values of intensity i, the average of the corresponding set of values of f1(r,g,b) is obtained, i.e., a function of i is obtained which will be designated as f2(i). Designating the total number of sets of (r,g,b) values corresponding to a value of intensity i as k(i), this can be expressed as:

$$f2(i) = \frac{\sum_{\text{(all combinations of } r,g,b \text{ values which result in intensity value } i)} f2(r, g, b)}{k(i)} \quad (14b)$$

where Σf2(r,g,b) signifies, for each value of i, the sum of all of the values obtained as f2(i) for that value of i, i.e., derived from all of the k sets of (r,g,b) value combinations which will result in that value of i when a transform from RGB to HSI coordinates is performed.

(4) The required saturation value modification function f(i) is then obtained as follows, designating the minimum value obtained for f2(i) as min f2(i), and the maximum possible value of i as max_value:

$$f(i) = \frac{\min f2(i)}{f2(i)} \text{max\_value} \quad (14c)$$

Figure 31:
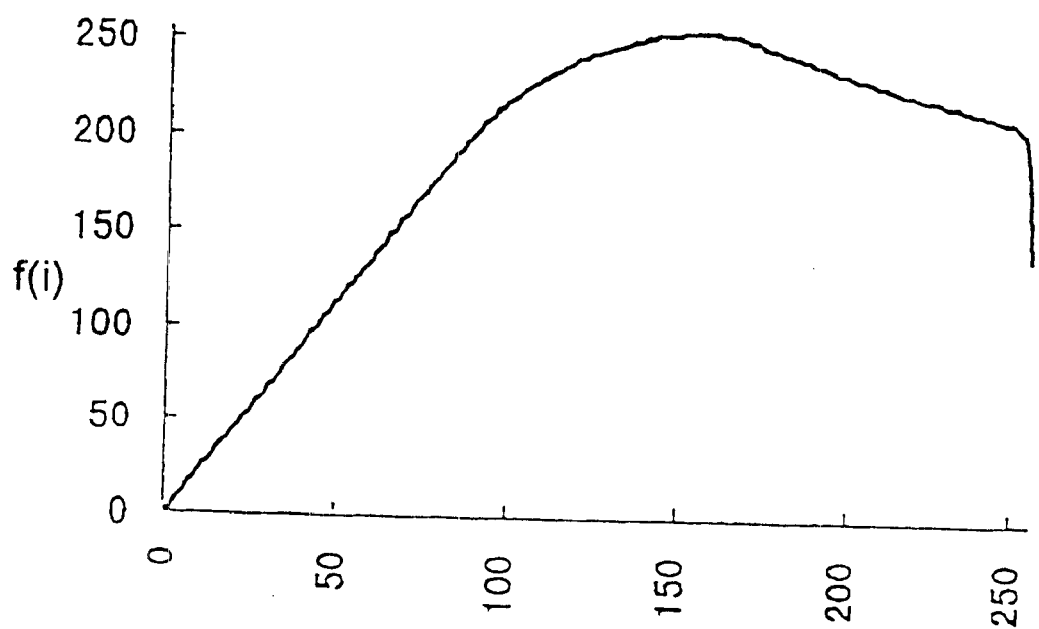
FIG. 31 is a graph of a saturation value modification function which is utilized to transform color values into a modified cylindrical form of HSI color space, with a sixth embodiment of the invention.

The function f(i) is shown in FIG. 31. The higher the value of f(i) obtained from equation (14c) above, the greater will be the stability of the s values with respect to changes in the value of the red component r, and the function is derived on the assumption that such stability also corresponds to stability with respect to changes in the intensity component i. Conversely, the lower the value of f(i), the greater will be the degree of instability of s of with respect to changes in the value of r, and hence with respect to changes in the value of i.

Figure 32:
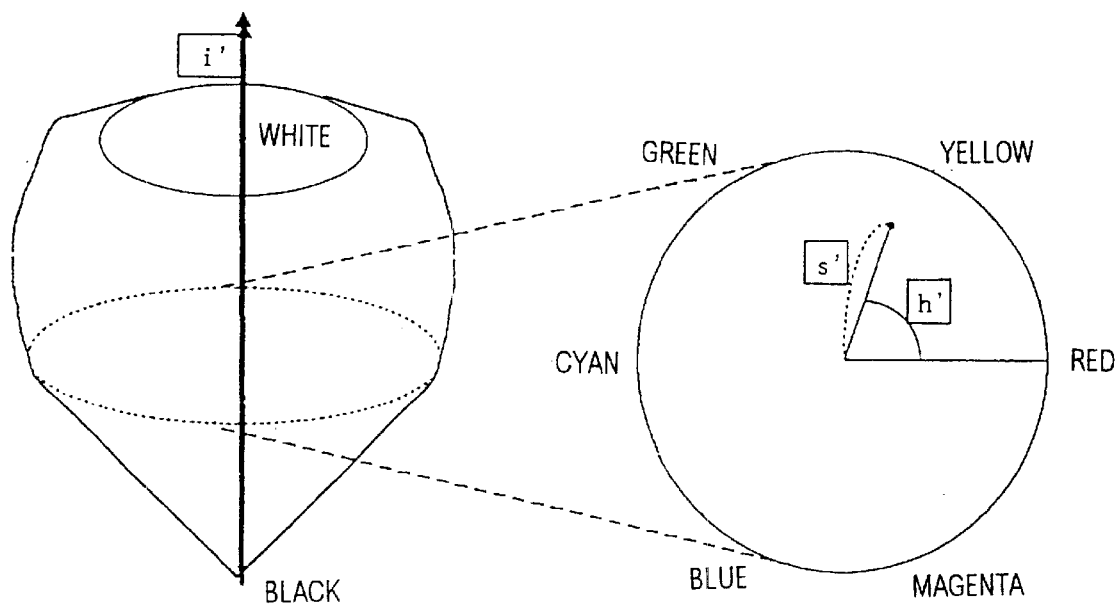
FIG. 32 is a diagram illustrating the modified cylindrical HSI color space that is utilized with the sixth embodiment.

That is to say, it is assumed that the values of saturation s will tend to be unstable in regions of the color image where the values of the red component r are high, and also in regions where the values of r are low. Next, using equations (15) below, the respective sets of h, s, i values of the HSI cylindrical color space derived for the pixels of the color image are transformed into corresponding sets of coordinates h',s',i' of the modified cylindrical type of color space shown in FIG. 32, by applying the function f(i) derived above. It can be understood that the shape of this modified cylindrical color space is formed by rotating the graph of the function f(i) shown in FIG. 31 about its i-axis.

$$h'(x, y) = h(x, y) \quad (15)$$

$$s'(x, y) = \frac{f((i(x, y))}{\text{max\_value}} s(x, y)$$

$$i'(x, y) = i(x, y)$$

Figure 34:
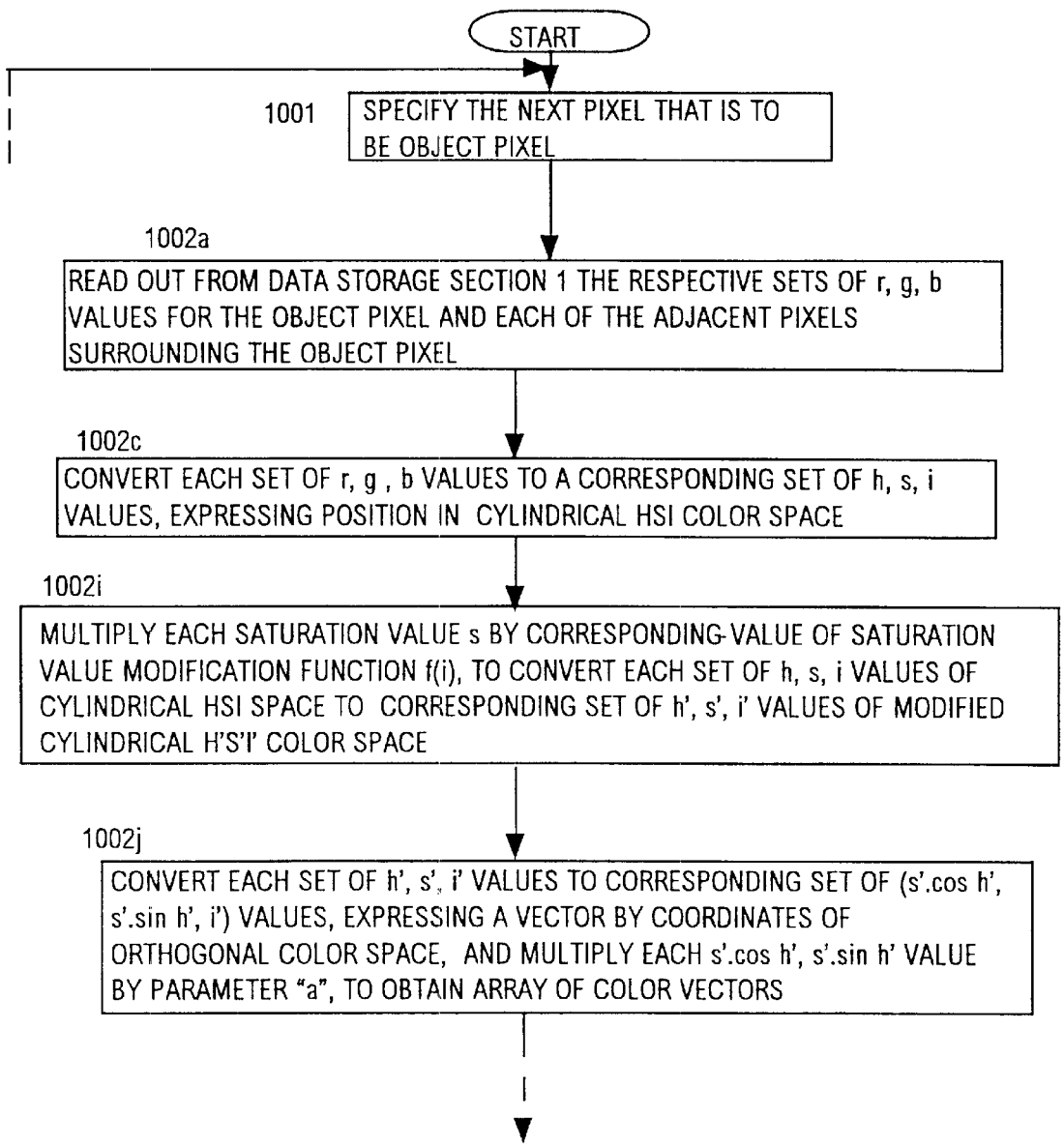
FIG. 34 is a partial flow diagram showing details of a first part of processing which is executed to derive edge strength and possible edge direction information for each of the pixels of a color image in succession, with the sixth embodiment of the invention.

The operation of this embodiment for generating respective color vectors corresponding to the pixels of the color image is shown in the partial flow diagram of FIG. 34. This differs from the corresponding flow diagram of FIG. 11 for the first embodiment in that the step 1002 of the first embodiment, for deriving the array of color vectors PV is replaced by a series of four steps, 1002a, 1002c, 1002i and 1002j. In step 1002a, the respective sets of r, g, b values for the object pixel and its eight adjacent surrounding pixels are obtained from the color image data storage section 1, and in step 1002c each of these sets of r, g, b values of the RGB color space is converted to a corresponding set of h, s, i values of the cylindrical-shape HSI color space shown in FIG. 20. In step 1002i, each of these sets of h, s, i values is converted to a corresponding set of h', s', i' values of the modified conical H'S'I' color space shown in FIG. 32, by applying equation (15). In step 1002j, each of these sets is converted to a corresponding set of three linear coordinates, i.e., of an orthogonal color space, while each of the resultant s'.cos h' and s'.sin h' values is multiplied by the control parameter "a", as indicated by equation (12.

The remaining steps of this flow diagram, which are omitted from FIG. 34, are identical to steps 1003 to 1010 of FIG. 11.

A specific example will be described in the following. In the same way as for the third embodiment, it will be assumed that the simplified aerial photograph of FIG. 21 constitutes the color image data that are to be subjected to recognition processing.

With this embodiment, step 20 of FIG. 16, for conversion to a different color space, is executed as follows. The RGB values of the pixels are converted to respective sets of h, s, i values of the cylindrical HSI color space of FIG. 20, and these are then transformed to h', s', i' coordinates of the modified cylindrical color space shown in FIG. 32, by applying the aforementioned function f(i). The contents of the first and fourth columns of values in the table of FIG. 26 show the relationship between respective HSI values for each of the regions of the color image of FIG. 21, and the corresponding H'S'I' values resulting from a transform into the coordinates of the modified cylindrical color space.

Figure 33:
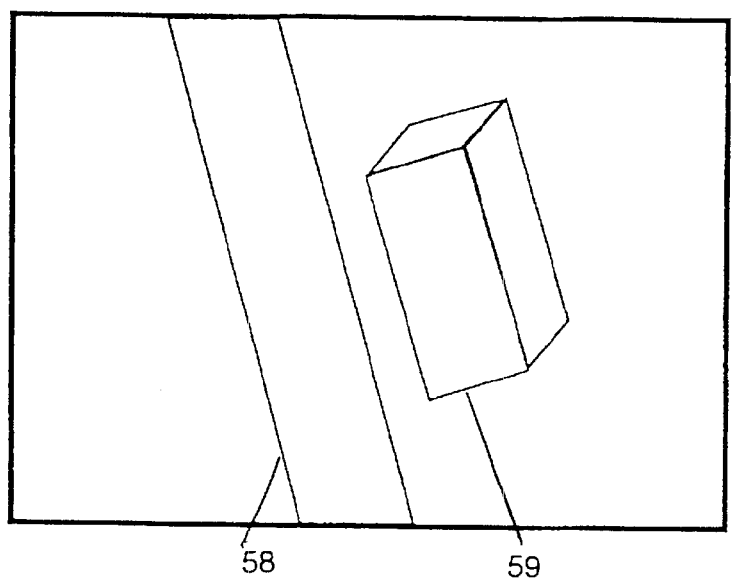
FIG. 33 is a diagram showing an edge image which is obtained as a result of applying edge detection by the apparatus of the sixth embodiment to the simplified color image of FIG. 21.

FIG. 33 shows the results of image recognition processing obtained when this embodiment is applied to the color image represented in FIG. 21. As shown, in addition to reducing noise in regions of low intensity, such as the building face 1 and the building face 2, noise is greatly reduced in regions of high intensity such as the building roof and the road. In addition, the shapes of the road and building are very accurately obtained, as indicated by numerals 58 and 59 respectively, without any interruptions in the continuity of the edges.

It can thus be understood that with this embodiment, when the color values of the image are transformed from the RGB to respective sets of h, s, i values that are coordinates of an HSI color space, these coordinates are then modified by applying a predetermined function such that the intensity values are appropriately reduced in those regions of the image where instability of the saturation values would otherwise occur. The function which is utilized for performing this modification of the intensity values is derived on the basis of calculating actual amounts of variation in saturation value that will occur in response to specific small-scale changes in one of the r, g, or b values, for each point in the RGB color space.

Hence, compensation of the intensity values is applied in an optimum manner, i.e. by appropriate amounts, and only to those regions where instability of the saturation values would otherwise occur. This enables the generation of noise to be effectively suppressed, while at the same time enabling accurate detection of edges to be achieved, since the stability of saturation values is achieved while ensuring that the maximum possible amount of contribution to the magnitude of each color vector will be made by the corresponding set of h', s' and i' values. That is to say, the maximum possible amount of color information is used in the edge detection processing, consistent with stability of the saturation values and resultant elimination of noise from the edge detection results.

Figure 35:
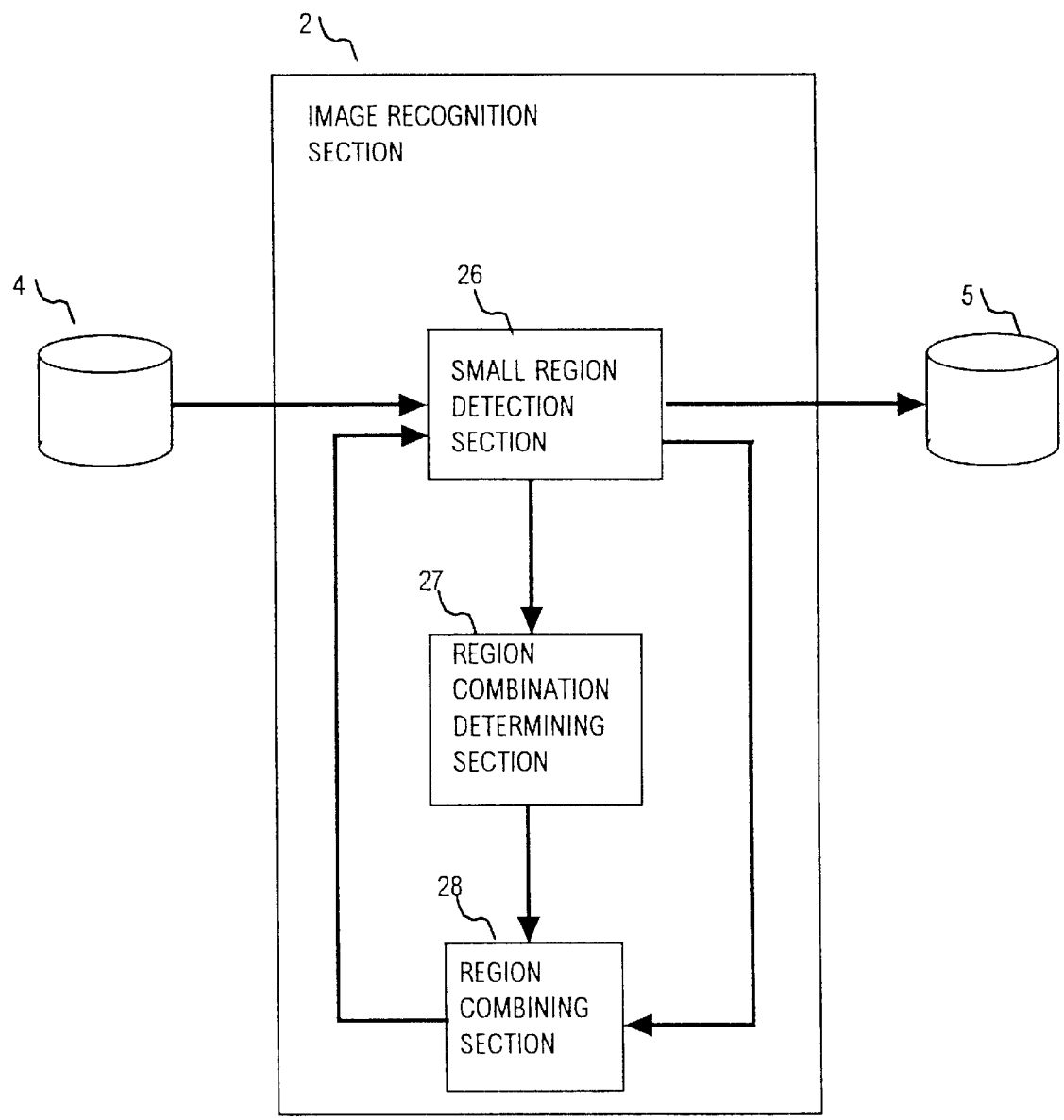
FIG. 35 is a general system block diagram of a seventh embodiment of an image recognition apparatus according to the present invention.

A seventh embodiment of an image recognition apparatus is shown in FIG. 35. The apparatus is made up of a region data storage section 4 having shape data which express only respective regions of an image, i.e. formed of labelled outlines of regions appearing in an image, such as are generated by the preceding embodiments) with that labelled image being referred to in the following as a region image, an image recognition processing section 2 for performing image recognition of image data, and a combination-processed shape data storage section 5 for storing modified shape data which have been formed by the image recognition processing section 2 through combining of certain ones of the regions expressed in the shape data held in the region data storage section 4.

It should be understood that the term "image recognition" as applied herein to the operation of the image recognition processing section 2 signifies a form of processing for recognizing certain regions within an image which should be combined with other regions of that image, and executing such processing.

As shown in FIG. 35 the image recognition processing section 2 is formed of a small region detection section 26, a combination object region determining section 27 and a region combination processing section 28. The small region detection section 26 performs selection of certain regions of the image whose shape data are held in the region data storage section 4, based upon criteria described hereinafter. The combination object region determining section 27 determines those of the regions selected by the small region detection section 26 which are to be mutually combined, and the region combination processing section 28 performs the actual combination of these regions. The combination object region determining section 27 includes a small region determining section, which compares the lengths of the respective common border lines between a selected region and each of the regions which are immediately adjacent to that selected region, and determines the one of these adjacent regions which has the greatest length of common border line with respect to the selected region.

Figure 36:
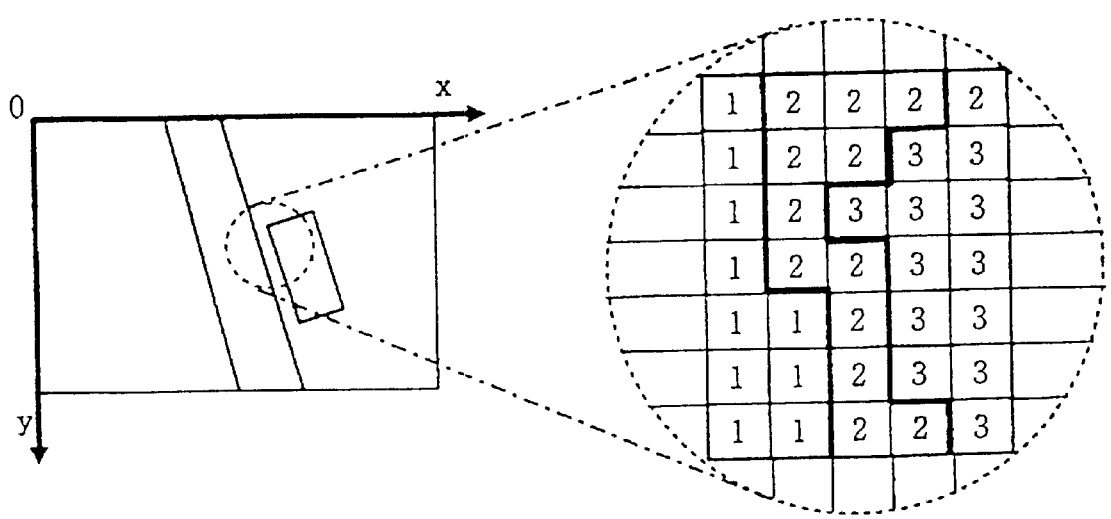
FIG. 36 is a conceptual diagram for illustrating the principles of a region image.

FIG. 36 shows an example of a region image whose data are stored in the region data storage section 4.

Labels such as "1" and "2" are attached to each of the pixels, as shown in the left side of FIG. 36. All of the pixels located within a specific region have the same label, i.e., there is a region containing only pixels having the label 1, a region containing only pixels having the label 2, and so on.

Various techniques are known for separating the contents of an image into various regions. One method of defining a region is to select a pixel in the image, determine those immediately adjacent pixels whose color attributes are sufficiently close to those of the first pixel, within a predetermined range, and to successively expand this process outwards, to thereby determine all of the pixels which constitute one region. Another method is to apply edge detection processing to the image, and to thereby define each region as a set of pixels which are enclosed within a continuously extending edge.

With this embodiment, there is no particular limitation on the process of generating the region image that is stored in the region data storage section 4.

The fundamental feature of the embodiment is that selected small regions, which constitute noise in the image that is stored in the region data storage section 4, are combined with adjacent larger regions, or small regions are mutually combined, to thereby eliminate the small regions and so reduce the level of noise in the region image. Two regions are combined by converting the pixel labels of one of the regions to become identical to the labels of the other region. The resultant region data, which express the shapes of objects as respectively different regions, are then stored in the combination-processed shape data storage section 5.

Figure 37:
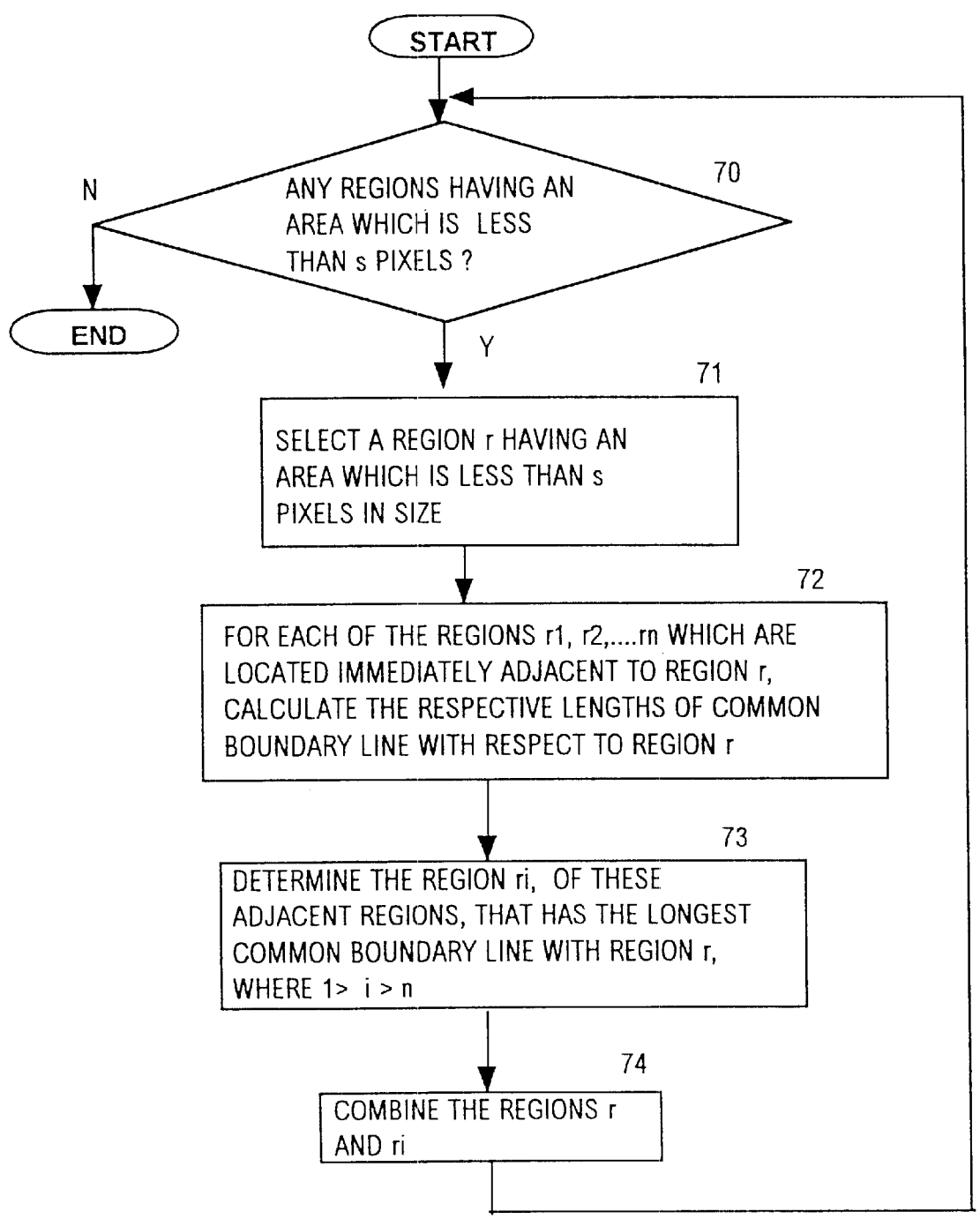
FIG. 37 is a basic flow diagram of the operation of the seventh embodiment.

FIG. 37 is a flow diagram showing the basic features of the operation of this embodiment. The contents are as follows. Step 70: a decision is made as to whether there is a set of one or more small regions within the image which each have an area which is smaller than s pixels, where s is a predetermined threshold value. If such a region is found, then operation proceeds to step 71. If not, i.e., if it is judged that all small regions have been eliminated, then operation is ended. Step 71: a region r is arbitrarily selected, as the next small region that is to be subjected to region combination, from among the set of small regions which each have an area that is less than s pixels. Step 72: for each of the regions r1, r2, . . . rn that are respectively immediately adjacent to the region r, the length of common boundary between that adjacent region and the region r is calculated. Step 73: the region ri that is immediately adjacent to the region r and has the longest value of common boundary line with the region r is selected. Step 74: the regions r and ri are combined to form a new region r'.

A specific example will be described. It will be assumed that the region combination processing is to be applied to the region image that is shown in the upper part of FIG. 38. The image contains regions R, R1, R2 and R3. A vehicle 102 is represented by region R, while a street 100 is represented by the region R1. Since the area of the region R is less than s pixels, this region is to be deleted.

There are two regions which are respectively immediately adjacent to the region R, i.e., the regions R1 and R2. The respective lengths of common boundary line between these regions R1, R2 and the region R are obtained, and it is found that the length of common boundary line with respect to the region R1 is longer than that with respect to R2. The region R1 is therefore selected to be combined with the region R. R and R1 are then combined to form a new region, which is designated as R1', as shown in the lower part of FIG. 38. In that way, the region representing a vehicle has been removed from the region image whose data will be stored in the combination-processed shape data storage section 5.

It can be understood that if the pixel values (of the original color image corresponding to the region image) within the region R were close to those in the region R2, i.e., if these two regions were closely similar in color, and the regions R and R2 were to be combined on the basis of their closeness of color values, this would result in the street attaining an unnatural shape.

With the embodiment described above, a color image that has already been divided into regions is subjected to processing without consideration of the pixel values in the original color image, i.e., processing that is based only upon the shapes of regions in the image, such as to combine certain regions which have a common boundary line. As a result, small regions which constitute noise can be removed, without lowering the accuracy of extracting shapes of objects which are to be recognized. In particular, in the case of processing image data of an aerial photograph of a city, it is possible to eliminate the shapes of vehicles on streets, without lowering the accuracy of extracting the shapes of the streets.

An eighth embodiment of an image recognition apparatus will be described. The configuration is identical to that of the seventh embodiment (shown in FIG. 35).

Figure 40:
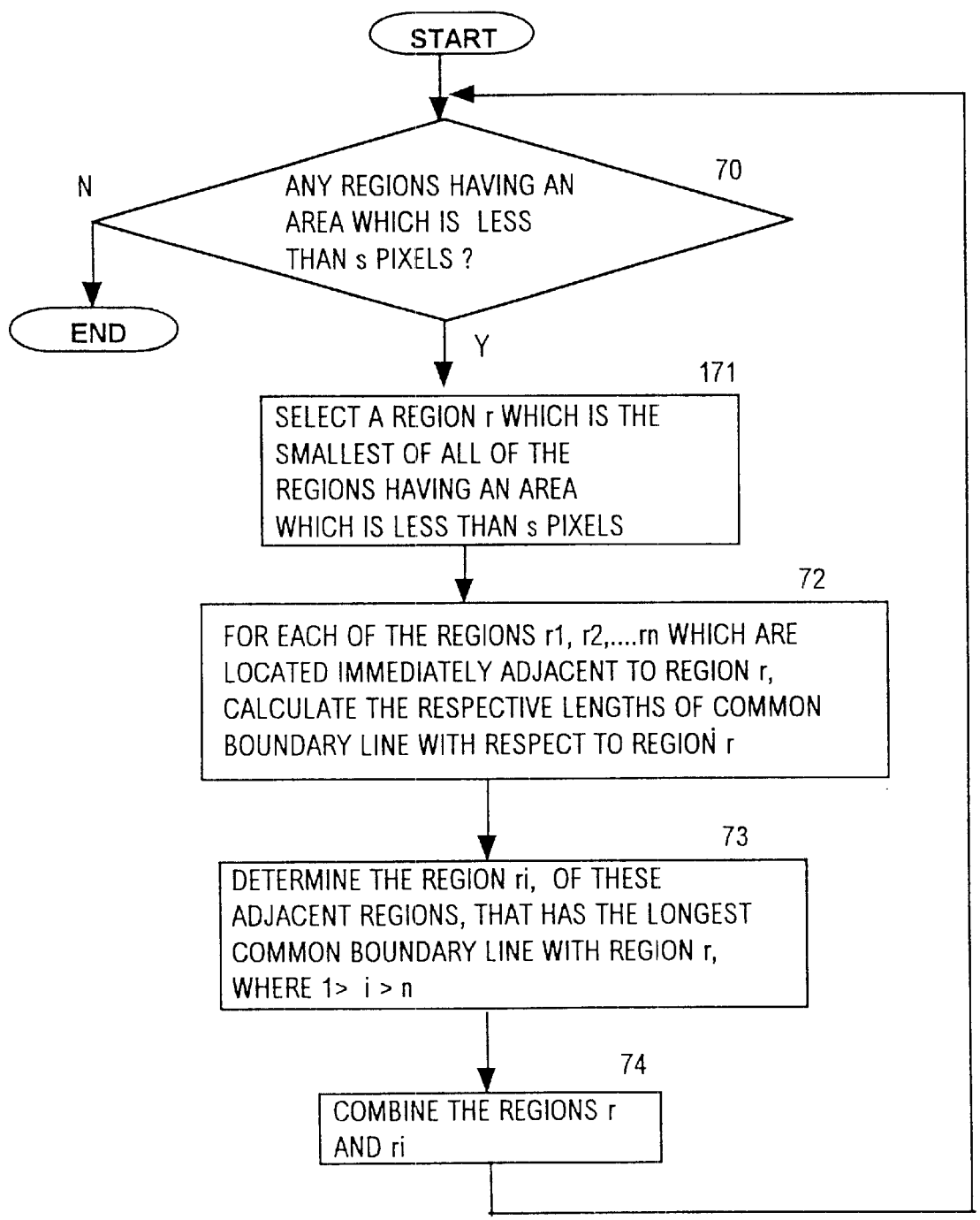
FIG. 40 is a basic flow diagram of the operation of the eighth embodiment.

The operation sequence of this eighth embodiment is shown in FIG. 40. This operation is basically similar to that of the seventh embodiment, shown in the flow chart of FIG. 37, with steps 70, 72, 73, 74 being identical to those of the seventh embodiment, however the contents of step 71 are replaced by those of step 171 in FIG. 40. specifically, in step 171 of this embodiment, the region r having the smallest area of all of the regions of the image which have an area of less than s pixels (as determined in step 70) is selected, and step 72 is then applied to that region r.

Figure 39:
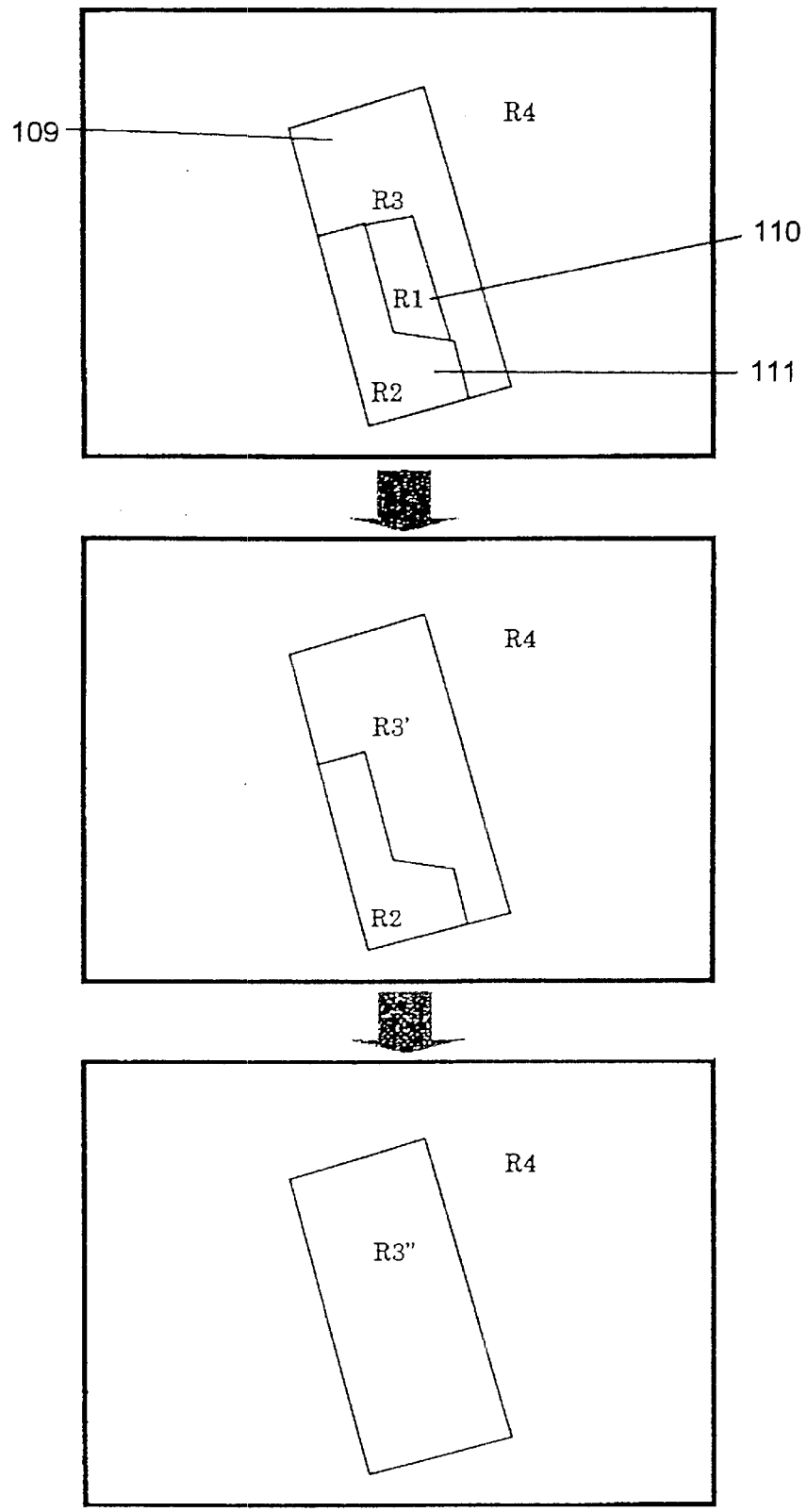
FIG. 39 is a diagram for use in describing a process of eliminating specific small regions from a region image, performed by an eighth embodiment of the invention.

A specific example will be described in the following. It will be assumed that the region image shown in the upper part of FIG. 39, representing a building 109 surrounded by a ground area, is to be subjected to combination processing for extracting only the shape of the building roof. There are four regions in the image, R1, R2, R3 and R4 with R4 being the ground, R3 being a part of the roof of the building 109 which is not covered by rooftop structures, and R1, R2 being respective regions corresponding to first and second rooftop structures 110, 111 which are formed upon the roof of building 109. The areas of each of R1 and R2 is less than s pixels. Since R1 has the smallest area of all of the regions that are smaller than s pixels, as shown in the middle portion of FIG. 39, Ri and R3 are combined to obtain the region R3'. As a result, R2 becomes the region having the smallest area, of the regions R2, R3' and R4. Hence, R2 and R3' are combined, to generate a region R3". Since the size of each of the remaining regions R3" and R4 is greater than s pixels, the combining processing operation is then halted.

In that way, the rooftop structures on the building are eliminated from the image, so that only the shape of the building itself will be extracted.

It should be noted that if this combining of regions had been executed in the sequence R2, R1, with R2 being combined with R4 and Ri being combined with R3, it would be impossible to accurately extract the shape of the building.

Thus with this embodiment, combining processing is repetitively applied to each of the regions that are below a predetermined size, such as to combine the region having the smallest area with another region.

As a result, small regions which constitute noise can be removed, without lowering the accuracy of extracting shapes for the purpose of object recognition. In particular, in the case of applying such processing to image data of an aerial photograph of a city, (i.e., in which, as opposed to the usual type of housing, there will frequently be complex structures formed upon the roofs of buildings) this embodiment will enable the shapes of the buildings to be accurately extracted.

A ninth embodiment of an image recognition apparatus will be described. The configuration is identical to that of the seventh embodiment (shown in FIG. 35).

Figure 42:
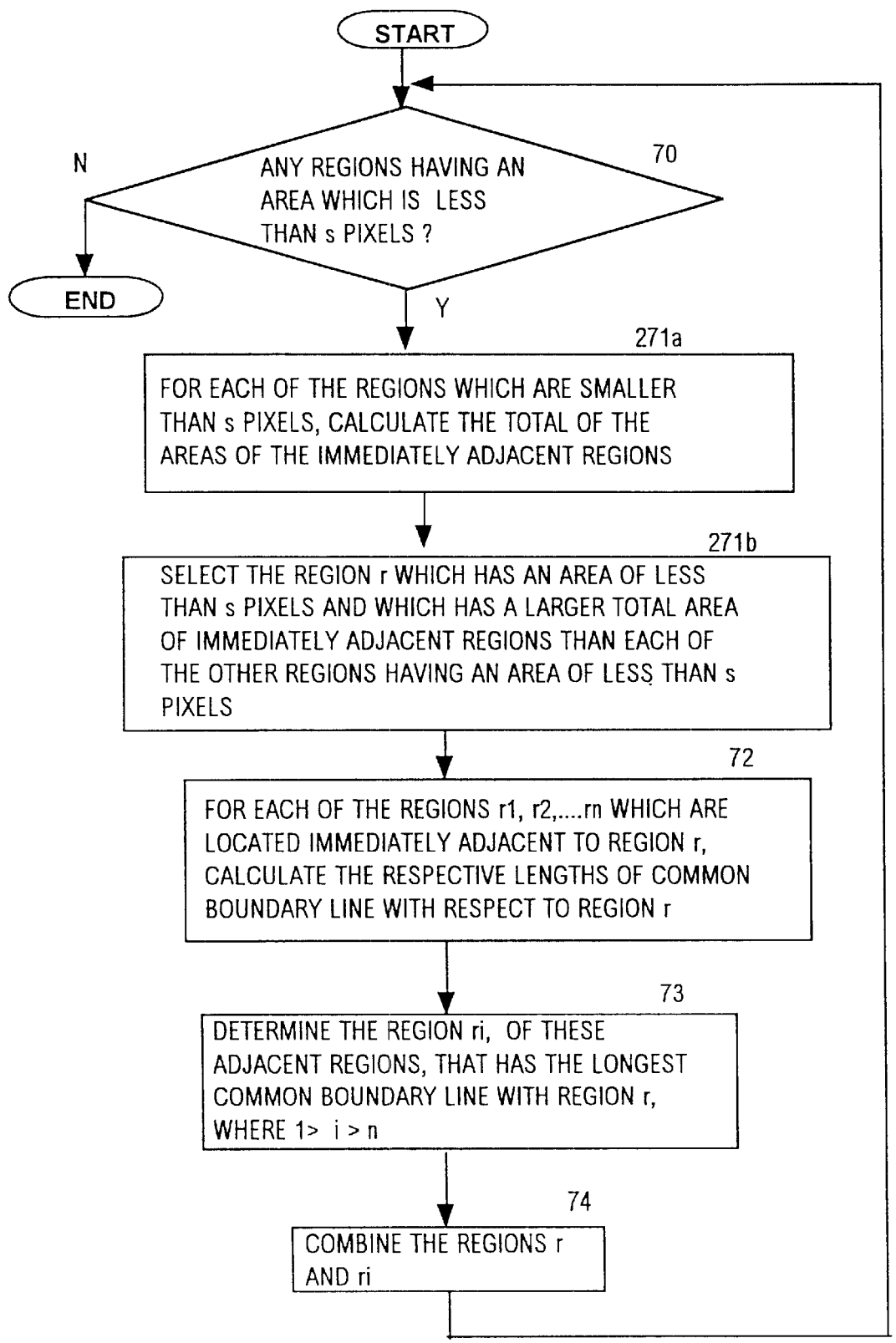
FIG. 42 is a basic flow diagram of the operation of the ninth embodiment.

The operation sequence of this ninth embodiment is shown in the flow diagram of FIG. 42. This is basically similar to that of the seventh embodiment shown in the flow chart of FIG. 37, with steps 70, 72, 73, 74 being identical to those of the seventh embodiment. However with this ninth embodiment, step 71 of FIG. 37 is replaced by two successive steps 271a, 271b, executed as follows.

Step 271a: for each region having an area that is smaller than s pixels, where s is the aforementioned threshold value, the total of the areas of all of the immediately adjacent regions is obtained.

Step 271b: the region r, for which the total of the areas of the immediately adjacent regions is a minimum, is selected to be processed in step 72.

Figure 41:
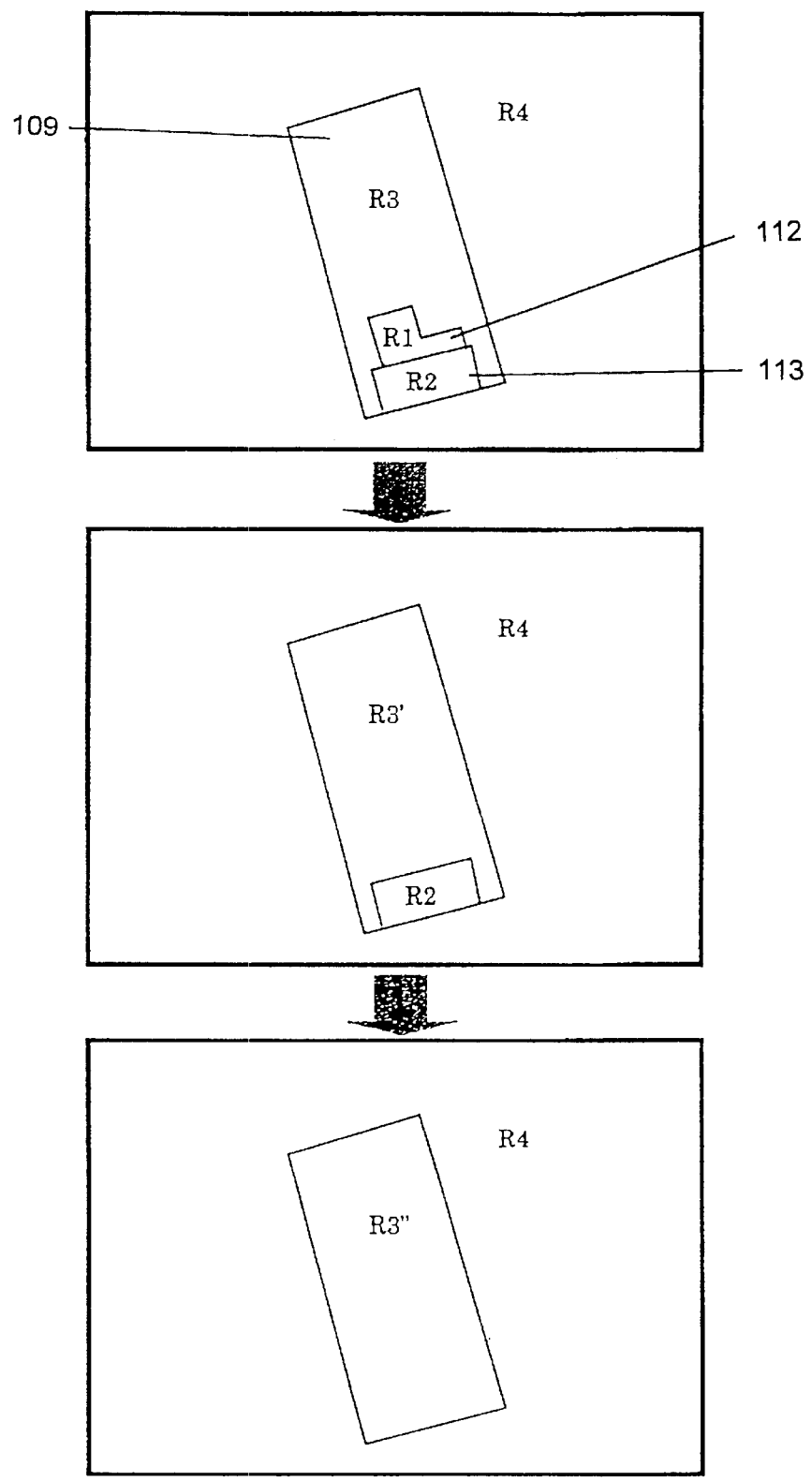
FIG. 41 is a diagram for use in describing a process of eliminating specific small regions from a region image, performed by a ninth embodiment of the invention.

A specific example will be described in the following. It will be assumed that the region in the upper part of FIG. 41 is to be subjected to combination processing. There are four regions in the image, R1, R2, R3 and R4, with R4 being the surrounding ground, R1 and R2 are regions corresponding to first and second structures 112, 113 formed on the roof of building 109, and R3 is the region of that roof which is not covered by these structures. The area of each of R1 and R2 is less than s pixels. The aforementioned sums of areas of immediately adjacent regions are obtained as follows. The sum of the areas which are immediately adjacent to R1 is the total area of R2 and R3, while the sum of such adjacent areas, in the case of R2, is the total area of R1, R3 and R4. Of these two total areas of adjacent regions, the smaller of the two values is obtained for the case of region R1. Thus, as shown in the middle part of FIG. 41, the regions R3 and R1 are combined to form the region R3'. In the next repetition of step 71, it is found that there is only a single region which is smaller than s pixels, and that this is immediately adjacent to the regions R3' and R4. Since R3' is the smaller of these adjacent regions, R3 and R3' are combined to form a region R3". Since the size of that region is greater than s pixels, the combining processing operation is then halted.

In that way, the structures on the building roof having been eliminated, leaving only the outline of the building roof itself.

It should be noted that if this combining of regions had been executed in the sequence R2, R1, with R2 being combined with R4 and R1 being combined with R3, it would be impossible to accurately extract the shape of the building.

Thus with this embodiment, combining processing is repetitively executed such as to combine the region which is below the threshold value of size (s pixels) and for which the total area of the immediately adjacent regions is the smallest, with another region. As a result, small regions which constitute noise can be removed, without lowering the accuracy of extracting shapes for the purpose of object recognition. In particular in the case of applying such processing, whereby combining processing successively occurs from the interior of the outline of a building to the periphery of the building, to image data of an aerial photograph of a city in which there will be many complex rooftop configurations, this embodiment will enable the shapes of the buildings to be accurately extracted.

In the description of the preceding embodiments it has been assumed that the small region detection section 26 shown in FIG. 5 determines the regions which are to be classified as part of the set of small regions (i.e., that are to be subjected to region combination processing) based upon whether or not the total area of a region is above a predetermined threshold value (s pixels). However it should be noted that the invention is not limited to this method, and other types of criteria for selecting these small regions could be envisaged, depending upon the requirements of a particular application. For example, it might be predetermined that regions which are narrower than a predetermined limit are to be combined with other regions, irrespective of total area. It should thus be understood that various modifications to the embodiments described above could be envisaged, which fall within the scope claimed for the present invention.

Figure 43:
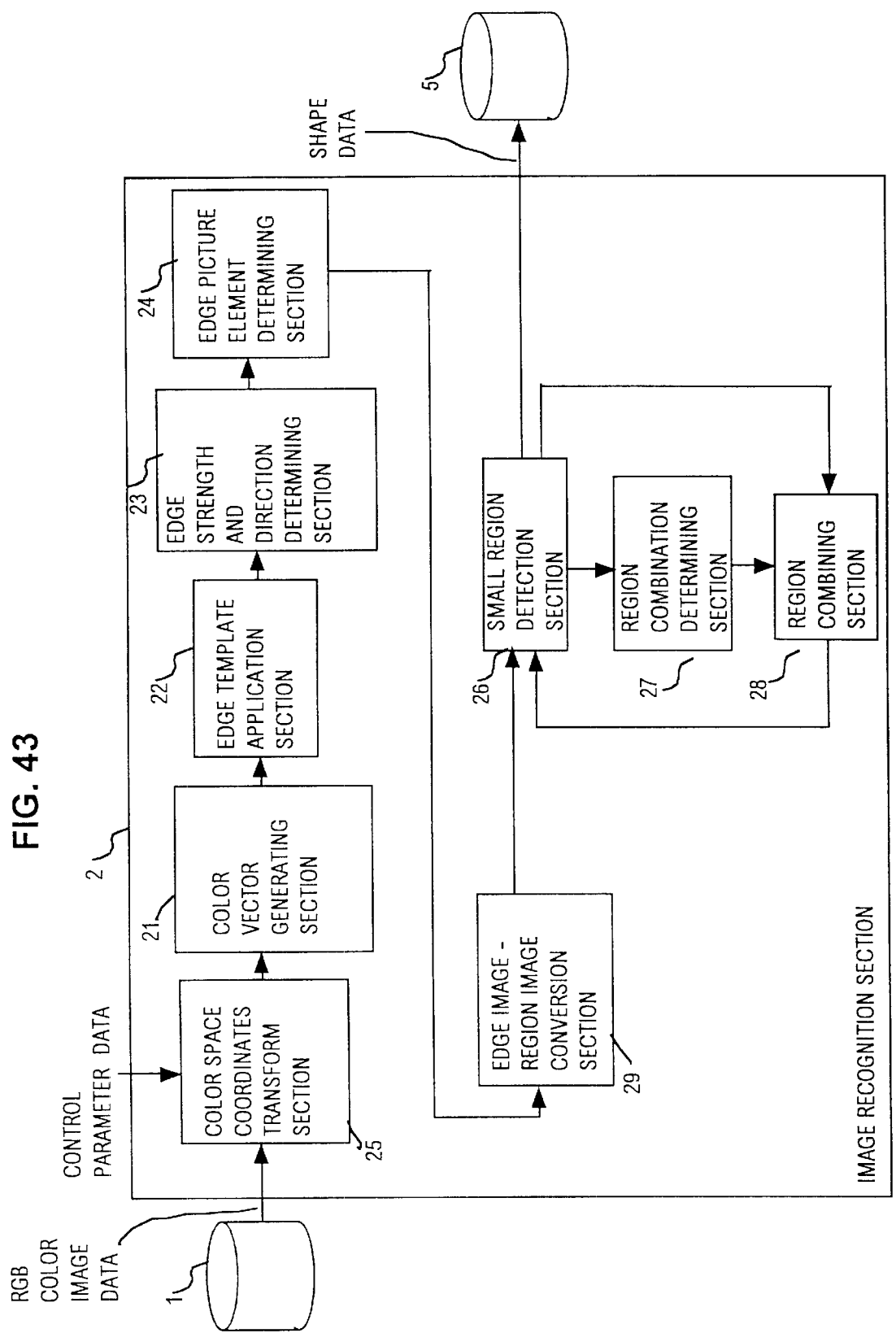
FIG. 43 is a general system block diagram of a tenth embodiment of an image recognition apparatus according to the present invention.

A tenth embodiment of an image recognition apparatus according to the present ' invention will be described. As shown in FIG. 43, this is formed of a color image data storage section 1 which stores color image data, an image recognition processing section 2 for performing image recognition processing of the color image data, and a combination-processed shape data storage section 5 for storing shape data expressing a region image, extracted by the image recognition processing section 2.

The image recognition processing section 2 of this embodiment is made up of a color space coordinates conversion section 25, color vector data generating section 21, edge template application section 22, edge strength and direction determining section 23, an edge pixel determining section 24 for extracting shape data expressing an edge image as described hereinabove referring to FIG. 16, a small region detection section 26, a combination object region determining section 27, and a region combination processing section 28 for performing region combining processing as described hereinabove referring to FIG. 35, and an edge data-region data conversion section 29.

The color space coordinates conversion section 25 converts the RGB data that are stored in the color image data storage section 1 to coordinates of an appropriate color space (i.e., whereby intensity and chrominance information are expressed respectively separately). The color vector data generating section 21 generates respective color vectors, each expressed by a plurality of scalar value, corresponding to the pixels of the original color image, from the transformed image data. The edge template application section 22 applies edge templates to the pixel vector data, to generate edge vector data. The edge strength and direction determining section 23 determines the edge strength and the edge direction information, based on the magnitudes of the edge vector moduli, as described hereinabove for the first embodiment, with the edge pixel determining section 24 determining those pixels which are located on edges within the color image, based on the edge strength and direction information, to thereby obtain shaped data expressing an edge image. The edge data-region data conversion section 29 converts the edge image data into shape data expressing a region image. The small region detection section 26 selects a set of small regions which are each to be subjected to region combination processing, and the combination object region determining section 27 determines the next one of that set of small regions that is to be subjected to the region combination processing. The combination object region determining section 27 operates on that small region, to determine the respective lengths of the common border lines between that small region and each of its immediately adjacent regions, and combines the small region with the adjacent region having the greatest length of common border line with the small region.

FIG. 44 is a flow diagram of the operating sequence of the apparatus of the embodiment of FIG. 10.

The processing of the sequence of steps 20, 10, 11, 12, and 13 is identical to that shown in FIG. 16 of the second embodiment, described hereinabove, so that detailed description will be omitted. Similarly, the processing executed in the sequence of steps 70, 72, 73, 74 is identical to shown in FIG. 37 for the seventh embodiment. In step 100, the data expressing the edge image are converted to data expressing a region image. This is done by dividing the edge image into regions, each formed of a continuously extending set of pixels that are surrounded by edge pixels, and applying a common label to each of the pixels of such a region as described hereinabove referring to FIG. 36, i.e., applying respectively different labels to identify the various regions.

Figure 45:
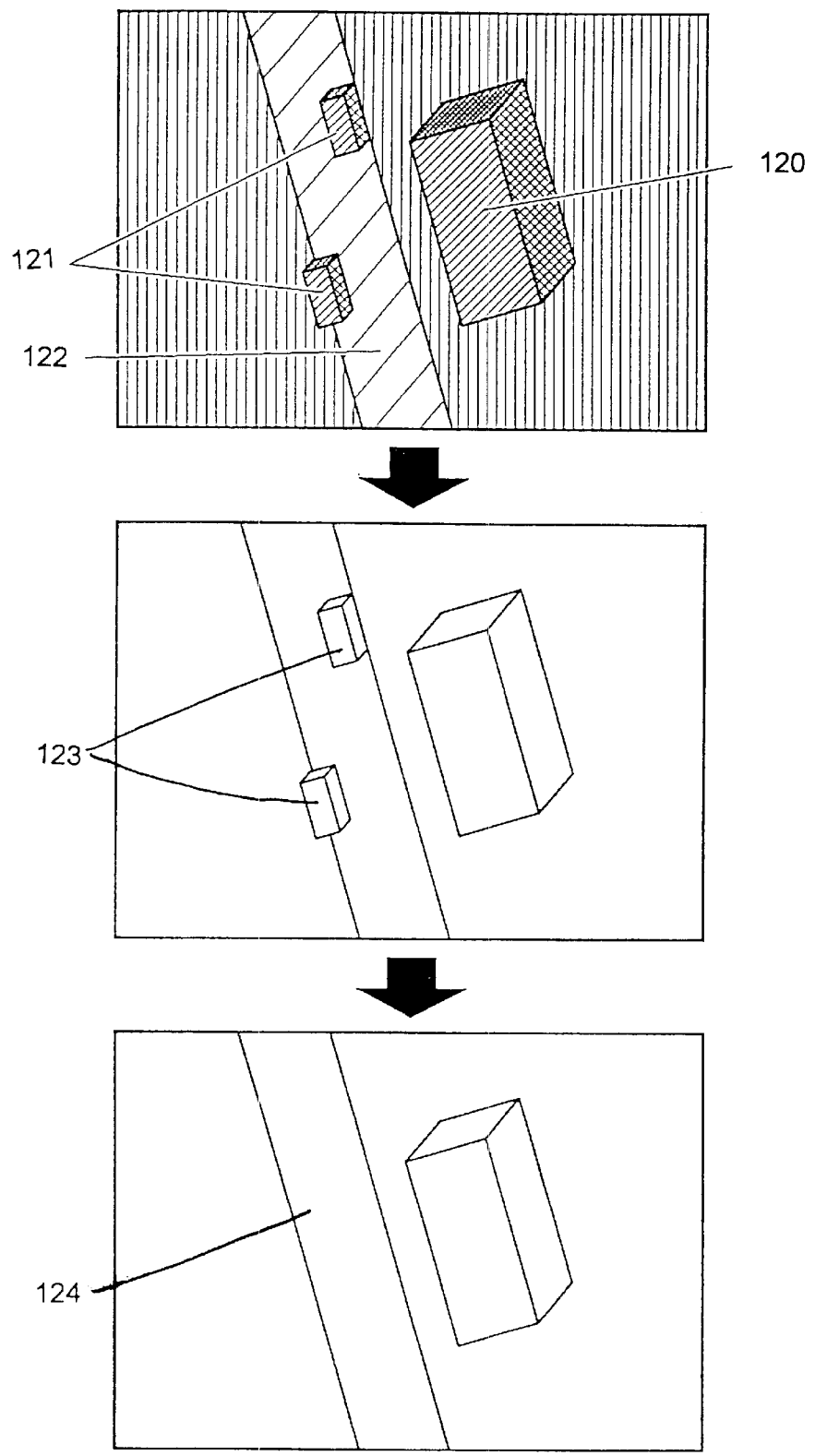
FIG. 45 is a diagram for use in describing how specific small regions are eliminated from a color image, by the apparatus of the tenth embodiment.

A specific example will be described, assuming that the simplified aerial photograph which is represented in the upper part of FIG. 45 is the color image whose data that are to be subjected to recognition processing by this embodiment. This image contains a road 122, two vehicles 121 and a building 120. When edge detection is applied to this image, using respective pluralities of scalar values of the pixels of the color image data, the results are as shown in the middle part of FIG. 45. As shown, edge data are detected for the road, the vehicles and the building, respectively, so that the shapes 123 of the vehicles appear in the street. The data of that edge image are then converted to data of a region image as described above, and region combining is applied based upon the shapes of the regions, without consideration of the values of pixels within the regions. The result obtained is as shown in the lower part of FIG. 45. As shown, the vehicles have been eliminated, leaving the shape 124 of the road accurately represented.

Figure 46:
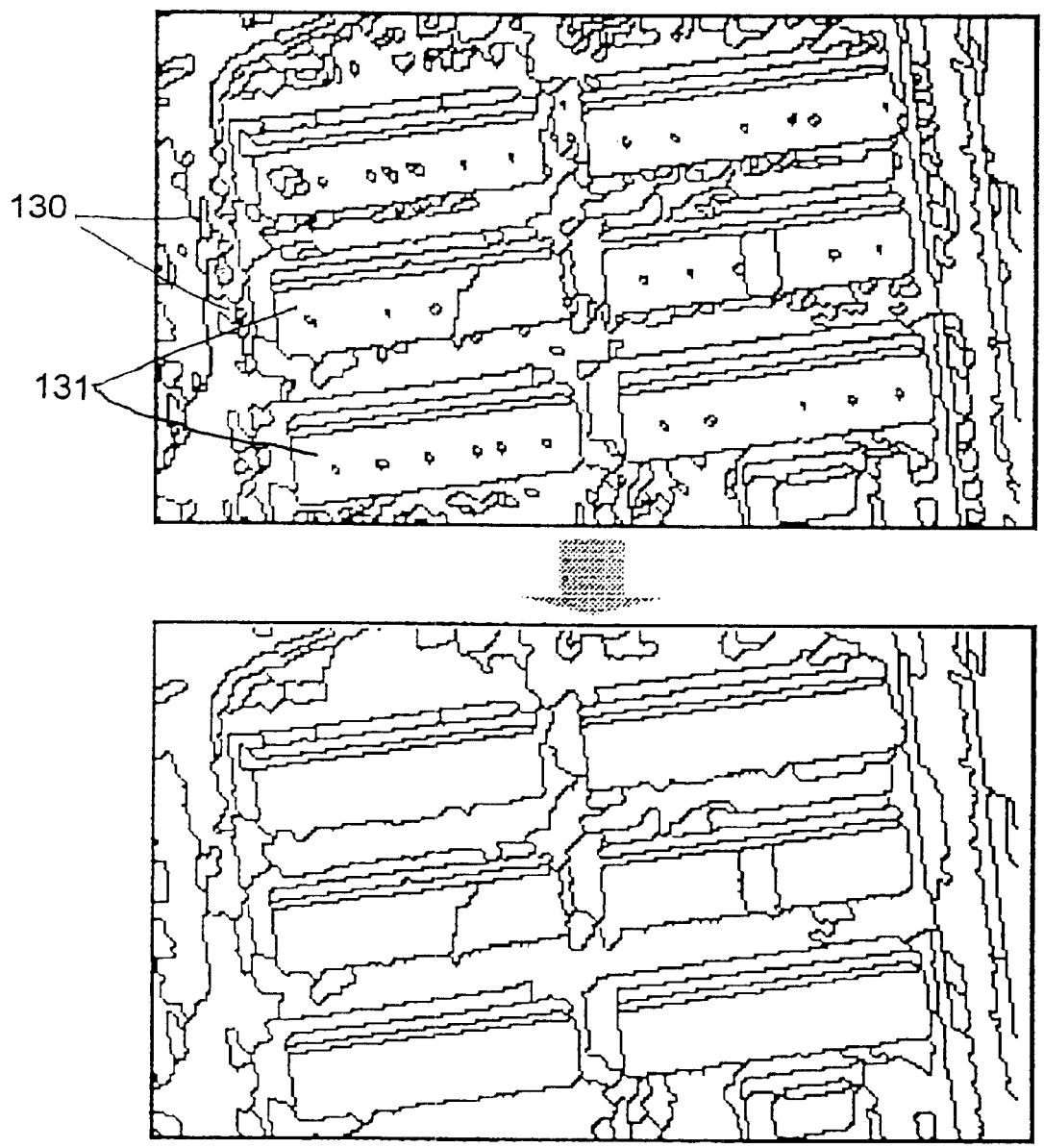
FIG. 46 is a diagram for illustrating the effect of the processing of the tenth embodiment in eliminating specific small regions from an edge image which has been derived by edge detection processing of an actual photograph.
Figure 47:
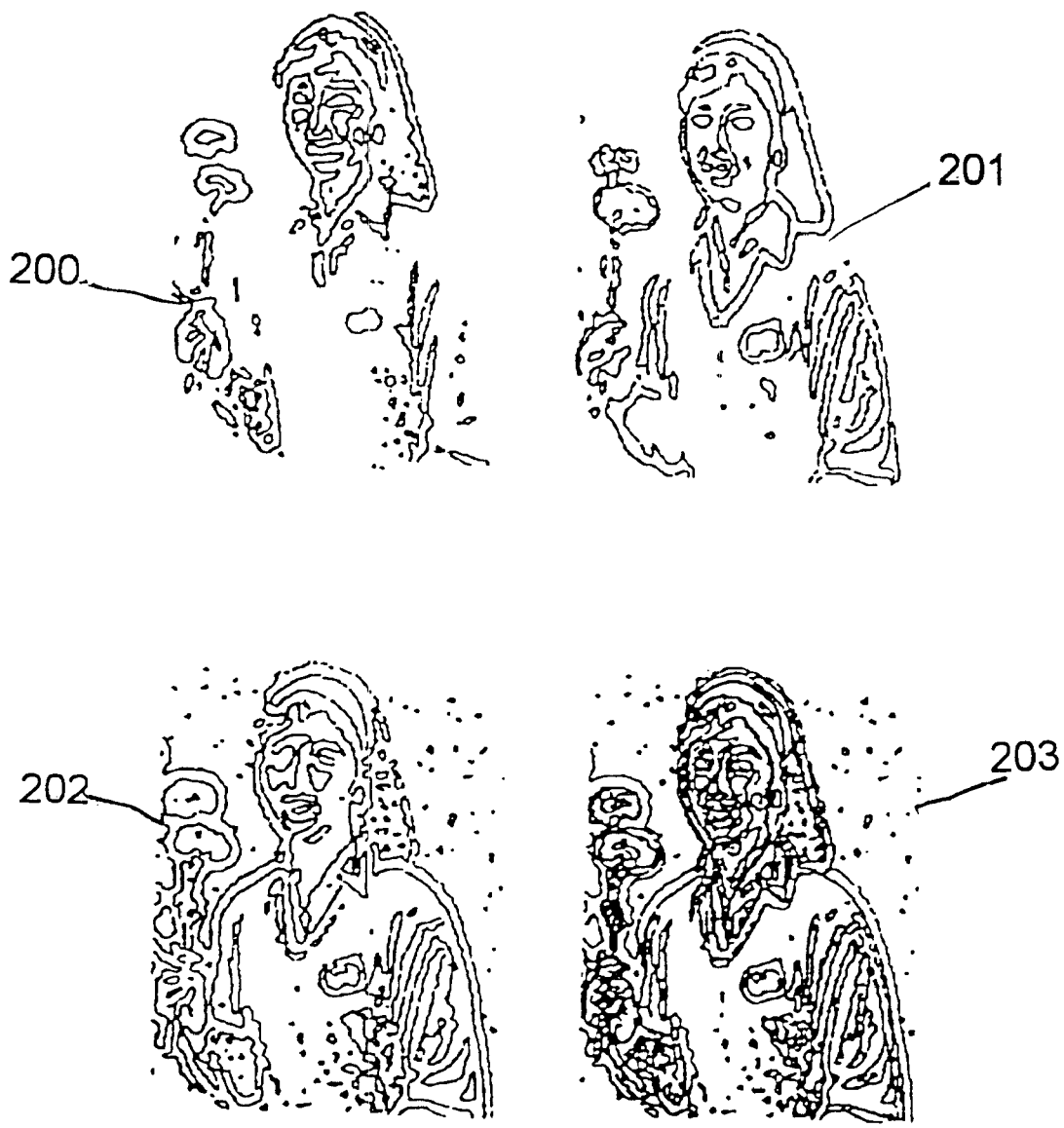
FIG. 47 shows a set of edge images which have been derived by a prior art type of image recognition apparatus, with hue, saturation and intensity edge images respectively obtained.

The upper part of FIG. 46 shows an edge image that has been obtained by applying edge detection by an embodiment of the present invention to a color image which is an actual aerial photograph containing various roads and buildings and many vehicles. Numeral 130 indicates various small regions appearing in the edge image which correspond to the outlines of respective vehicles, while the larger rectangular regions designated by numeral 131 correspond to buildings. In the original photograph there is almost no difference in intensity between the building roofs and the surrounding ground surface. Hence, if prior art methods of image recognition were to be applied in this instance, it would be difficult to detect the shapes of the edges of the buildings. However by applying the present invention, the building edges are accurately detected.

The edge image is then converted to a region image, and region combination is applied to that region image as described above, i.e., with the combination processing being based upon the shapes of the regions, without consideration of the values of pixels within the regions, and with the aforementioned threshold value s being set to an appropriate value for substantially eliminating the small regions 130 which correspond to vehicles.

The result obtained is as shown in the lower part of FIG. 46. As shown, the shapes of many vehicles have been eliminated, thereby enabling the buildings to be more easily recognized, without reducing the accuracy of extracting the shapes of the buildings.

As can be understood from the above description of embodiments, according to one basic aspect, the present invention provides an image recognition method and image recognition apparatus whereby the edges of regions expressing objects appearing in a color image can be accurately and reliably detected. This is based upon expressing the color attributes of each pixel of the image as a plurality of scalar values expressing a color vector, and the use of edge vectors corresponding to respective ones of a plurality of predetermined edge directions (i.e., specific orientation angles within an image). The pixels of the color image are selective processed to derive a corresponding set of edge vectors, with each edge vector being a vector quantity which is indicative of an amount of variation in color between pixels which are located on opposite sides of a line extending through the selected pixel and extending in the corresponding edge direction. Each edge vector is derived in a simple manner by performing an array multiplication operation between an edge template and an array of color vectors centered on the selected pixel, and obtaining the vector sum of the result. With the described embodiments, this operation is equivalent to selecting first and second sets of pixels that are located on respectively opposing sides of the selected pixel, with respect to a specific edge direction, obtaining respective weighted vector sums of the color vectors of these two sets, and obtaining the vector difference between these sums. The edge direction corresponding to the edge vector having the largest modulus of the resultant set of edge vectors obtained for the selected pixel (that largest value being referred to as the edge strength) is thereby obtained as the most probable edge direction on which that pixel is located, and it thereby becomes possible to reliably detect those pixels which actually are located on edges, based on comparisons of respective values of edge strength of adjacent pixels, and also to obtain the direction of such an edge.

According to a second basic aspect of the invention, a region image which expresses an image as a plurality of respectively identified regions can be processed to eliminate specific small regions which are not intended to be identified, and which therefore constitute noise with respect to an image recognition function. This is achieved by first detecting the set of small regions which are each to be eliminated by being combined with an adjacent region, then determining the next one of that set which is to be subjected to the combination processing, with that determination being based upon specific criteria which are designed to prevent the combination of the small regions having the effect of distorting the shapes of larger regions which are to be recognized. The small region thus determined is then combined with an adjacent region, with that adjacent region also being selected such as to reduce the possibility of distortion of regions which are intended to be recognized. In that way, the disadvantages of prior art methods of reducing such small regions, such as by various forms of filter processing, can thereby be effectively overcome.

What is claimed is:

1. An image recognition method of processing image data of a color image which is represented as respective sets of color attribute data of an array of pixels, to successively operate on each of said pixels as an object pixel in order to determine whether said object pixel is located on an edge within said color image, and thereby derive shape data expressing an edge image corresponding to said color image, the method comprising steps of:

expressing said sets of color attribute data of each of said,pixels as respective color vectors, with each said color vector defined by a plurality of scalar values which are coordinates of an orthogonal color space;

for each of a plurality of predetermined edge directions, generating corresponding edge templates as an array of respectively predetermined numeric values;

extracting an array of color vectors as respective color vectors of a sub-array of said pixels, said sub-array of pixels being centered on said object pixel;

successively applying each of said edge templates to said array of color vectors in a predetermined array processing operation, to derive edge vectors respectively corresponding to said edge directions;

comparing the respective moduli of said derived edge vectors to obtain a value of edge strength for said object pixel, as a maximum value of moduilus of said edge vectors, and obtaining a possible edge direction for said object pixel as a direction corresponding to an edge vector having said maximum value of modulus; and judging whether said object pixel is located on an actual ledge which is oriented in said possible edge direction, based upon comparing said edge strength of said object pixel with respective values of edge strength derived for pixels disposed adjacent to said object pixel.

2. The image recognition method according to claim 1, wherein said step of judging whether said object pixel is located on an actual edge which is oriented in said possible edge direction comprises comparing said edge strength of said object pixel with a predetermined threshold value and with respective values of edge strength of first and second adjacent pixels, said first and second adjacent pixels being located immediately adjacent to said object pixel and on opposing sides of said object pixel with respect to said possible edge direction, and judging that said object pixel is located on an actual edge which is oriented in said possible edge direction when it is found that said edge strength of said object pixel exceeds said threshold value and also exceeds said respective values of edge strength of said first and second adjacent pixels.

3. The image recognition method according to claim 1, wherein said numeric values constituting each of said edge templates include positive and negative values which are respectively disposed symmetrically opposite in relation to said corresponding edge direction within said edge template, and wherein said step of applying an edge template comprises performing an array multiplication operation between said edge template and said array of color vectors, and obtaining the vector sum of a result of said array multiplication operation as an edge vector.

4. The image recognition method according to claim 1, wherein said step of comparing the moduli of said derived edge vectors to obtain said value of edge strength of said object pixel comprises:

based on results of said comparison, selectively determining that said moduli have a first relationship whereby there is only a single maximum one of said modului, a second relationship whereby all of said moduli have an identical value, or a third relationship whereby a plurality of said moduli are greater than remaining one (s) of said moduli;

when said first relationship is determined, registering said maximum modulus as said value of edge strength of said object pixel, and registering information specifying a direction corresponding to the edge vector having said maximum modulus as the possible edge direction of said object pixel;

when said second relationship is determined, registering said identical value of modulus as said value of edge strength of said object pixel; and when said third relationship is determined, arbitrarily selecting an edge vector having said greater value of modulus, registering said modulus value as said value of edge strength of said object pixel, and registering information for specifying a direction which corresponds to said selected edge vector as the possible edge direction of said object pixel.

5. The image recognition method according to claim 1, wherein said step of comparing the moduli of said derived edge vectors to obtain said value of edge strength of said object pixel comprises:

based on results of said comparison, selectively determining that said moduli have:
a first relationship whereby there is only a single maximum one of said moduli,
a second relationship whereby all of said moduli have an identical value, or
a third relationship whereby a plurality of said moduli are greater than remaining one(s) of said moduli;

when said first relationship is determined, registering said maximum modulus as said value of edge strength of said object pixel, and registering information specifying a direction corresponding to the edge vector having said maximum modulus, as a single candidate edge direction of said object pixel;

when said second relationship is determined, registering said identical value of modulus as said value of edge strength of said object pixel; and when said third relationship is determined, registering said greater value of modulus as said value of edge strength of said object pixel, and registering information specifying each of respective directions corresponding to each of said plurality of edge vectors having said greater value of modulus, as respective candidate edge directions of said object pixel; and wherein said step of judging whether said object pixel is located on an actual edge is performed by successively utilizing each of said candidate edge directions, until an actual edge is detected or all of said candidate edge directions have been utilized.

6. The image recognition method according to claim 1, wherein said step of expressing said sets of color attribute data as respective color vectors comprises performing a transform processing operation on each of said sets of color attribute data to derive a corresponding plurality of scalar values which constitute a set of coordinates of a predetermined color space.

7. The image recognition method according to claim 6, wherein said predetermined color space is an HSI (hue, saturation, intensity) color space.

8. The image recognition method according to claim 7, wherein said coordinates of said HSI color space are obtained in the form of polar coordinates, and further comprising a step of converting each said set of polar coordinates to a corresponding plurality of scalar values which are linear coordinates of an orthogonal color space.

9. The image recognition method according to claim 8, wherein said set of linear coordinates obtained corresponding to each of said pixels is derived such that an intensity value for said pixel is expressed by a specific one of said set of coordinates while hue and saturation values for said pixel are expressed by other ones of said set of coordinates, and further comprising a step of multiplying at least one of said coordinates of said set by an arbitrarily determined parameter value such as to alter a relationship between respective magnitudes of said intensity value and said hue and saturation values.

10. The image recognition method according to claim 7, further comprising a step of converting each of said sets of coordinates of said pixels for said HSI color space to a corresponding set of coordinates of a modified HSI color space, such that saturation values expressed in said modified HSI color space are modified in accordance with corresponding intensity values.

11. The image recognition method according to claim 10, wherein said saturation values in the modified HSI color space are decreased in accordance with decreases in corresponding intensity values, in relation to saturation values in said HSI color space.

12. The image recognition method according to claim 10, wherein said saturation values in the modified HSI color space are decreased in relation to saturation values in said HSI color space, in accordance with increases in corresponding intensity values from a predetermined median intensity value, and are moreover decreased in relation to saturation values in said HSI color space in accordance with decreases in corresponding intensity values from said predetermined median intensity value.

13. The image recognition method according to claim 10, wherein said step of converting each of said sets of coordinates of said pixels for said HSI color space to a corresponding set of coordinates of the modified HSI color space comprises applying a predetermined modification function to each of respective saturation values of said HSI color space to obtain modified saturation values.

14. The image recognition method according to claim 13, wherein said modification function is derived beforehand based upon a relationship between the intensity values and corresponding saturation values which are obtained by a transform into an HSI space having a specific size, with each of respective hue, saturation and intensity values expressed as a specific number of data bits.

15. A method of deriving for a selected pixel of a color image that is part of an array of pixels, for each of a plurality of predetermined edge directions, an edge strength value that corresponds to a specific one of a plurality of predetermined edge directions and is indicative of a degree of probability that said selected pixel is located on an edge between regions of respectively different color within said image, with said edge being oriented in said specific edge direction, the method comprising a set of steps performed for each of said edge directions of:

expressing color attributes of each of said pixels of said color image as a plurality of scalar values representing a color vector within an orthogonal color space;

obtaining a first weighted vector sum of a first set of pixels which are located adjacent to said selected pixel on one side thereof with respect to said specific edge direction and a second weighted vector sum of a second set of pixels which are located adjacent to said selected pixel on an opposite side from said first set with respect to said specific edge direction, and deriving the vector difference between said first and second weighted vector sums; and obtaining a modulus of said vector difference, and a step of judging the respective moduli thereby obtained respectively corresponding to said predetermined edge directions, to obtain said edge strength value as a largest one of said moduli.

16. An image recognition apparatus for processing image data of a color image which is represented as respective sets of color attribute data of an array of pixels, to successively operate on each of said pixels as an object pixel in order to determine whether said object pixel is located on an edge within said color image, and thereby derive shape data-expressing an edge image corresponding to said color image, the apparatus comprising:

color vector generating means for expressing said sets ofcolor attribute data of each of said pixels as respective color vectors, with each said color vector in the form of an array of a plurality of scalar values which are coordinates of an orthogonal color space;

edge template application means for generating a plurality of edge templates each formed of an array of respectively predetermined numeric values, with said edge templates corresponding to respective ones of a plurality of predetermined edge directions, thereby extracting an array of color vectors as respective color vectors of a sub-array of said pixels, with said sub-array of pixels being centered on said object pixel, and successively applying each of said edge templates to said array of color vectors in a predetermined array 5processing operation, to derive edge vectors respectively corresponding to said edge directions;

edge pixel determining means for comparing the respective moduli of said derived edge vectors to obtain a value of edge strength for said object pixel, as a maximum value of modulus of said edge vectors, thereby obtaining a possible edge direction for said object pixel as a direction corresponding to an edge vector having said maximum: value of modulus, and for judging whether said object pixel is located on an actual edge that is oriented in said possible edge direction, based upon comparing said edge strength of said object pixel with respective values of edge strength derived for pixels disposed adjacent to said object pixel.

17. The image recognition apparatus according to claim 16, wherein said operation of judging whether said object pixel is located on an actual edge which is oriented in said possible edge direction comprises comparing said edge strength of said object pixel with a predetermined threshold value and with respective values of edge strength of of first and second adjacent pixels, said first and second adjacent pixels being located immediately adjacent to said object pixel and on opposing sides of said object pixel with respect to said possible edge direction, and judging that said object pixel is located on an actual edge which is oriented in said possible edge direction when it is found that said edge strength of said object pixel exceeds said threshold value and also exceeds said respective values of edge strength of said first and second adjacent pixels.

18. The image recognition apparatus according to claim 16, wherein said numeric values constituting each of said edge templates include positive and negative values which are respectively disposed symmetrically opposite in relation to said corresponding edge direction within said edge template, and wherein said operation of applying an edge template is executed by performing an array multiplication operation between said edge template and said array of color vectors, and obtaining the vector sum of a result of said array multiplication operation as an edge vector.

19. The image recognition apparatus according to claim 16, wherein said operation of comparing the moduli of said derived edge vectors to obtain said value of edge strength of said object pixel comprises:

based on results of said comparison, selectively determining that said moduli have:
- a first relationship whereby there is only a single maximum one of said moduli,
- a second relationship whereby all of said moduli have an identical value, or
- a third relationship whereby a plurality of said moduli are greater than remaining one (s) of said moduli;

when said first relationship is determined, registering said maximum modulus as said value of edge strength of said object pixel, and registering information specifying a direction corresponding to the edge vector having said maximum modulus as the possible edge direction of said object pixel;

when said second relationship is determined, registering said identical value of modulus as said value of edge strength of said object pixel; and when said third relationship is determined, arbitrarily selecting an edge vector having said greater value of modulus, registering said modulus value as said value of edge strength of said object pixel, and registering information that specifies that a direction corresponding to said selected edge vector is a possible edge direction of said object pixel.

20. The image recognition apparatus according to claim 16, wherein said operation of comparing the moduli of said derived edge vectors to obtain said value of edge strength of said object pixel comprises:

based on results of said comparison, selectively determining that said moduli have a first relationship whereby there is only a single maximum one of said moduli, a second relationship whereby all of said moduli have an identical value, or a third relationship whereby a plurality of said moduli are greater than remaining one (s) of said moduli;

when said first relationship is determined, registering said maximum modulus as said value of edge strength of said object pixel, and registering information specifying a direction corresponding to the edge vector having said maximum modulus, as a single candidate edge direction of said object pixel;

when said second relationship is determined, registering said identical value of modulus as said value of edge strength of said object pixel; and when said third relationship is determined, registering said greater value of modulus as said value of edge strength of said object pixel, and registering information specifying each of respective directions corresponding to each of said plurality of edge vectors having said greater value of modulus, as respective candidate edge directions of said object pixel; and wherein said operation of judging whether said object pixel is located on an actual edge is performed by successively utilizing each of said candidate edge directions, until an actual edge is detected or all of said candidate edge directions have been utilized.

21. The image recognition apparatus according to claim 16, wherein said operation of expressing said sets of color attribute data as respective color vectors is executed by performing a transform processing operation on each of said sets of color attribute data to derive a corresponding plurality of scalar values which constitute a set of, coordinates of a predetermined color space.

22. The image recognition apparatus according to claim 21, wherein said predetermined color space is an HIS (hue, saturation, intensity) color space.

23. The image recognition apparatus according to claim 22, wherein said coordinates of said HSI color space are obtained in the form of polar coordinates, and wherein said color vector generating means further comprises means for converting each said set of polar coordinates to a corresponding plurality of scalar values which are linear coordinates of an orthogonal color space.

24. The image recognition apparatus according to claim 23, wherein said set of linear coordinates obtained corresponding to each of said pixels is derived such that an intensity value for said pixel is expressed by a specific one of said set of coordinates while hue and saturation values for said pixel are expressed by other ones of said set of coordinates, and wherein said color vector generating means further comprises means for multiplying at least one of said coordinates of said set by an arbitrarily determined parameter value to thereby alter a relationship between respective magnitudes of said intensity value and said hue and saturation values.

25. The image recognition apparatus according to claim 22, wherein said color vector generating means further comprises means for converting each of said sets of coordinates of said pixels for said HSI color space to a corresponding set of coordinates of a modified HSI color space, such that saturation values expressed in said modified HSI color space are altered in accordance with corresponding intensity values.

26. The image recognition apparatus according to claim 25, wherein said saturation values in the modified HSI color space are decreased in accordance with decreases in corresponding intensity values, in relation to saturation values in said HSI color space.

27. The image recognition apparatus according to claim 25, wherein said saturation values in the modified HSI color space are decreased in relation to saturation values in said HSI color space, in accordance with increases in corresponding intensity values from a predetermined median value, and are moreover decreased in relation to saturation values in said HSI color space, in accordance with decreases in corresponding intensity values from said predetermined median value.

28. The image recognition apparatus according to claim 25, wherein said operation of converting each of said sets of coordinates of said pixels for said HSI color space to a corresponding set of coordinates of the modified HSI color space is executed by applying a predetermined modification function to each of respective saturation values of said HSI color space to obtain modified saturation values.

29. The image recognition apparatus according to claim 28, wherein said modification function is derived beforehand based upon a relationship between the intensity values and corresponding saturation values which are obtained by a transform into an HSI space having a specific size, with each of respective hue, saturation and intensity values expressed as a specific number of data bits.

* * * * *

UNITED STATES PATENT AND TRADEMARK OFFICE
CERTIFICATE OF CORRECTION

PATENT NO.   : 6,665,439 B1
DATED        : December 16, 2003
INVENTOR(S)  : Eiji Takahashi It is certified that error appears in the above-identified patent and that said Letters Patent is hereby corrected as shown below:

Column 36,
Line 28, "ledge" should be -- edge --;
Line 63, "modului" should be -- moduli --;

Column 39,
Line 15, "ofcolor" should be -- of color --; and
Line 28, "5processing" should be -- processing --.
Line 48, "of of" should be -- of --

Column 41,
Line 2, "HIS" should be -- HSI --;

Signed and Sealed this

Third Day of May, 2005

JON W. DUDAS
*Director of the United States Patent and Trademark Office*